US010424049B2

(12) United States Patent
Nagumo et al.

(10) Patent No.: US 10,424,049 B2
(45) Date of Patent: Sep. 24, 2019

(54) IMAGE PROCESSING DEVICE, METHOD, AND RECORDING MEDIUM

(71) Applicant: SONY CORPORATION, Tokyo (JP)

(72) Inventors: Takefumi Nagumo, Kanagawa (JP); Jun Murayama, Tokyo (JP); Toshio Yamazaki, Tokyo (JP); Ken Tamayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 272 days.

(21) Appl. No.: 15/182,072

(22) Filed: Jun. 14, 2016

(65) Prior Publication Data

US 2016/0292823 A1    Oct. 6, 2016

Related U.S. Application Data

(63) Continuation of application No. 13/674,333, filed on Nov. 12, 2012, now Pat. No. 9,392,257.

(30) Foreign Application Priority Data

Nov. 28, 2011   (JP) ................................ 2011-258518

(51) Int. Cl.
*G06T 3/40* (2006.01)
*H04N 13/111* (2018.01)
(Continued)

(52) U.S. Cl.
CPC ............ *G06T 3/4053* (2013.01); *G06T 5/002* (2013.01); *G06T 7/246* (2017.01); *G06T 7/557* (2017.01);
(Continued)

(58) Field of Classification Search
CPC ........ G06T 3/4053; G06T 7/246; G06T 7/557
See application file for complete search history.

(56) References Cited

U.S. PATENT DOCUMENTS 6,157,396 A  *  12/2000  Margulis ................... G06T 1/20
345/506
2009/0041381 A1    2/2009  Georgiev et al.
(Continued)

FOREIGN PATENT DOCUMENTS

| CN | 102243756 A | 11/2011 |
| JP | 09-009301 A | 1/1997 |

(Continued)

OTHER PUBLICATIONS

Office Action received for Japanese patent application No. 2011-258518, dated Feb. 23, 2016, 5 pages of office action.
(Continued)

*Primary Examiner* — Jonathan R Messmore
(74) *Attorney, Agent, or Firm* — Chip Law Group

(57) ABSTRACT

An image processing device includes a viewpoint separating unit configured to separate multi-viewpoint image data, including images of multiple viewpoints and representing intensity distribution of light and the direction of travel of light according to positions and pixel values of pixels, into a plurality of single-viewpoint image data for each of the individual viewpoints; and a parallax control unit configured to control amount of parallax between the plurality of single-viewpoint image data obtained by separation into individual viewpoints by the viewpoint separating unit.

11 Claims, 45 Drawing Sheets

(51) Int. Cl.

| | | |
|---|---|---|
| *H04N 13/128* | (2018.01) | |
| *H04N 13/204* | (2018.01) | |
| *H04N 13/225* | (2018.01) | |
| *H04N 13/229* | (2018.01) | |
| *H04N 13/271* | (2018.01) | |
| *G06T 5/00* | (2006.01) | |
| *G06T 7/246* | (2017.01) | |
| *G06T 7/557* | (2017.01) | |
| *H04N 13/00* | (2018.01) | |

(52) U.S. Cl.
 CPC ......... *H04N 13/111* (2018.05); *H04N 13/128* (2018.05); *H04N 13/204* (2018.05); *H04N 13/225* (2018.05); *H04N 13/229* (2018.05); *H04N 13/271* (2018.05); *G06T 2200/21* (2013.01); *G06T 2207/10012* (2013.01); *G06T 2207/10052* (2013.01); *G06T 2207/20201* (2013.01); *H04N 2013/0081* (2013.01); *H04N 2013/0088* (2013.01)

(56) References Cited

U.S. PATENT DOCUMENTS

| | | | |
|---|---|---|---|
| 2010/0289878 A1 | 11/2010 | Sato et al. | |
| 2011/0080487 A1* | 4/2011 | Venkataraman | H04N 5/2253 348/218.1 |
| 2011/0274370 A1* | 11/2011 | Kondo | G06T 3/4053 382/284 |
| 2012/0314937 A1* | 12/2012 | Kim | H04N 13/0033 382/154 |

FOREIGN PATENT DOCUMENTS

| | | |
|---|---|---|
| JP | 2006-245677 A | 9/2006 |
| JP | 2008-294741 A | 12/2008 |
| JP | 2009-165115 A | 7/2009 |
| JP | 2009-165168 A | 7/2009 |
| JP | 2009-175680 A | 8/2009 |
| JP | 2009-177728 A | 8/2009 |
| JP | 2009-232004 A | 10/2009 |
| JP | 2010-041338 A | 2/2010 |
| JP | 2010-063083 A | 3/2010 |
| JP | 2010-154493 A | 7/2010 |
| JP | 2010-171753 A | 8/2010 |
| JP | 2010-183386 A | 8/2010 |
| JP | 2010-263501 A | 11/2010 |
| JP | 2010-263572 A | 11/2010 |
| JP | 2011-019088 A | 1/2011 |
| JP | 2011-066875 A | 3/2011 |
| JP | 2011-135170 A | 7/2011 |
| JP | 2011-166606 A | 8/2011 |
| WO | 2011/105814 | 9/2011 |
| WO | 2011105814 A | 9/2011 |

OTHER PUBLICATIONS

Chinese Office Action dated Sep. 30, 2015 in patent application No. 201210477666.7, 26 Pages of Office Action Including 15 Pages of English Translation.

Japanese Office Action dated Jul. 30, 2015 in patent application No. 2011258518, pp. 7.

Office Action for JP Patent Application No. 2011258518, dated Aug. 4, 2016, 4 pages.

* cited by examiner

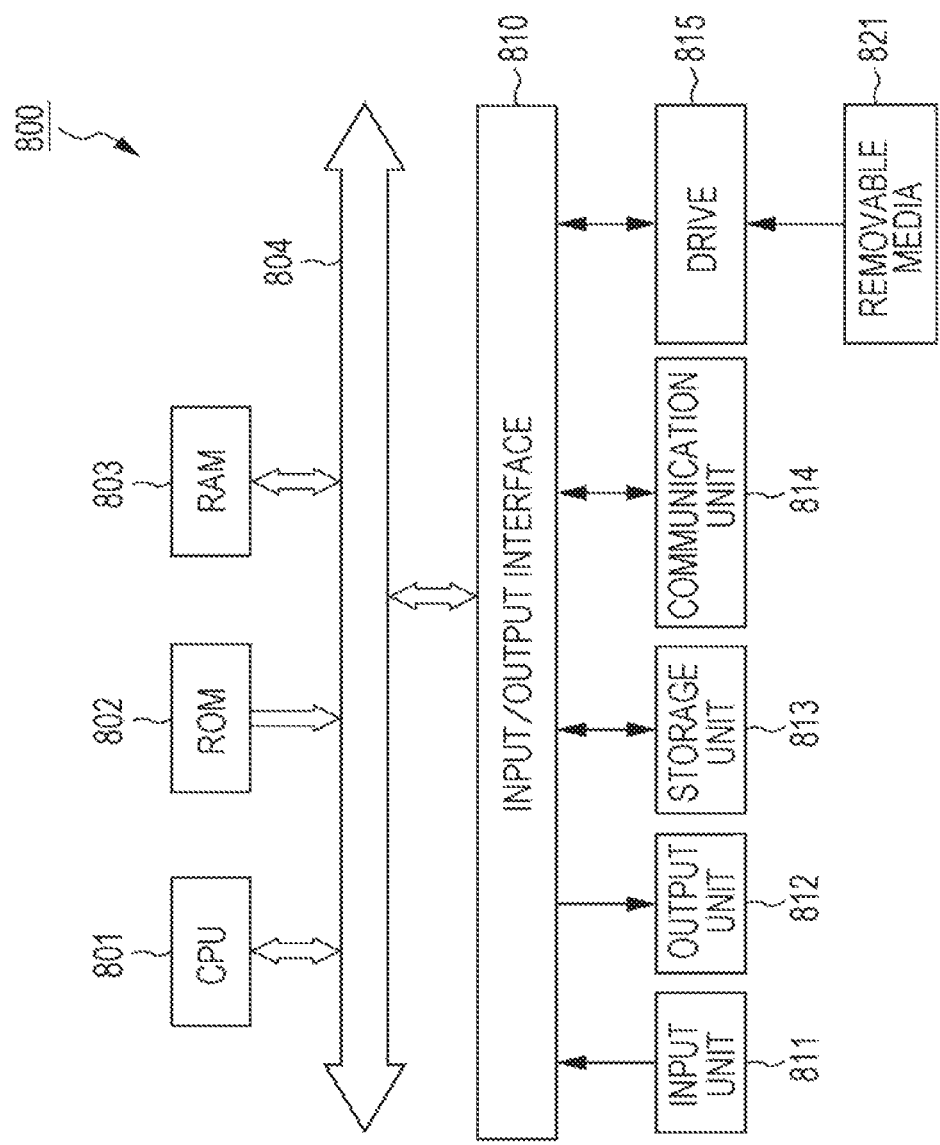

IMAGE PROCESSING DEVICE, METHOD, AND RECORDING MEDIUM

CROSS REFERENCE TO RELATED APPLICATIONS

The present application is a continuation application of U.S. patent application Ser. No. 13/674,333, filed Nov. 12, 2012, which claims the benefit of priority from prior Japanese Priority Patent Application JP 2011-258518 filed in the Japan Patent Office on Nov. 28, 2011, the entire content of which is hereby incorporated by reference.

BACKGROUND

The present disclosure relates to an image processing device and method, a recording medium, and a program, and particularly relates to an image processing device and method, a recording medium, and a program, whereby stereoscopic effect of multi-viewpoint images can be controlled.

Heretofore, various imaging apparatuses have been proposed and developed. Also, there have been proposed imaging apparatuses which perform predetermined image processing on imaged data obtained by imaging, following which the imaged data is output.

For example, there has been proposed an imaging apparatus employing what is called "light field photography", referred to as a "light field camera" (e.g., see Japanese Unexamined Patent Application Publication No. 2009-165115). This imaging apparatus includes an imaging lens, a microlens array, an imaging device, and an image processing unit, with an aperture diaphragm having a single aperture being provided to the middle portion of the imaging lens. Due to this configuration, imaged data acquired by the imaging device includes, in addition to intensity distribution of light at the light receiving face, information of the direction of travel of light as well. The configuration also allows an observation image at any field of view or focal point to be reconstructed at the image processing unit.

Multiple microlenses are provided to the microlens array, with multiple pixels of the imaging device being assigned to each microlens. Accordingly, by collecting pixel values of pixels each in the same position as to each microlens, for example, image data obtained by performing photoelectric conversion of incident light each from the same direction (i.e., an image from one direction) can be obtained. In the same way, by managing the pixel values in accordance with the positions thereof, multiple images of viewpoints which differ from each other (i.e., a multi-viewpoint image) can be obtained.

SUMMARY

However, in this case, the amount of parallax of the multi-viewpoint image is dependent on the aperture of the diaphragm of the imaging lens, and the number of pixels of the imaging device assigned to the microlenses. Accordingly, with multi-viewpoint images obtained using such an imaging apparatus, restriction in size of the imaging lens and suppression in deterioration of resolution has led to insufficient amount of parallax, so sufficiently great visual stereoscopic effect (sense of depth) has been difficult.

It has been found desirable to enable control of stereoscopic effect of multi-viewpoint images, so as to obtain stereoscopic effect of a more suitable level.

According to an embodiment of the present disclosure, an image processing device includes: a viewpoint separating unit configured to separate multi-viewpoint image data, including images of multiple viewpoints and representing intensity distribution of light and the direction of travel of light according to positions and pixel values of pixels, into a plurality of single-viewpoint image data for each of the individual viewpoints; and a parallax control unit configured to control amount of parallax between the plurality of single-viewpoint image data obtained by separation into individual viewpoints by the viewpoint separating unit.

The parallax control unit may control the amount of parallax by adding or subtracting a derivative signal, obtained by performing derivation of the single-viewpoint image data, to or from each single-viewpoint image data.

The parallax control unit may detect disparity, which indicates amount of parallax of an object to be controlled, and, based on the detected disparity, correct the derivative signal and controls the amount of parallax by adding or subtracting the derivative signal following correction to or from each single-viewpoint image data.

The image processing device may further include: a super-resolution processing unit configured to perform super-resolution processing where image resolution is raised to high resolution for each of the plurality of single-viewpoint image data obtained by separation into individual viewpoints by the viewpoint separating unit; with the parallax control unit controlling amount of parallax between the plurality of single-viewpoint image data of which the resolution has been raised to high resolution by the super-resolution processing unit.

The super-resolution processing unit may detect disparity which indicates amount of parallax, between each viewpoint, and perform super-resolution processing of the single-viewpoint image data, using the detected disparity.

The parallax control unit may control the amount of parallax using the disparity detected by the super-resolution processing unit.

The image processing device may further include: a noise reduction processing unit configured to perform noise reduction processing to reduce noise on each of the plurality of single-viewpoint image data, of which the resolution has been raised to high resolution by the super-resolution processing unit; with the parallax control unit controlling the amount of parallax between the plurality of single-viewpoint image data, of which noise has been reduced by the noise reduction processing unit.

The noise reduction processing unit may perform motion detection with images before and after processing, perform motion compensation on an image after processing using the detected motion vector, and calculate the arithmetic mean of the image following processing that has been subjected to motion compensation and the image before processing.

The noise reduction processing unit may use the detected motion vector to perform the noise reduction processing on each of the plurality of single-viewpoint image data.

The image processing device may further include: a super-resolution and noise reduction processing unit configured to perform, on each of the plurality of single-viewpoint image data obtained by separation into individual viewpoints by the viewpoint separating unit, super-resolution processing to raise the resolution of images to high resolution, and noise reduction processing to reduce noise; with the parallax control unit controlling the amount of parallax between the plurality of single-viewpoint image data, of which resolution has been raised to high resolution and noise has been reduced by the super-resolution and noise reduction processing unit.

The super-resolution and noise reduction processing unit may perform the noise reduction processing on each of the super-resolution processing results of the multiple single-viewpoint image data, and perform the super-resolution processing using the noise reduction processing results.

The image processing device may further include: an initial image generating unit configured to generate an initial image using an image of a frame of interest which is to be processed, and an image of a past frame processed prior to the frame of interest; with the super-resolution and noise reduction processing unit performing the super-resolution processing using the initial image generated by the initial image generating unit.

The initial image generating unit may detect motion between the image of the frame of interest and the image of the past frame, perform motion compensation of the image of the past frame using the detected motion vector, and generate the initial image using the image of the past frame subjected to motion compensation and the image of the frame of interest.

The initial image generating unit may generate the initial image using an image of a viewpoint of interest to be processed in the frame of interest, an image of the viewpoint of interest in the past frame, and an image of another viewpoint which is not the viewpoint of interest in the past frame.

The image processing device may further include: a super-resolution processing unit configured to perform super-resolution processing of the single-viewpoint image data to raise the resolution of an image to high resolution; a noise reduction processing unit configured to perform noise reduction processing to reduce noise of the single-viewpoint image data of which the resolution has been raised to high resolution by the super-resolution processing unit; and an image generating unit configured to generate the plurality of single-viewpoint image data, using the single-viewpoint image data of which the noise has been reduced by the noise reduction processing unit; with the parallax control unit controlling the amount of parallax between the plurality of single-viewpoint image data generated by the image generating unit.

The image processing device may further include: an initial image generating unit configured to generate an initial image, using an image of a frame of interest to be processed, and an image of a past frame processed prior to the frame of interest; with the super-resolution processing unit performing the super-resolution processing using the initial image generated by the initial image generating unit.

The image processing device may further include: a first storage unit configured to store the plurality of single-viewpoint image data obtained by separation into individual viewpoints by the viewpoint separating unit; a viewpoint sequential readout unit configured to read out the plurality of single-viewpoint image data stored in the first storage unit, one viewpoint at a time; a super-resolution processing unit configured to perform super-resolution processing to raise the resolution of the single-viewpoint image data read out from the viewpoint sequential readout unit to high resolution; a noise reduction processing unit configured to perform noise reduction processing to reduce the noise of the single-viewpoint image data of which the resolution has been raised to high resolution by the super-resolution processing unit; and a second storage unit configured to store the single-viewpoint image data of which noise has been reduced by the noise reduction processing unit; with the parallax control unit controlling the amount of parallax between the plurality of single-viewpoint image data stored in the second storage unit.

According to an embodiment of the present disclosure, an image processing method of an image processing device includes: a viewpoint separating unit separating multi-viewpoint image data, including images of multiple viewpoints and representing intensity distribution of light and the direction of travel of light according to positions and pixel values of pixels, into a plurality of single-viewpoint image data for each of the individual viewpoints; and a parallax control unit controlling amount of parallax between the plurality of single-viewpoint image data obtained by separation into individual viewpoints.

According to an embodiment of the present disclosure, a computer-readable recording medium in which is recorded a program causes a computer to function as: a viewpoint separating unit configured to separate multi-viewpoint image data, including images of multiple viewpoints and representing intensity distribution of light and the direction of travel of light according to positions and pixel values of pixels, into a plurality of single-viewpoint image data for each of the individual viewpoints; and a parallax control unit configured to control amount of parallax between the plurality of single-viewpoint image data obtained by separation into individual viewpoints by the viewpoint separating unit.

According to an embodiment of the present disclosure, a program causes a computer to function as: a viewpoint separating unit configured to separate multi-viewpoint image data, including images of multiple viewpoints and representing intensity distribution of light and the direction of travel of light according to positions and pixel values of pixels, into a plurality of single-viewpoint image data for each of the individual viewpoints; and a parallax control unit configured to control amount of parallax between the plurality of single-viewpoint image data obtained by separation into individual viewpoints by the viewpoint separating unit.

According to an embodiment of the present disclosure, an multi-viewpoint image data, including images of multiple viewpoints and representing intensity distribution of light and the direction of travel of light according to positions and pixel values of pixels, is separated into a plurality of single-viewpoint image data for each of the individual viewpoints, and amount of parallax between the plurality of single-viewpoint image data obtained by separation into individual viewpoints is controlled.

According to the present disclosure, an image can be processed. In particular, stereoscopic effect of a multi-viewpoint image can be controlled.

BRIEF DESCRIPTION OF THE DRAWINGS

FIG. 45 is a block diagram illustrating a primary configuration example of a personal computer.

DETAILED DESCRIPTION OF EMBODIMENTS

Embodiments for carrying out the present disclosure will now be described. Description will proceed in the following order.

1. First Embodiment (Image Processing Device)
2. Second Embodiment (Imaging Apparatus)
3. Third Embodiment (Personal Computer)

1. First Embodiment

Light Field Camera

Figure 1:
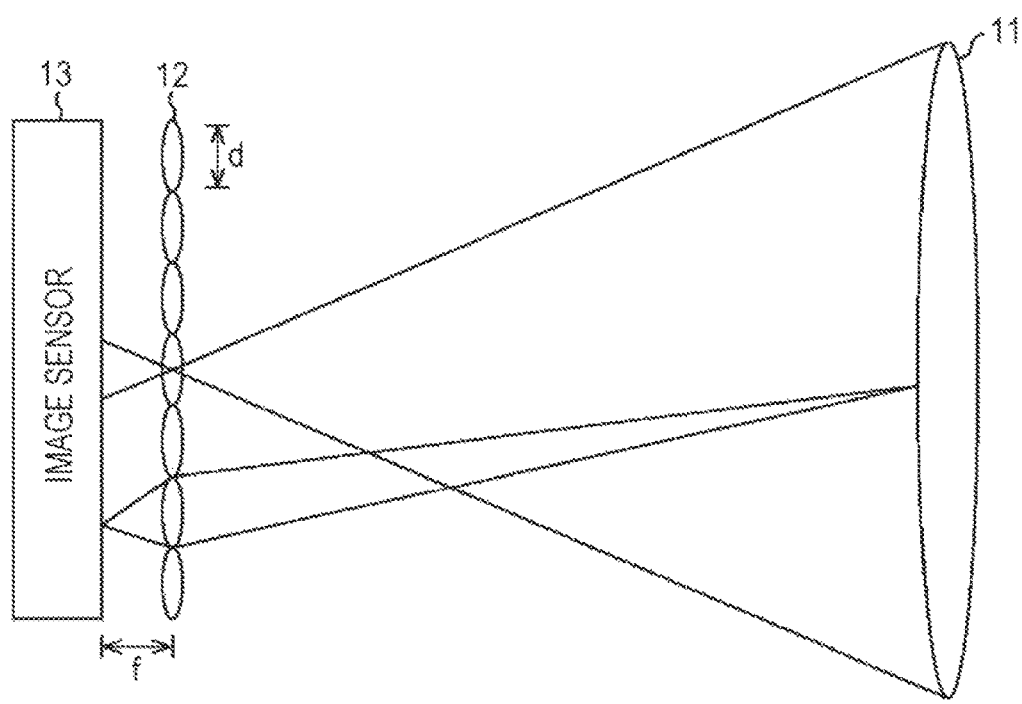
FIG. 1 is a diagram for describing a configuration example of a light field camera.

First, description will be made of a light field camera. A light field camera is an imaging apparatus using a technique called light field photography, such as described in Japanese Unexamined Patent Application Publication No. 2009-165115, for example. As illustrated in FIG. 1, a light field camera includes, for example, a main lens 11, a microlens array 12, and an image sensor 13 which receives incident light via the main lens 11 and microlens array 12 and performs photoelectric conversion thereof. As illustrated in FIG. 1, the microlens array 12 is provided at the focal position of the main lens 11, and the image sensor 13 is provided at the focal position of the microlens array 12.

The microlenses of the microlens array 12 are each provided as to multiple pixels of the image sensor 13. An example of the relation between pixel groups of the image sensor 13 and the microlens array 12 is illustrated to the upper side of FIG. 2.

Figure 2:
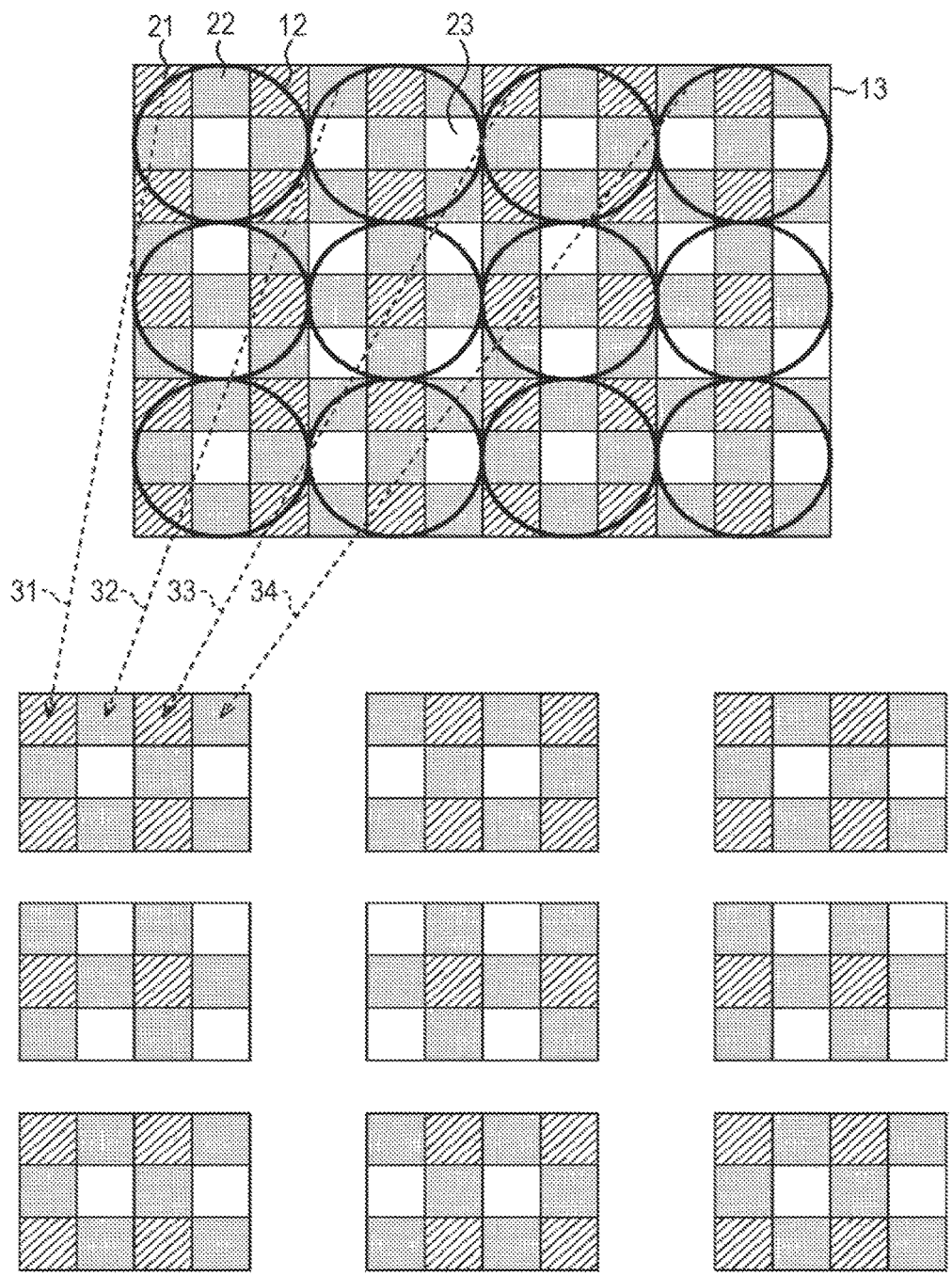
FIG. 2 is a diagram for describing an example of the way in which a multi-viewpoint image is generated.

In FIG. 2, each square represents a pixel of the image sensor 13, and the circles represent the microlenses of the microlens array 12. For example, a pixel 21 indicated by hatching represents a blue pixel (B) where a blue filter is provided, a pixel 22 indicated by shading represents a green pixel (G) where a green filter is provided, and a pixel 23 indicated by being blank represents a red pixel (R) where a red filter is provided. Also, in FIG. 2, the image sensor 13 is illustrated as being nine pixels vertically by twelve pixels horizontally, and the microlens array 12 is illustrated as being made up of three microlenses vertically and four horizontally. As a matter of course, the number of microlenses which the microlens array 12 has, the number of pixels of the image sensor 13, and the placement of color filters, can be determined as suitable.

In the case of the example illustrated to the upper side of FIG. 2, one microlens is assigned to every three by three pixels (nine pixels) of the image sensor 13. In the example in FIG. 2, each of the pixels corresponding to one microlens, i.e., each of the three by three pixels upon which one circle is superimposed, receives incident light from different directions from each other by that microlens. That is to say, in the case of the example in FIG. 2, light from nine directions is received by the nine pixels. This holds true for the pixels corresponding to the other microlenses as well.

Due to such a configuration, images of nine viewpoints are included in the image data image obtained by the image sensor 13. For example, as indicated by arrows 31 through 34 in FIG. 2, pixel values of pixels at the same position in each microlens are collected, whereby image data obtained by performing photoelectric conversion of incident light from the same direction (i.e., an image of one certain direction) can be obtained.

In the case of the example in FIG. 2, such image processing (viewpoint separation) enables nine images each with different viewpoints to be obtained, as illustrated to the lower side of FIG. 2. Note that the number of pixels of the image sensor 13 corresponding to each microlens is optional. That is to say, with the image sensor 13, viewpoint images of a number equal to the number of pixels corresponding to each microlens, are obtained.

A light field camera allows imaged images to be easily obtained which include images of multiple viewpoints, which can be divided into images of each viewpoint at an optional timing, and from which can be extracted an image of a desired viewpoint.

Image Processing Device

Image processing to generate images regarding which 3D display can be made (a right eye image and left eye image) from an imaged image obtained from such a light field camera (multi-viewpoint image) will now be described.

Figure 3:
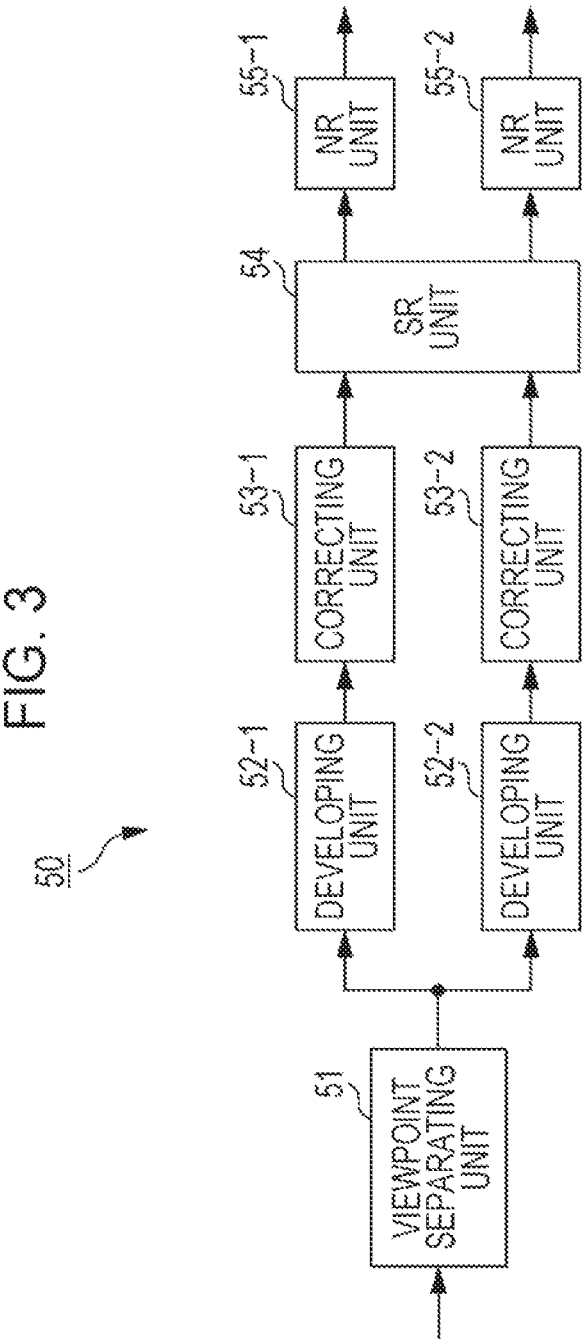
FIG. 3 is a block diagram illustrating a primary configuration example of an image processing device.

FIG. 3 is a block diagram illustrating a primary configuration example of the image processing device. An image processing device 50 illustrated in FIG. 3 performs image processing on an imaged image imaged by and obtained from a light field camera (multi-viewpoint image) such as described with reference to FIGS. 1 and 2, and generates images (a right eye image and left eye image) for stereoscopic display (so-called 3D display).

As shown in FIG. 3, the image processing device 50 includes a viewpoint separating unit 51, a developing unit 52-1 and developing unit 52-2, a correcting unit 53-1 and correcting unit 53-2, an SR (Super Resolution) unit 54, and an NR unit 55-1 and NR unit 55-2. In the following description, in the event that the developing unit 52-1 and developing unit 52-2 do not have to be distinguished from each other, these will be simply referred to as "developing unit 52". Also, in the event that the correcting unit 53-1 and correcting unit 53-2 do not have to be distinguished from each other, these will be simply referred to as "correcting unit 53". Further, in the event that the NR unit 55-1 and NR unit 55-2 do not have to be distinguished from each other, these will be simply referred to as "NR unit 55".

The viewpoint separating unit 51 is input with a multi-viewpoint imaged image obtained by a light field camera such as described above. For example, a moving image is shot with a light field camera, and the frame images of the moving image are sequentially input to the viewpoint separating unit 51. From these input images, the viewpoint separating unit 51 generates right eye images and left eye images for stereoscopic display. For example, with the light field camera, three pixels vertically by three pixels horizontally are assigned to each microlens as in the example in FIG. 2, and with the input image as well, three pixels vertically by three pixels horizontally make up one set, and each set is also configured of images of nine different viewpoints. In this case, the viewpoint separating unit 51 extracts and collects the left and right pixels of the middle tier from each three-pixel-by-three-pixel set, for example, thereby generating a right eye image (viewpoint R image) and a left eye image (viewpoint L image) for stereoscopic display. The viewpoint separating unit 51 supplies the generated viewpoint R image to the developing unit 52-1, and supplies the viewpoint L image to the developing unit 52-2. In the event that the input images are the frame images of a moving image, the viewpoint separating unit 51 performs the above-described processing on each of the frame images.

The developing unit 52 performs developing processing for converting image data (RAW data) supplied from the viewpoint separating unit 51 into a format according to a predetermined standard. The developing unit 52-1 develops the data of the viewpoint R image and supplies to the correcting unit 53-1. The developing unit 52-2 develops the data of the viewpoint L image and supplies to the correcting unit 53-2. In the event that the input images are the frame images of a moving image, the developing unit 52 performs the above-described developing processing on each of the frame images.

The correcting unit 53 subjects the developed image data to optional image correction, such as for example, correction of exposure, luminance, contrast, saturation, sharpness, and so forth. The correcting unit 53-1 corrects the data of the viewpoint R image, and supplies this to the SR unit 54. The correcting unit 53-2 corrects the data of the viewpoint L image, and supplies this to the SR unit 54. In the event that the input images are the frame images of a moving image, the correcting unit 53 performs the above-described correction processing on each of the frame images.

As can be seen from the example in FIG. 2, the images subjected to viewpoint separation have lower resolution than the imaged image. That is to say, the viewpoint R image and viewpoint L image are low-resolution images. Accordingly, the SR unit 54 performs super-resolution processing on the supplied viewpoint R image and viewpoint L image so that the resolution thereof is high resolution. The SR unit 54 makes high-resolution the viewpoint R image and viewpoint L image by using multiple frame image, or by using images of multiple viewpoints (i.e., using multiple images). The SR unit 54 supplies the viewpoint R image data of which the resolution has been raised to high resolution to the NR unit 55-1. Also, the SR unit 54 supplies the viewpoint L image data of which the resolution has been raised to high resolution to the NR unit 55-2. The SR unit 54 performs such super-resolution processing on each frame image.

In the case of a light field camera, light via the microlens is input to each pixel, so there may be pixels which do not receive sufficient light. Accordingly, an imaged image obtained by the light field camera tends to have a greater amount of noise. Accordingly, the NR unit 55 performs noise reduction processing on the image of which the resolution has been raised to high resolution, so as to reduce noise. The NR unit 55-1 performs noise reduction processing on the viewpoint R image data, and output the processing result thereof (data of the viewpoint R image that has been subjected to noise reduction processing). The NR unit 55-2 performs noise reduction processing on the viewpoint L image data, and output the processing result thereof (data of the viewpoint L image that has been subjected to noise reduction processing). In the event that the input images are the frame images of a moving image, the NR unit 55 performs the above-described noise reduction processing on each of the frame images.

SR Unit

Figure 4:
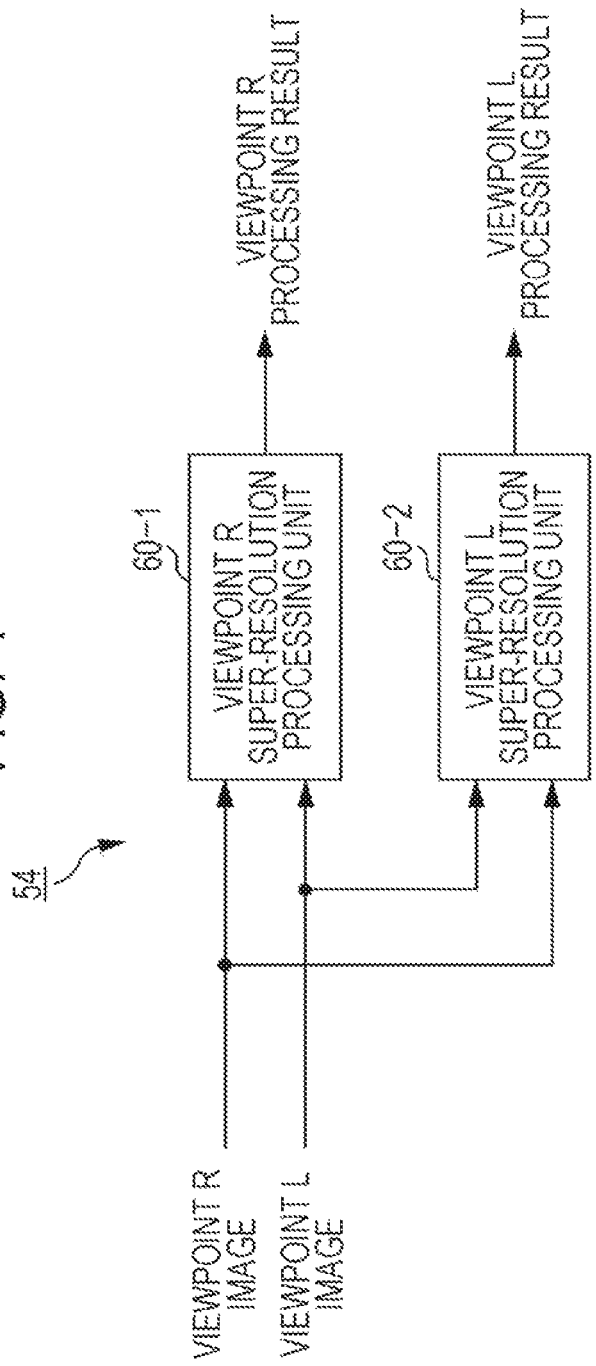
FIG. 4 is a block diagram illustrating a primary configuration example of an SR (super-resolution) unit.

Next, the SR unit 54 will be described. FIG. 4 is a block diagram illustrating a primary configuration example of the SR unit 54. As shown in FIG. 4, the SR unit 54 includes a viewpoint R super-resolution processing unit 60-1 which performs super-resolution processing of data of the viewpoint R image, and a viewpoint L super-resolution processing unit 60-2 which performs super-resolution processing of data of the viewpoint L image. In the following description, in the event that the viewpoint R super-resolution processing unit 60-1 and viewpoint L super-resolution processing unit 60-2 do not have to be distinguished from each other, these will be simply referred to as "super-resolution processing unit 60".

As shown in FIG. 4, the SR unit 54 performs super-resolution processing on both the input viewpoint R image and viewpoint L image, and outputs the processing result (viewpoint R processing result and viewpoint L processing result) of each. While the processing of each is basically the same, the viewpoint R super-resolution processing unit 60-1 performs super-resolution processing with the viewpoint R image as an initial image (standard image), and the viewpoint L super-resolution processing unit 60-2 performs super-resolution processing with the viewpoint L image as an initial image (standard image).

Super-Resolution Processing Unit

Figure 5:
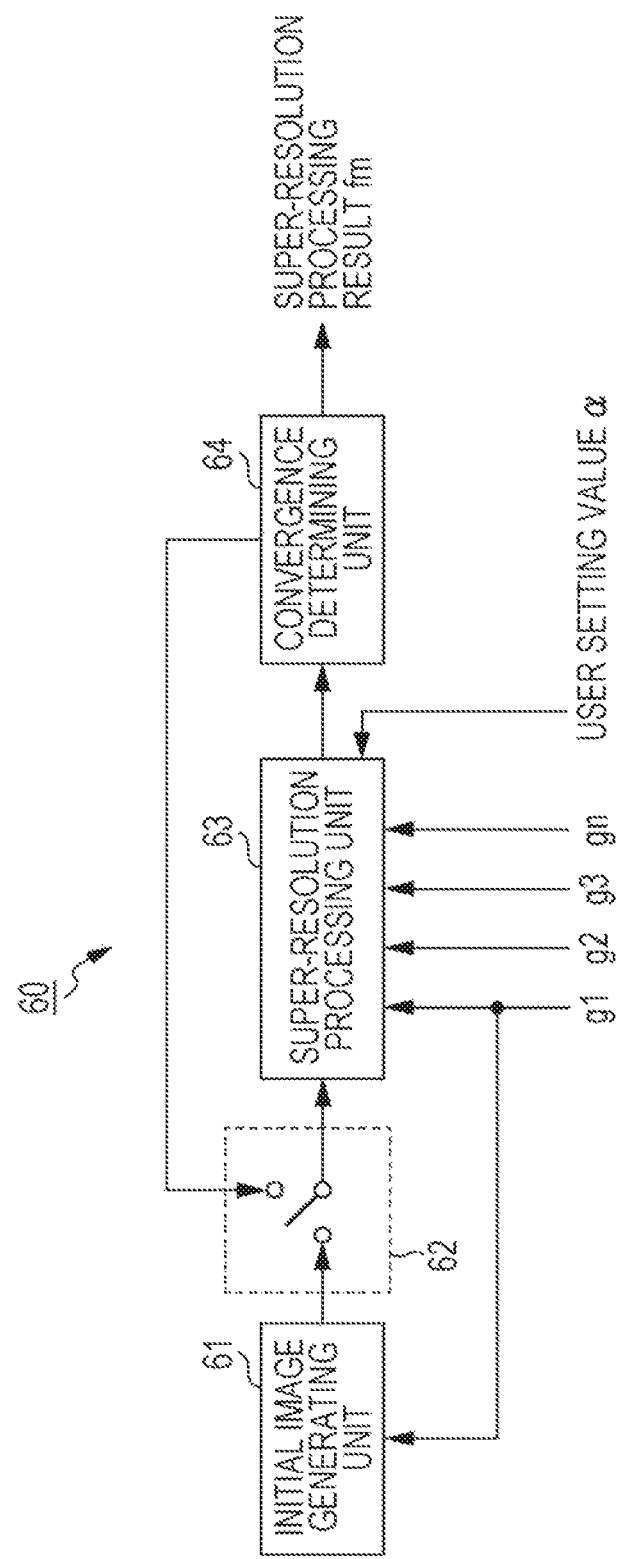
FIG. 5 is a block diagram illustrating a primary configuration example of a super-resolution processing unit.

FIG. 5 is a block diagram illustrating a primary configuration example of the super-resolution processing unit 60 in FIG. 4. As shown in FIG. 5, the super-resolution processing unit 60 has, or more precisely, the viewpoint R super-resolution processing unit 60-1 and viewpoint L super-resolution processing unit 60-2 each have, an initial image generating unit 61, a switch 62, a super-resolution processing unit 63, and a convergence determining unit 64.

The super-resolution processing unit 60 is input with multiple low-resolution images (g1, g2, ... gn), and outputs one high-resolution image. These multiple low-resolution images (g1, g2, ... gn) may be images of multiple frames of a current frame at a viewpoint of interest to be processed (frame of interest) and frames in the past from this frame of interest (past frames), or may be multiple viewpoint images of the frame of interest, including the viewpoint of interest. The low-resolution image g1 is the image of the viewpoint of interest in the frame of interest.

The initial image generating unit 61 sets the low-resolution image g1 as the initial value of the super-resolution processing result (initial image) and stores this.

The switch 62 switches the supply source of images supplied to the super-resolution processing unit 63. With the super-resolution processing unit 63, the same processing is repeatedly executed, with the switch 62 connecting the output of the initial image generating unit 61 to the super-resolution processing unit 63 just the first time of execution and connecting the output of the convergence determining unit 64 to the super-resolution processing unit 63 all other times. That is to say, the initial image set at the initial image generating unit 61 (i.e., the low-resolution image g1) is supplied to the super-resolution processing unit 63 just the first time of repeated processing at the super-resolution processing unit 63, and from the second time on, the processing result from the previous time is supplied to the super-resolution processing unit 63.

The super-resolution processing unit 63 uses n low-resolution images g1, g2, and so on through gn, and also a user setting value α, to perform super-resolution processing of images supplied from the switch 62, and supplies the processing results (high-resolution images) thereof to the convergence determining unit 64.

The convergence determining unit 64 determines whether sufficient convergence has been performed with regard to the super-resolution processing results (high-resolution images) supplied from the super-resolution processing unit 63. In the event that determination is made that sufficient convergence has been performed with regard to a super-resolution processing result, the convergence determining unit 64 externally outputs the super-resolution processing result (high-resolution image), and stops processing. Also, in the event that determination is made that sufficient convergence has not been performed, the convergence determining unit 64 supplies the super-resolution processing result (high-resolution image) to the switch 62. In this case, super-resolution processing is performed by the super-resolution processing unit 63 on the processing result from the previous time (high-resolution image).

Super-Resolution Processing Unit

Figure 6:
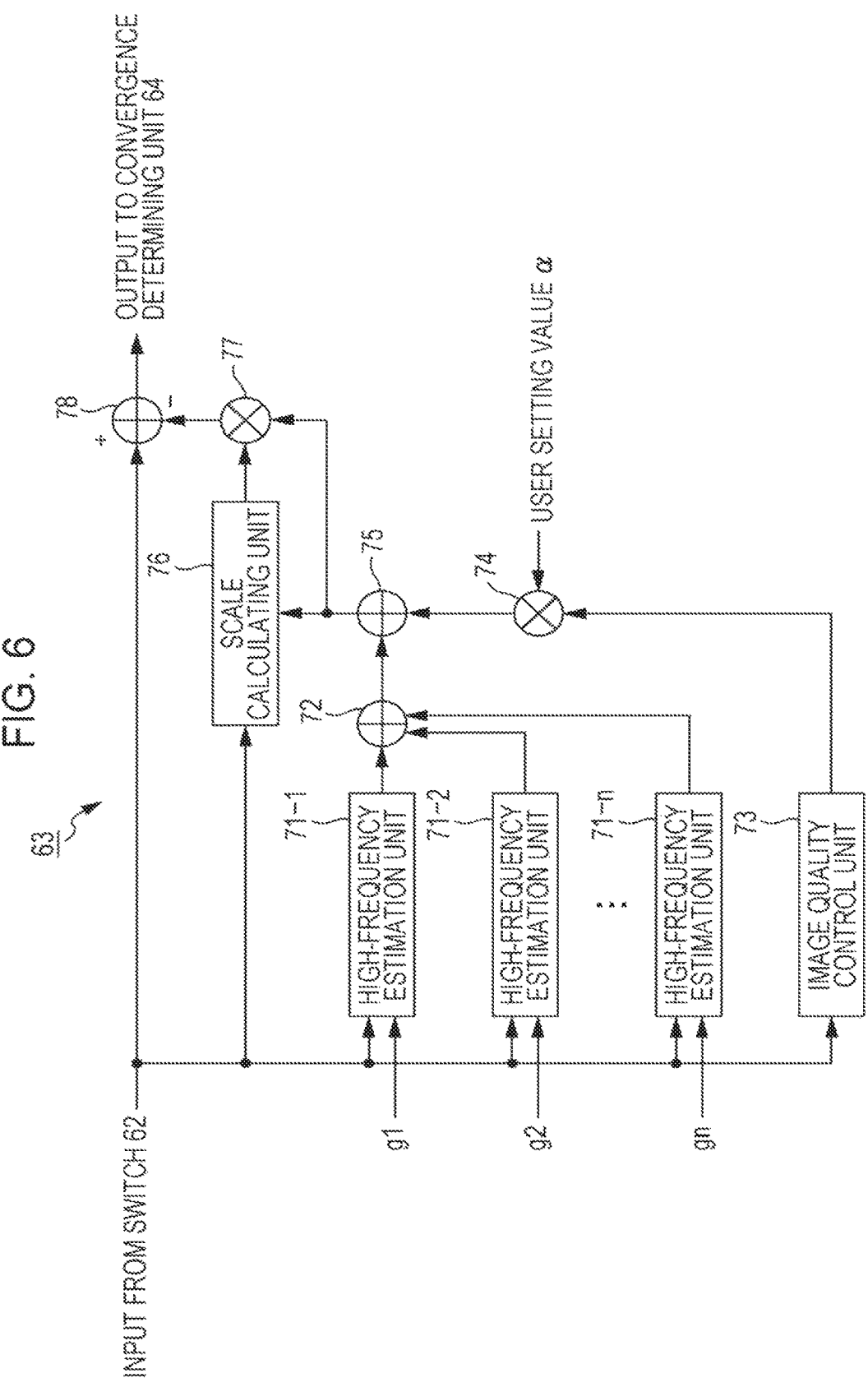
FIG. 6 is a block diagram illustrating a primary configuration example of a super-resolution processing unit.

FIG. 6 is a block diagram illustrating a primary configuration example of the super-resolution processing unit 63 in FIG. 5. As shown in FIG. 6, the super-resolution processing unit 63 includes a high-frequency estimation unit 71-1 through high-frequency estimation unit 71-n, and adding unit 72, an image quality control unit 73, a multiplier 74, an adding unit 75, a scale calculating unit 76, a multiplier 77, and a subtracting unit 78. In the following description, in the event that the high-frequency estimation unit 71-1 through high-frequency estimation unit 71-n do not have to be distinguished from each other, these will be simply referred to as "high-frequency estimation unit 71".

The high-frequency estimation unit 71-1 through high-frequency estimation unit 71-n each perform calculation of correction values for restoring the high-frequency component of the image, using an image out of the low-resolution images g1 through gn corresponding to itself, and an image of reconstruction partway results supplied from the switch 62 (including the initial image). For example, the high-frequency estimation unit 71-1 calculates correction values using an image of reconstruction partway results (including the initial image), and the low-resolution image g1. The high-frequency estimation unit 71-2 calculates correction values using the image of reconstruction partway results (including the initial image), and the low-resolution image g2. The high-frequency estimation unit 71-n calculates correction values using the image of reconstruction partway results (including the initial image), and the low-resolution image gn. The high-frequency estimation unit 71-1 through high-frequency estimation unit 71-n supply their respective processing results to the adding unit 72. The adding unit 72 adds the processing results of the high-frequency estimation unit 71-1 through high-frequency estimation unit 71-n, and supply this to the adding unit 75.

The image quality control unit 73 uses the image of reconstruction partway results (including the initial image) supplied from the switch 62 to calculate control values for pixel values, to achieve an ideal image based on a prior probability model of the image. The image quality control unit 73 supplies the processing result to the multiplier 74.

The multiplier 74 multiples the output of the image quality control unit 73 by the user setting value α. Multiplying by the user setting value α allows the user to optionally control the final image quality of the image. Note that an arrangement may be made where a predetermined fixed value is multiplied instead of the user setting value α, and further, this multiplication may be omitted completely. The multiplier 74 supplies the multiplication result to the adding unit 75.

The adding unit 75 adds the multiplication result supplied from the multiplier 74 to the addition result supplied from the adding unit 72. The adding unit 75 supplies this addition result to the scale calculating unit 76 and multiplier 77.

The scale calculating unit 76 determines a scale value for the final control value, using the image of reconstruction partway results (including the initial image) supplied from the switch 62, and the pixel value control signal (control value) supplied from the adding unit 75. The scale calculating unit 76 supplies the determined scale value to the multiplier 77.

The multiplier 77 multiplies the pixel value control signal (control value) supplied from the adding unit 75 by the scale value supplied from the scale calculating unit 76, and supplies the multiplication result to the subtracting unit 78. The subtracting unit 78 subtracts the multiplication result supplied from the multiplier 77, from the image of reconstruction partway results (including the initial image) supplied from the switch 62, and supplies the subtraction result to the convergence determining unit 64.

High-Frequency Estimation Unit

The convergence determining unit 64 (FIG. 5) determines whether or not the super-resolution convergence expression in the following Expression (1), for example, will hold. That is to say, the super-resolution processing unit 63 (FIG. 5) calculates the right side of the following Expression (1).

$$f_{m+1} = f_m - \beta \frac{\partial E(f_m)}{\partial f} \quad (1)$$
$$= f_m - \beta \left( \sum_{k=1}^{K} W_k^T H^T D^T (DHW_k f_m - g_k) + \alpha L^T L f_m \right)$$

The high-frequency estimation units 71 each perform processing equivalent to the portion within the summation.

Figure 7:
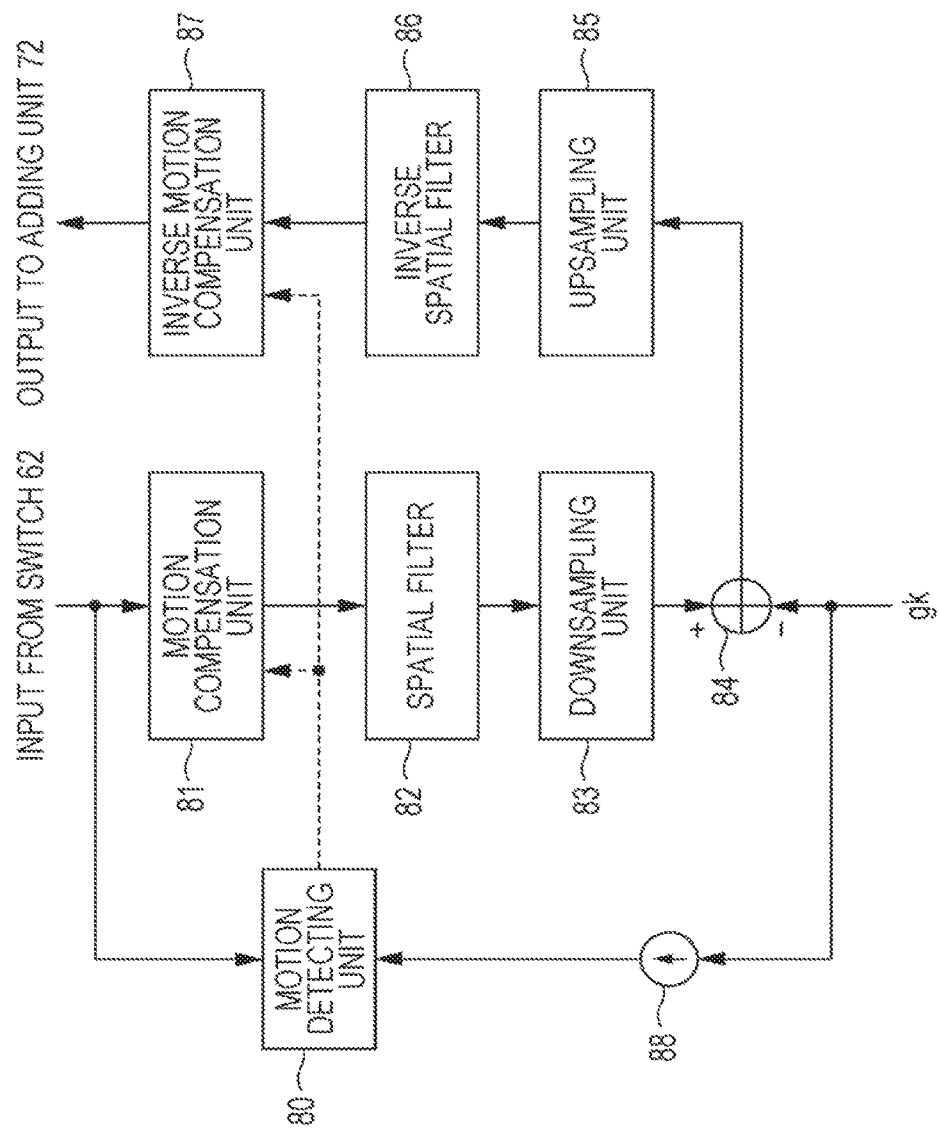
FIG. 7 is a block diagram illustrating a primary configuration example of a high-frequency estimation unit.

FIG. 7 is a block diagram illustrating a primary configuration example of a high-frequency estimation unit 71 in FIG. 6. As shown in FIG. 7, the high-frequency estimation unit 71 has a motion detecting unit 80, a motion compensation unit 81, a spatial filter 82, a downsampling unit 83, a subtracting unit 84, an upsampling unit 85, an inverse spatial filter 86, an inverse motion compensation unit 87, and a resolution conversion unit 88.

The motion detecting unit 80 detects motion (motion vector) between the high-resolution image supplied from the switch 62, and a low-resolution image gk (where 1≤k≤n). The low-resolution image gk is supplied from the correcting unit 53, or from a buffer (unshown) for holding low-resolution images supplied from the correcting unit 53. These images have different resolution from each other. Accordingly, for the sake of convenience, the low-resolution image gk is upsampled by the resolution conversion unit 88 to the resolution of the high-resolution image supplied from the switch 62, and then supplied to the motion detecting unit 80. The motion detecting unit 80 supplies the detected motion vector to the motion compensation unit 81 and inverse motion compensation unit 87.

The motion compensation unit 81 uses the motion vector supplied from the motion detecting unit 80 to perform motion compensation on the high-resolution image supplied from the switch 62. This processing corresponds to the computation of Wk in the above Expression (1). The motion compensation unit 81 supplies the motion compensation results (the high-resolution image regarding which positioning has been performed) to the spatial filter 82.

The spatial filter 82 performs processing of simulating deterioration in spatial resolution regarding the high-resolution image supplied from the motion compensation unit 81. Note that here, convolution is performed regarding the image, with a pre-measured point spread function as a filter. This processing corresponds to the computation of H in the above Expression (1). The spatial filter 82 supplies the high-resolution image that has been subjected to filter processing to the downsampling unit 83.

The downsampling unit 83 downsamples the high-resolution image supplied from the spatial filter 82 to the resolution of the input image (low-resolution image gk). This processing corresponds to the computation of D in the above Expression (1). The downsampling unit 83 supplies the high-resolution image of which the resolution has been lowered (i.e., low-resolution image) to the subtracting unit 84.

The subtracting unit 84 subtracts the low-resolution image gk from the low-resolution image supplied from the downsampling unit 83, and supplies the subtraction results thereof (difference image) to the upsampling unit 85.

The upsampling unit 85 performs upsampling of the difference image supplied from the subtracting unit 84 so as to correspond to the downsampling performed by the downsampling unit 83. That is to say, the resolution of the difference image is raised to the resolution of the high-resolution image supplied from the switch 62. This processing corresponds to the computation of Dt in the above Expression (1), and is upsampling processing with zero insertion. The upsampling unit 85 supplies the difference image of which the resolution has been raised to high resolution to the inverse spatial filter 86.

The inverse spatial filter 86 performs calculation of correlation of the high-resolution difference image supplied from the upsampling unit 85 as to the point spread function PSF used at the spatial filter 82. This processing corresponds to the computation of Ht in the above Expression (1). The inverse spatial filter 86 supplies this high-resolution difference image that has been subjected to inverse spatial filter processing to the inverse motion compensation unit 87.

The inverse motion compensation unit 87 uses the motion vector supplied from the motion detecting unit 80 to perform positioning of the difference image supplied from the inverse spatial filter 86 in the opposite direction as to that of the motion compensation performed by the motion compensation unit 81, i.e., inversion motion compensation. That is to say, this inverse compensation offsets the positioning by the motion compensation unit 81. The inverse motion compensation unit 87 supplies the difference mage subjected to this inverse motion compensation to the adding unit 72.

The resolution conversion unit 88 upsamples the low-resolution image gk supplied thereto to the resolution of the high-resolution image supplied from the switch 62. The resolution conversion unit 88 then supplies this upsampled low-resolution image gk to the motion detecting unit 80.

Image Quality Control Unit

Figure 8:
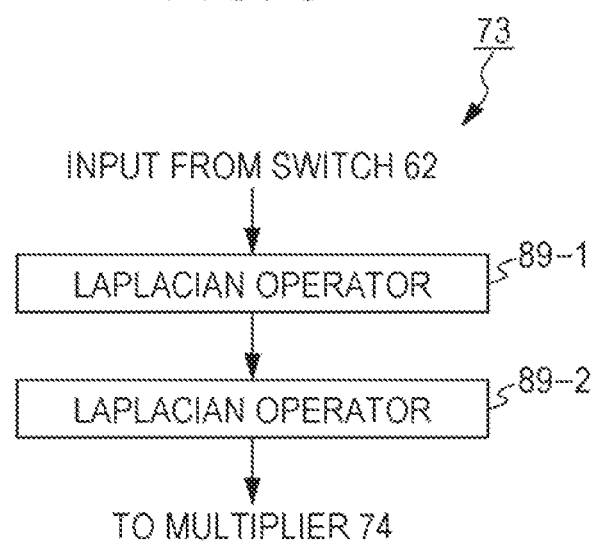
FIG. 8 is a block diagram illustrating a primary configuration example of an image quality control unit.

The image quality control unit 73 performs processing corresponding to the portion of LTLfm at the second term in the right side of the above Expression (1). FIG. 8 is a block diagram illustrating a primary configuration example of the image quality control unit 73 shown in FIG. 6. As shown in FIG. 8, the image quality control unit 73 has a Laplacian operator 89-1 and Laplacian operator 89-2. In the following description, in the event that the Laplacian operator 89-1 and Laplacian operator 89-2 do not have to be distinguished from each other, these will be simply referred to as "Laplacian operator 89".

The Laplacian operator 89-1 and Laplacian operator 89-2 which are serially connected are processing units which are both the same, and perform the same processing. That is to say, the Laplacian operator 89 performs Laplacian operation on the high-resolution image supplied from the switch 62 twice. The Laplacian operator 89 which has performed processing twice supplies the processing result to the multiplier 74.

NR Unit

Figure 9:
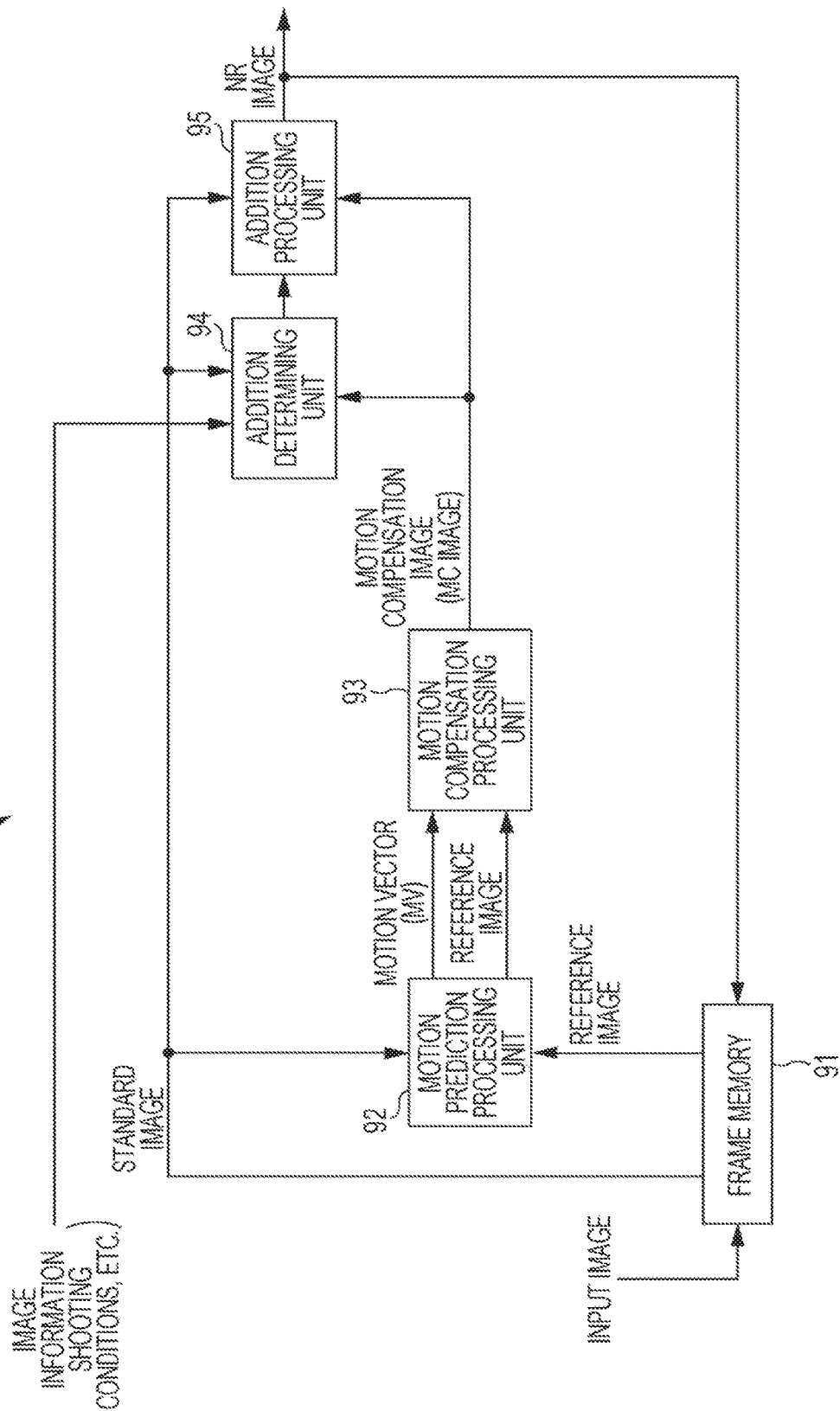
FIG. 9 is a block diagram illustrating a primary configuration example of an NR (noise reduction) unit.

Next, the NR unit 55 will be described. FIG. 9 is a block diagram illustrating a primary configuration example of the NR unit 55 shown in FIG. 3. As shown in FIG. 9, the NR unit 55 includes frame memory 91, a motion prediction processing unit 92, a motion compensation processing unit 93, an addition determining unit 94, and an addition processing unit 95.

The frame memory 91 stores the input image supplied from the SR unit 54 that has been subjected to super-resolution processing, and an image supplied from the addition processing unit 95 that has been subjected to noise reduction processing (hereinafter also referred to as "NR image"). At a predetermined timing, or based on a request from another unit, the frame memory 91 supplies the NR image stored therein to the motion prediction processing unit 92, an addition determining unit 94, and an addition processing unit 95, as a reference image. Also, the frame memory 91 supplies the input image stored therein to the motion prediction processing unit 92 as a reference image, either at a predetermined timing or under request from another.

The motion prediction processing unit 92 performs motion prediction using the standard image and reference image supplied from the frame memory 91, and detects a motion vector between the images. The motion prediction processing unit 92 supplies the detected motion vector (hereinafter, also referred to simply as "MV") and the reference image to the motion compensation processing unit 93.

The motion compensation processing unit 93 performs motion compensation of the reference image supplied from the motion prediction processing unit 92, using the motion vector supplied from the motion prediction processing unit 92, thereby generating a motion compensation image (hereinafter also referred to as "MC image"). The motion compensation processing unit 93 supplies the motion compensation image to the an addition determining unit 94 and addition processing unit 95.

The an addition determining unit 94 obtains image information regarding the image to be processed, such as shooting conditions and so forth, from outside the NR unit 55. The an addition determining unit 94 performs addition determining processing for determining pixels regarding which the standard image supplied from the frame memory 91 and the motion compensation image supplied from the motion compensation processing unit 93 are to be added, based on the image information. The an addition determining unit 94 supplies the addition determination results thereof to the addition processing unit 95 as an addition determination map.

The addition processing unit 95 adds the standard image supplied from the frame memory 91 and the motion compensation image supplied from the motion compensation processing unit 93, following the addition determination map supplied from the an addition determining unit 94. The addition processing unit 95 outputs the addition processing results (the NR processing results, i.e., an NR image), and also supplies this to the frame memory 91 so as to be stored.

Flow of Noise Reduction Processing

Figure 10:
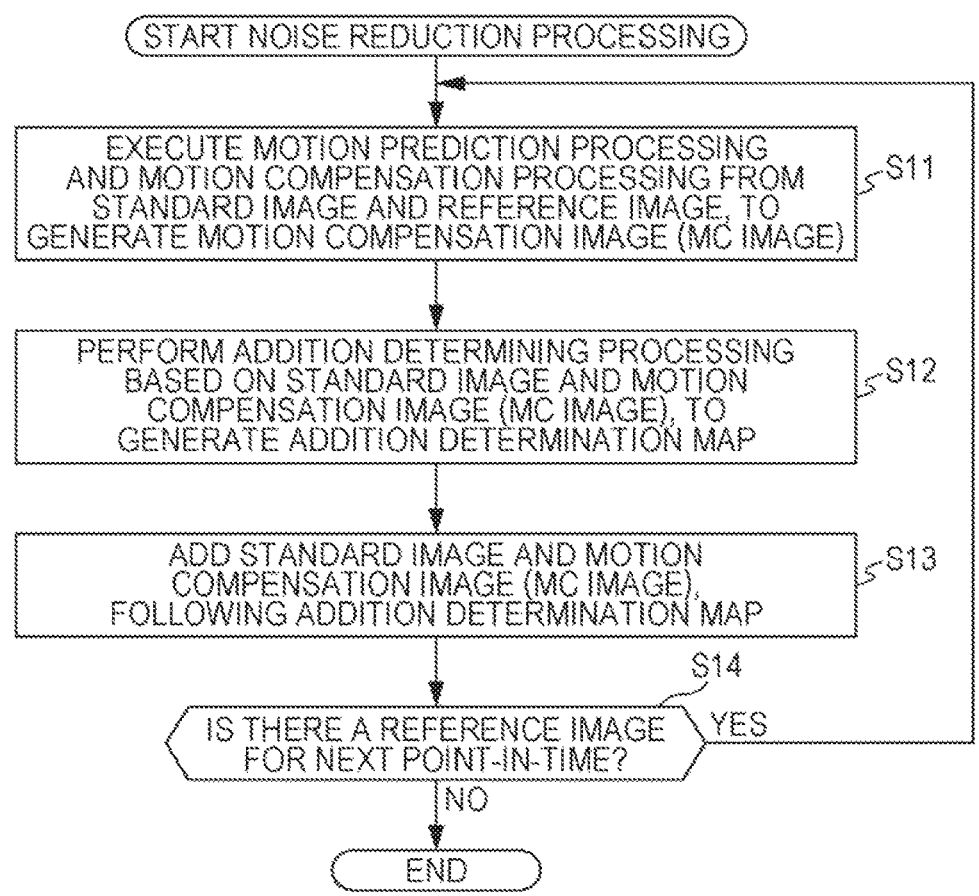
FIG. 10 is a flowchart for describing an example of the flow of noise reduction processing.

FIG. 10 is a flowchart for describing an example of the flow of noise reduction processing executed by this NR unit 55. Upon noise reduction processing being started, in step S11, the motion prediction processing unit 92 performs motion prediction processing using the standard image and reference image. The motion compensation processing unit 93 performs motion compensation on the reference image using the motion vector that has been detected, and generates a motion compensation image.

In step S12, the addition determining unit 94 performs addition determination processing based on the standard image and motion compensation image, and generates an addition determination map.

In step S13, the addition processing unit 95 adds the standard image and motion compensation image following the addition determination map generated in step S12.

In step S14, the addition processing unit 95 determines whether or not a reference image of the next point-in-time exists, and in the event that positive determination is made, the flow returns to step S11 and subsequent processing is repeated. That is to say, the NR unit 55 executes the processing of steps S11 through S13 as to each frame image, and performs noise reduction as to each frame image.

In the event that determination is made in step S14 that no reference image of the next point-in-time exists (i.e., that non new input image will be input), the noise reduction processing is ended.

Figure 11:
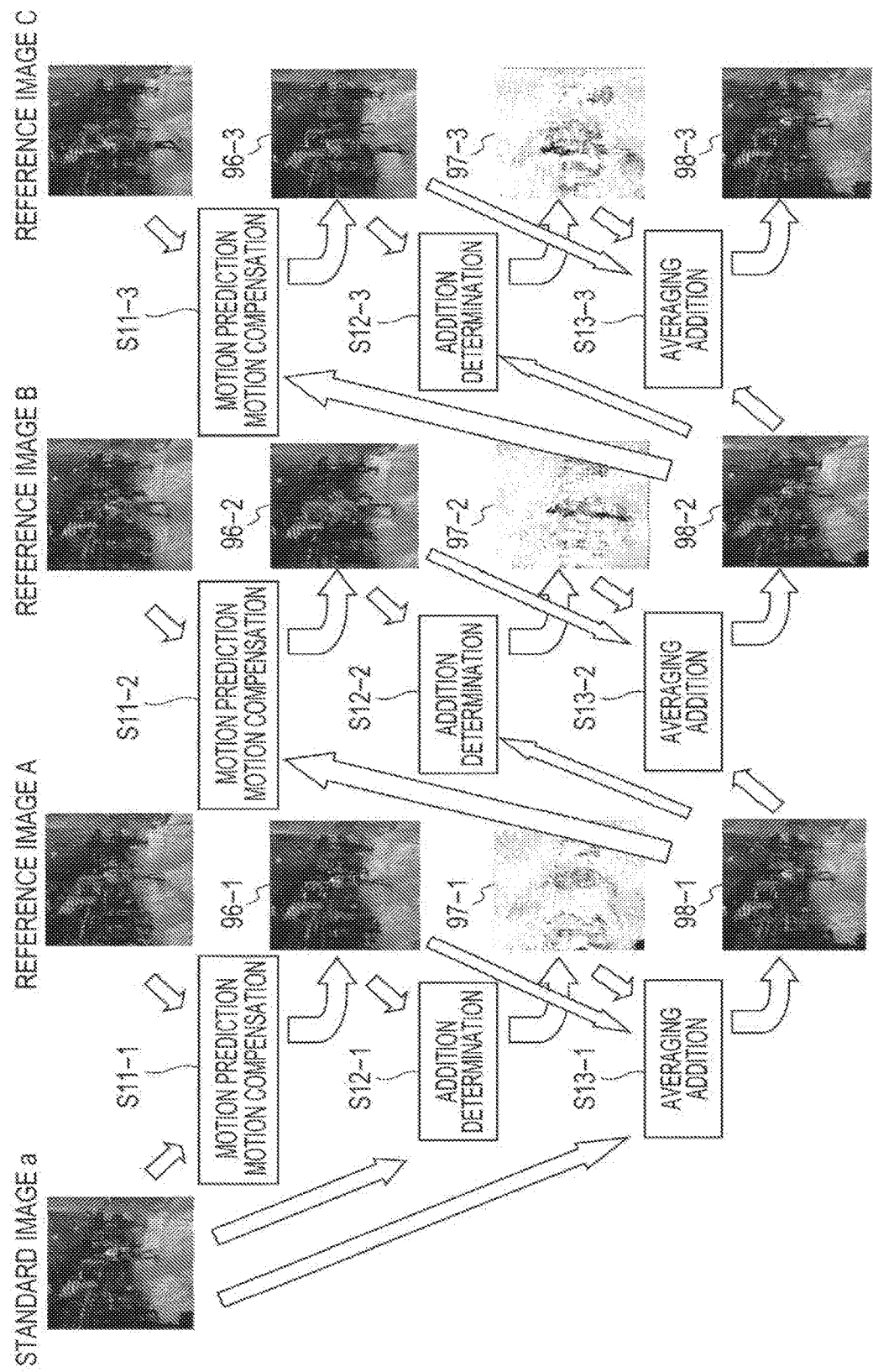
FIG. 11 is a diagram for describing an example of the way in which noise reduction processing is performed.

A more specific example will be described with reference to FIG. 11. For example, an NR image from one frame back, which will be referred to as "standard image a", and the input image of the frame of interest, which will be referred to as "reference image A", are used to perform motion prediction and motion compensation (step S11-1). This generates a motion compensation image 96-1. Addition determination processing is then performed using the standard image a and motion compensation image 96-1 (step S12-1). This generates an addition determination map 97-1. Next, the arithmetic mean of the standard image a and the motion compensation image 96-1 is calculated following the addition determination map 97-1 (step S13-1). Thus, an NR image 98-1 is generated and output. This NR image 98-1 is used for the NR processing as to the next frame, as standard image b.

When the frame of interest transitions to the next frame, the input image of the frame of interest, which will be referred to as "reference image B", and the standard image b, are used to perform motion prediction and motion compensation (step S11-2). This generates a motion compensation image 96-2. Addition determination processing is then performed using the standard image b and motion compensation image 96-2 (step S12-2). This generates an addition determination map 97-2. Next, the arithmetic mean of the standard image b and the motion compensation image 96-2 is calculated following the addition determination map 97-2 (step S13-2). Thus, an NR image 98-2 is generated and output. This NR image 98-2 is used for the NR processing as to the next frame, as standard image c.

When the frame of interest transitions to the next frame, the input image of the frame of interest, which will be referred to as "reference image C", and the standard image c, are used to perform motion prediction and motion compensation (step S11-3). This generates a motion compensation image 96-3. Addition determination processing is then performed using the standard image c and motion compensation image 96-3 (step S12-3). This generates an addition determination map 97-3. Next, the arithmetic mean of the standard image c and the motion compensation image 96-3 is calculated following the addition determination map 97-3 (step S13-3). Thus, an NR image 98-3 is generated and output. Such noise reduction processing is repeated for each frame.

However, in this case, the amount of parallax of the multi-viewpoint image is dependent on the aperture of the diaphragm of the imaging lens, and the number of pixels of the imaging device assigned to the microlenses. Accordingly, with multi-viewpoint images obtained using such an imaging apparatus, generally, restriction in size of the imaging lens and suppression in deterioration of resolution has led to insufficient amount of parallax, so sufficiently great visual stereoscopic effect (sense of depth) has been difficult.

Image Processing Device

Figure 12:
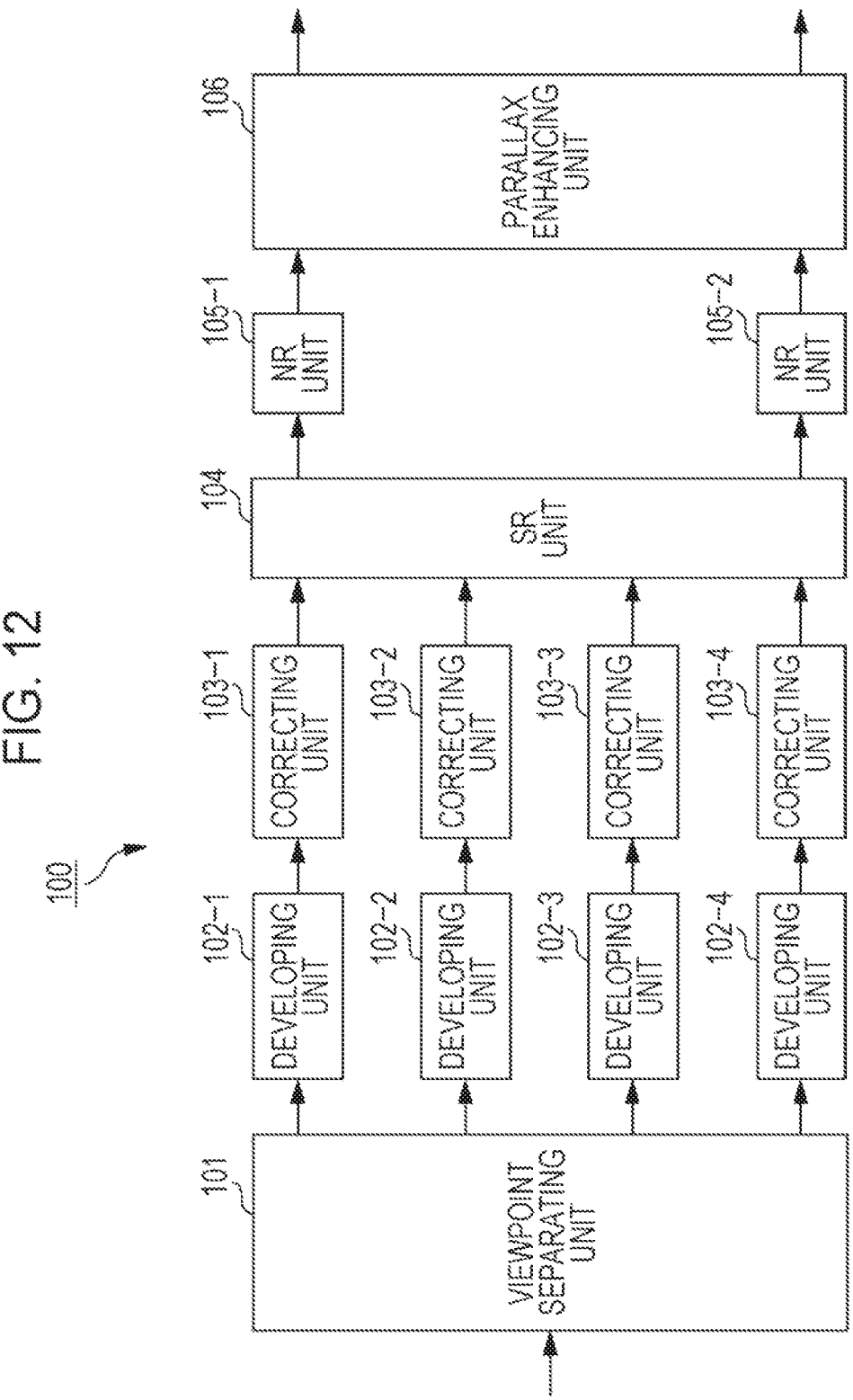
FIG. 12 is a block diagram illustrating a primary configuration example of an image processing device.

FIG. 12 is a block diagram illustrating a primary configuration example of an image processing device. The image processing device 100 shown in FIG. 12 performs image processing on an imaged image obtained from a light field camera (multi-viewpoint image), and generates images (a right eye image and left eye image) for stereoscopic display (so-called 3D display), in the same way as with the image processing device 50.

Note however, that with the image processing device 100, stereoscopic effect of multi-viewpoint images can be controlled. That is to say, with the image processing device 100, a more suitable degree of stereoscopic effect (sense of depth) of a stereoscopic display can be obtained by controlling the amount of parallax of right eye images and left eye images generated.

As shown in FIG. 12, the image processing device 100 includes a viewpoint separating unit 101, a developing unit 102-1 through developing unit 102-4, a correcting unit 103-1 through correcting unit 103-4, an SR unit 104, an NR unit 105-1 and NR unit 105-2, and a parallax enhancing unit 106.

Note that in the following description, in the event that the developing unit 102-1 through developing unit 102-4 do not have to be distinguished from each other, these will be simply referred to as "developing unit 102". Also, in the following description, in the event that the correcting unit 103-1 through correcting unit 103-4 do not have to be distinguished from each other, these will be simply referred to as "correcting unit 103". Further, in the event that the NR unit 105-1 and NR unit 105-2 do not have to be distinguished from each other, these will be simply referred to as "NR unit 105".

The viewpoint separating unit 101 is a processing unit basically the same as with the viewpoint separating unit 51, and separates an input image into each viewpoint and generates images for all viewpoints. That is to say, the viewpoint separating unit 101 separates multi-viewpoint image data, including images of multiple viewpoints and representing intensity distribution of light and the direction of travel of light according to the positions and pixel values of the pixels, into individual viewpoints, thereby generating a plurality of single-viewpoint image data. In the case of the example in FIG. 12, the viewpoint separating unit 101 separates the imaged image into four viewpoint images.

The viewpoint separating unit 101 supplies each viewpoint image that has been separated (single-viewpoint image data) to the corresponding developing unit 102. In the case of the example in FIG. 12, the viewpoint separating unit 101 supplies the four viewpoint images to the developing unit 102-1 through developing unit 102-4.

The developing unit 102 is a processing unit basically the same as the developing unit 52, performing developing processing on a RAW image (single-viewpoint image data) supplied thereto, and supplying the processing results to a correcting unit 103 corresponding to itself. The correcting unit 103 is a processing unit basically the same as the correcting unit 53, performing correction processing on the supplied image (single-viewpoint image data), and supplying the processing results to the SR unit 104.

Note that FIG. 12 shows four each of the developing unit 102 and correcting unit 103, for sake of convenience, but one each of the developing unit 102 and correcting unit 103 is provided for each viewpoint. For example, in the case of the example in FIG. 2, the imaged image includes nine viewpoint images. In this case, there are provided nine each of the developing unit 102 and correcting unit 103. The viewpoint separating unit 101 separates the imaged image into individual viewpoints and generates nine images, with the nine developing units 102 and correcting units 103 each processing different viewpoint images.

The SR unit 104 has basically the same configuration as the SR unit 54, and performs super-resolution processing in the same way. That is to say, the SR unit 104 performs super-resolution processing to raise the resolution of images of the single-viewpoint image data supplied thereto. More specifically, the SR unit 104 performs super-resolution processing using images of all viewpoints supplied thereto as low-resolution images g1, g2, g3, and so on through gn, so as to generate a two-viewpoint high-resolution image (i.e., a viewpoint R image and a viewpoint L image). The SR unit 104 supplies the generated high-resolution image viewpoint R image to the NR unit 105-1, and supplies the high-resolution image viewpoint L image to the NR unit 105-2.

The NR unit 105 is a processing unit basically the same as the NR unit 55, and performs the same noise reduction processing. That is to say, the NR unit 105 performs noise reduction processing to reduce noise for each of the multiple single-viewpoint image data. The NR unit 105 supplies an NR image, which is a processing result, to the parallax enhancing unit 106.

The parallax enhancing unit 106 corrects the parallax amount of the viewpoint R image and viewpoint L image supplied thereto, so as to enhance or decrease the parallax. That is to say, the parallax enhancing unit 106 controls the amount of parallax between the multiple single-viewpoint image data. The parallax enhancing unit 106 outputs images of each viewpoint subjected to amount-of-parallax correction.

Parallax Enhancement

Next, a method of parallax enhancement will be described. To begin with, stereoscopic effect which a user senses occurs due to the position of an object in a right eye image (viewpoint R image) primarily viewed with the right eye and in a left eye image (viewpoint L image) primarily viewed with the left eye being different. The difference in position of the object common to the two images is parallax. The greater this parallax is, the greater the stereoscopic effect (sense of depth) that the user viewing the stereoscopically displayed image senses. For example, by placing a common object further to the right in the viewpoint R image and further to the left in the viewpoint L image, the deeper (farther) the position of the object which the user senses (perceived image position) is. Conversely, by placing a common object further to the left in the viewpoint R image and further to the right in the viewpoint L image, the nearer (closer) the position of the object which the user senses (perceived image position) is. If the position of the object in the viewpoint R image is farther left than the position in the viewpoint L image, the position of the object sensed (perceived image position) is nearer than a case where the position is displayed flat (a case of zero parallax).

Accordingly, in a case of displaying a perceived image of an object at a deeper position, the parallax enhancing unit 106 moves the image of the object in the viewpoint R image farther to the right, and conversely moves the image of the object in the viewpoint L image farther to the left, as shown above in FIG. 13. On the other hand, in a case of displaying a perceived image of an object at a nearer position, the parallax enhancing unit 106 moves the image of the object in the viewpoint R image farther to the left, and conversely moves the image of the object in the viewpoint L image farther to the right, as shown below in FIG. 13.

Figure 14:
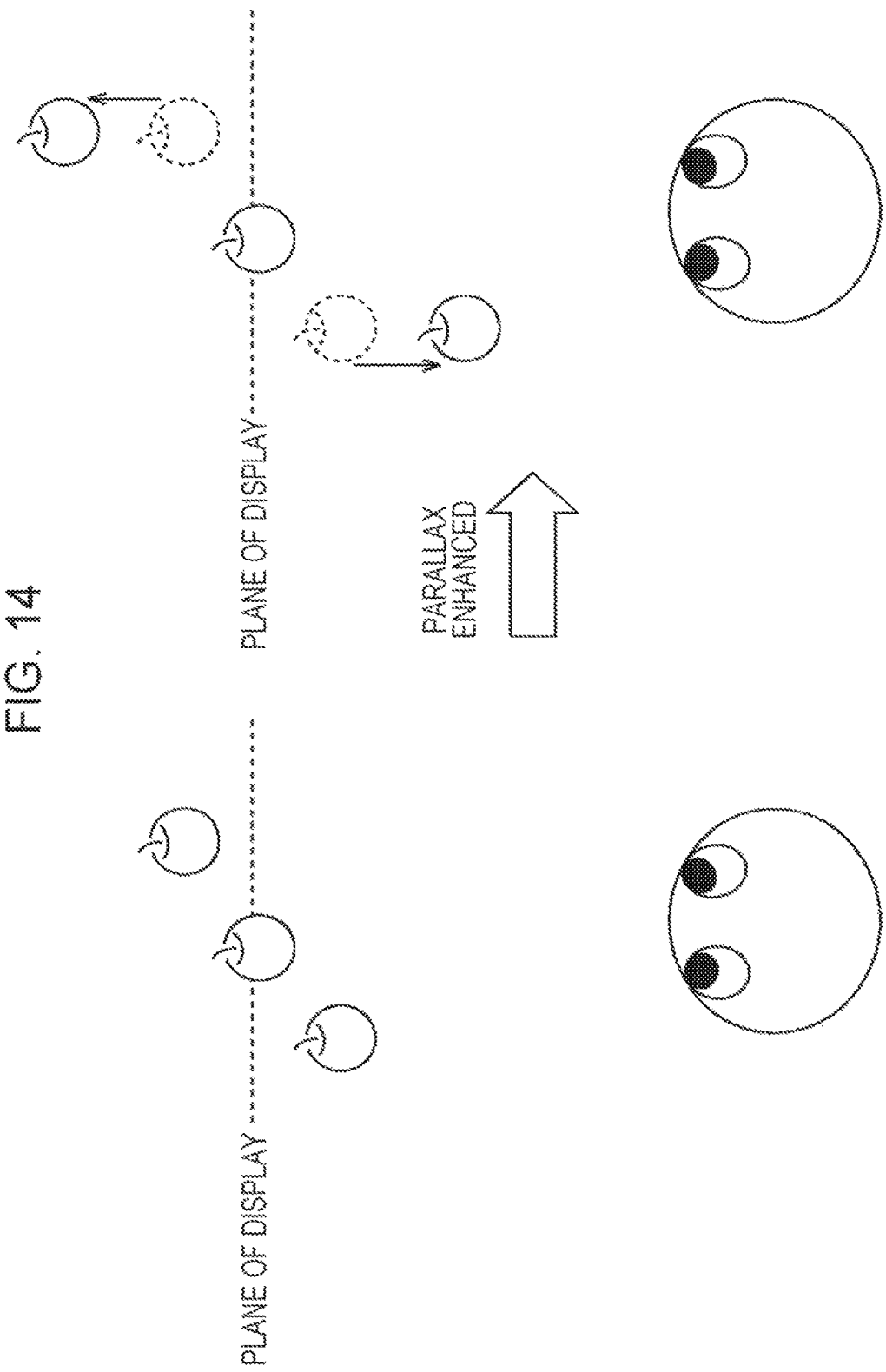
FIG. 14 is a diagram for describing an example of parallax enhancement.

Thus, the perceived image of the object moves nearer than the display plane or deeper than the display plane, as shown in FIG. 14. That is to say, by controlling the amount of parallax, the parallax enhancing unit 106 can control the stereoscopic effect (sense of depth) of the image displayed stereoscopically. By the stereoscopic effect of the image being controlled by the parallax enhancing unit 106, a stereoscopic display image with a predetermined stereoscopic effect (viewpoint R image and viewpoint L image having sufficient amount of parallax) can be obtained at the image processing device 100.

Parallax Enhancing Unit

Figure 15:
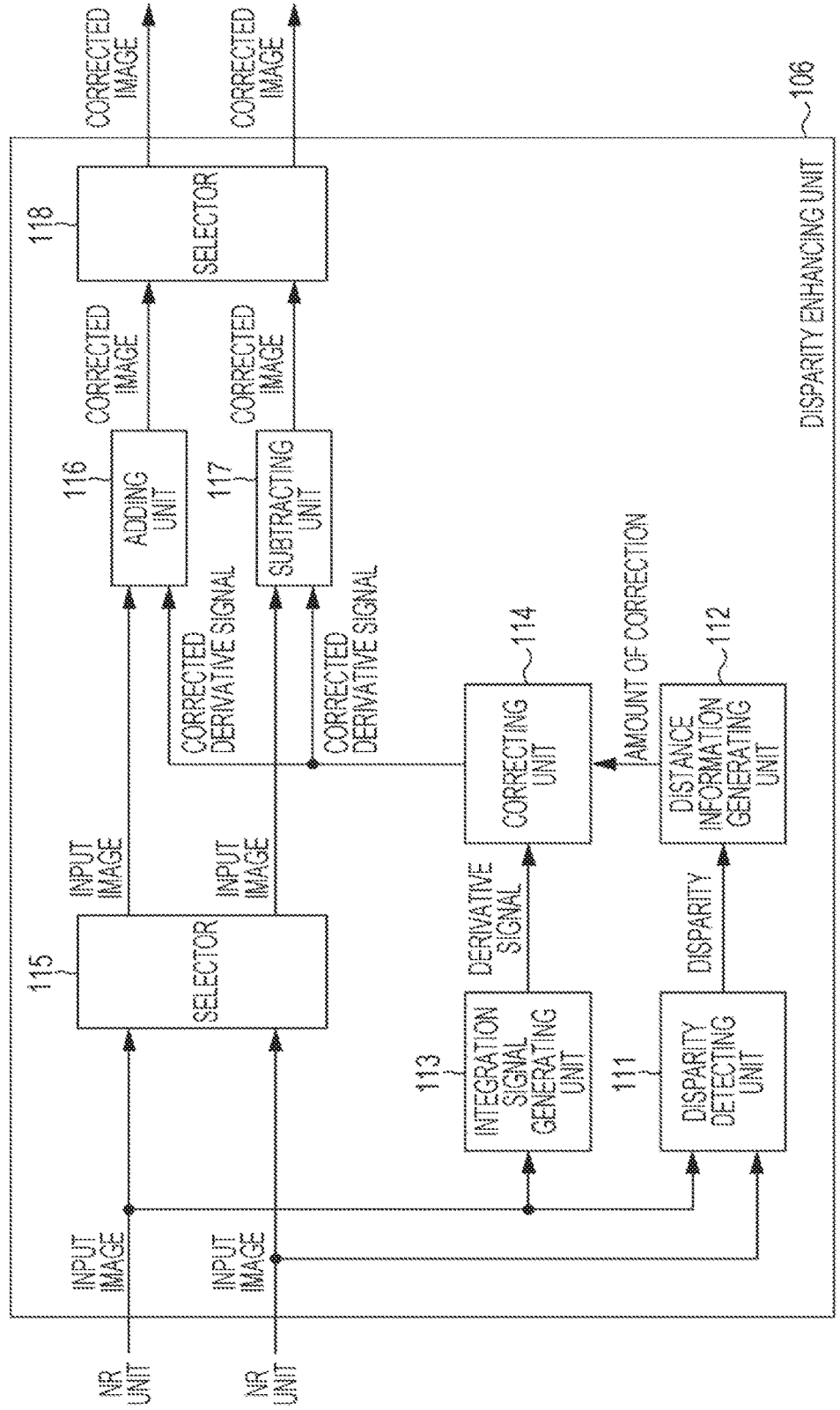
FIG. 15 is a block diagram illustrating a primary configuration example of a parallax enhancing unit.

FIG. 15 is a block diagram illustrating a primary configuration example of the parallax enhancing unit 106 in FIG. 12. As shown in FIG. 15, the parallax enhancing unit 106 includes a disparity detecting unit 111, a distance information generating unit 112, a derivative signal generating unit 113, a correcting unit 114, a selector 115, an adding unit 116, a subtracting unit 117, and a selector 118.

The disparity detecting unit 111 detects disparity, which is a parameter directly or indirectly indicating the amount of parallax between a viewpoint R image supplied from the NR unit 105-1 and a viewpoint L image supplied from the NR unit 105-2. The disparity detecting unit 111 supplies the detected disparity to the distance information generating unit 112.

The distance information generating unit 112 identifies the current distance from the user to the perceived image of the object to be corrected, based on the disparity between the two images supplied from the disparity detecting unit 111, and based on this current distance and a target position, obtains a correction amount for the derivative signal. The distance information generating unit 112 supplies the obtained distance information to the correcting unit 114.

The derivative signal generating unit 113 performs derivation of the viewpoint R image (or the viewpoint L image, either will suffice), and generates a derivative signal. The derivative signal generating unit 113 supplies the generated derivative signal to the correcting unit 114.

The correcting unit 114 corrects the derivative signal supplied from the derivative signal generating unit 113, using the correction amount supplied from the distance information generating unit 112. This correction of the derivative signal corrects the amount of movement of the object in the viewpoint R image and viewpoint L image for parallax enhancement. The correcting unit 114 supplies the derivative signal following correction to the adding unit 116 and subtracting unit 117.

The selector 115 and selector 118 control whether to supply the input/output viewpoint R image to the adding unit 116 or the subtracting unit 117. That is to say, switching of this input/output controls whether the derivative signal following correction will be added to or subtracted from the viewpoint R image and viewpoint L image.

The adding unit 116 adds the corrected derivative signal supplied from the correcting unit 114 to the viewpoint R image or viewpoint L image input via the selector 115, thereby correcting the viewpoint R image or viewpoint L image. The adding unit 116 externally outputs the image following correction from the parallax enhancing unit 106 via the selector 118, as a viewpoint R image or viewpoint L image.

The subtracting unit 117 subtracts the corrected derivative signal supplied from the correcting unit 114 from the viewpoint R image or viewpoint L image input via the selector 115. This corrects the viewpoint R image or viewpoint L image. Thus, the subtracting unit 117 externally outputs the image following correction from the parallax enhancing unit 106 via the selector 118, as a viewpoint R image or viewpoint L image.

The way in which correction is made will be described with reference to FIG. 16. For example, let us say that an image with a waveform such as shown at the top tier in FIG. 16 (with zero parallax) is input to the parallax enhancing unit 106 as a viewpoint R image and viewpoint L image. The derivative signal generating unit 113 performs derivation of this signal to generate a derivative signal such as shown in the second tier from the top in FIG. 16. In this case, the derivative signal has a positive value at the leading edge of the input signal (section A), and has a negative value at the trailing edge of the input signal (section B).

Figure 16:
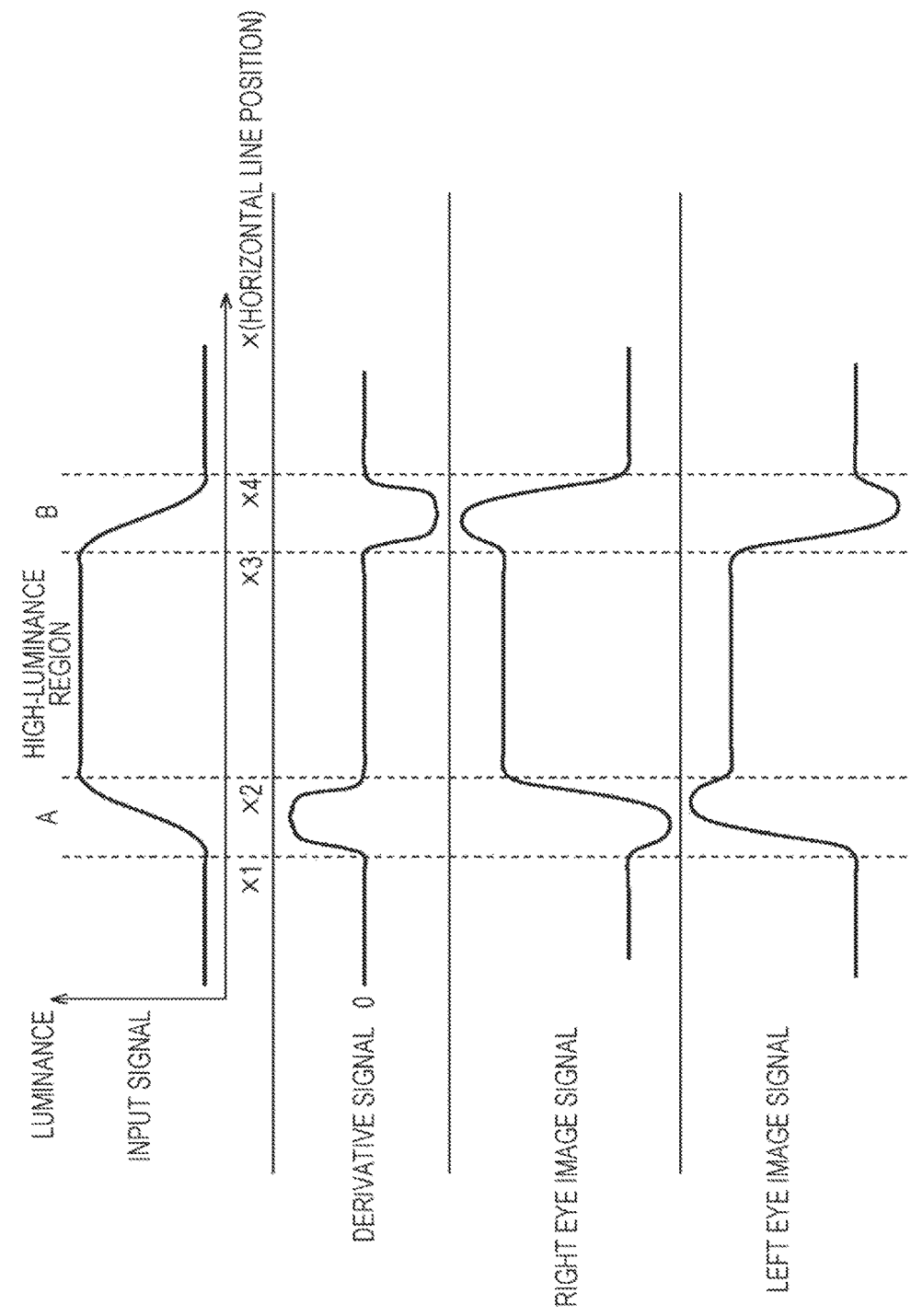
FIG. 16 is a diagram for describing an example of parallax enhancement.

The adding unit 116 adds this derivative signal to the input signal, thereby generating a left eye image signal such as shown at the bottom tier in FIG. 16. In this case, the left eye image signal has its high luminance region shifted to the left as compared to the input signal.

The subtracting unit 117 subtracts this derivative signal from the input signal, thereby generating a right eye image signal such as shown at the third tier from the top in FIG. 16. In this case, the right eye image signal has its high luminance region shifted to the right as compared to the input signal.

Thus, the parallax enhancing unit 106 can easily control the position of the high luminance region, i.e., the position of the object, that is to say the amount of parallax, by adding/subtracting the derivative signal to/from the input image. Note that the correcting unit 114 controls the amount of parallax by multiplying the derivative signal by the amount of correction. That is to say, this amount of correction controls the breadth of non-zero portions of the derivative signal (A and B).

Figure 17:
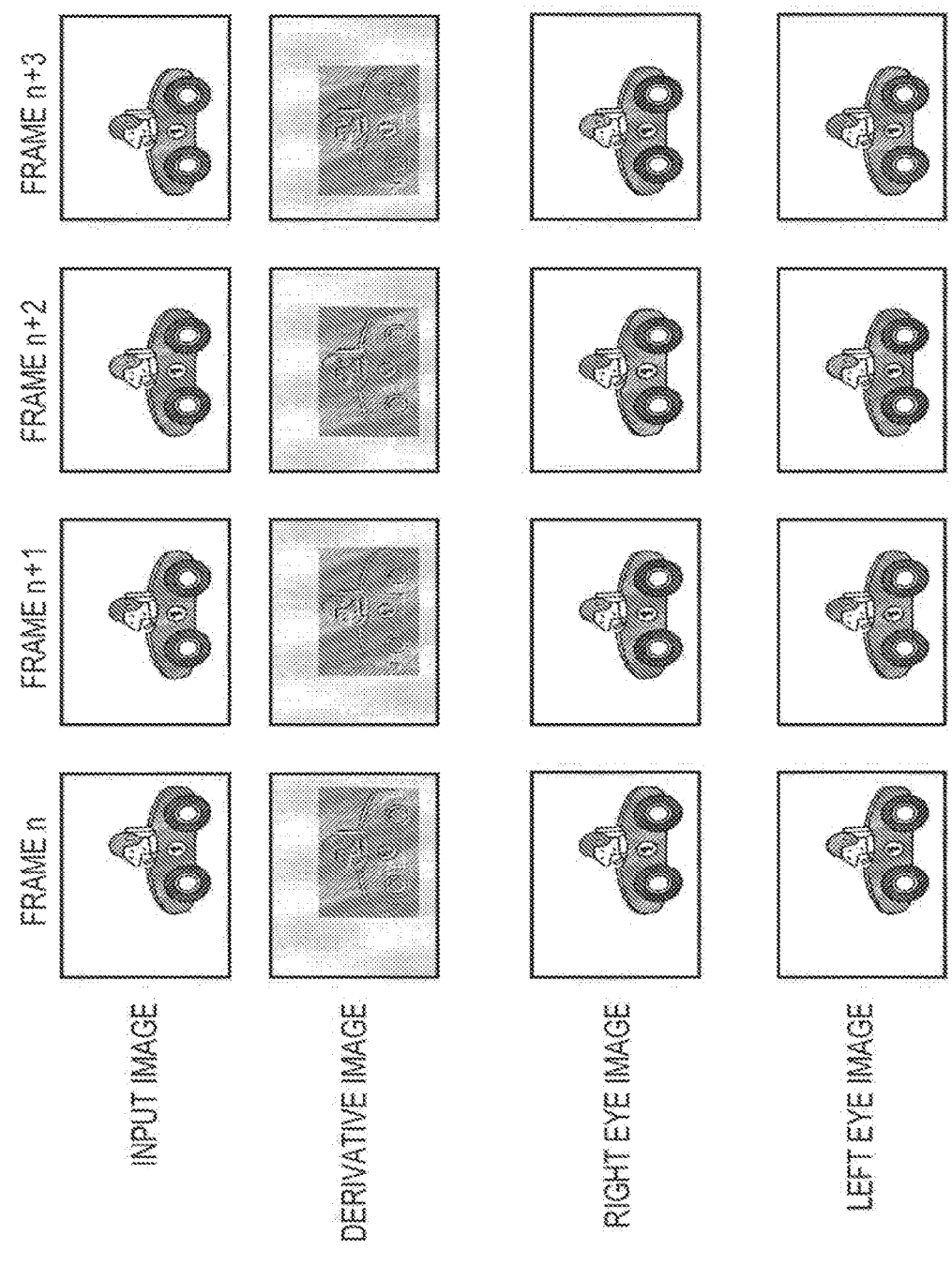
FIG. 17 is a diagram for describing an example of parallax enhancement.

The derivative signal generating unit 113 generates a derivative signal from each frame, as shown in FIG. 17. That is to say, derivation is performed if the input image for each frame by the derivative signal generating unit 113. also, the adding unit 116 and subtracting unit 117 generate a right eye image and left eye image for each frame.

Flow of Image Processing

An example of the flow of image processing executed by the image processing device 100 in FIG. 12 will be described with reference to the flowchart in FIG. 18.

Upon image processing being started, in step S101 the viewpoint separating unit 101 separates the input image into individual viewpoints.

In step S102, the developing unit 102 develops the images of the viewpoints generated in step S101.

In step S103, the correcting unit 103 corrects the images of the viewpoints developed by the processing in step S102.

In step S104, the SR unit 104 performs super-resolution processing using the images of the viewpoints corrected by the processing in step S103.

In step S105, the NR unit 105 performs noise reduction processing on each of the viewpoint R image and viewpoint L image.

In step S106, the parallax enhancing unit 106 performs parallax enhancement on the images that have been subjected to noise reduction in the processing in step S105.

Upon the parallax enhancement being completed, the parallax enhancing unit 106 ends the image processing.

Next, an example of the flow of parallax enhancement processing executed in step S106 in FIG. 18 will be described with reference to the flowchart in FIG. 19.

Upon parallax enhancement processing being started, in step S121 the disparity detecting unit 111 detects the disparity between the viewpoint R image and viewpoint L image.

In step S122, the distance information generating unit 112 determines the amount of correction for the derivative signal, based on the size of the disparity detected in step S121.

In step S123, the derivative signal generating unit 113 generates a derivative signal from the input images (viewpoint R image and viewpoint L image), and the correcting unit 114 corrects this derivative signal by the correction amount determined in step S122.

In step S124, the selector 115 and selector 118 switch the connection for input/output of the adding unit 116 and subtracting unit 117 as appropriate, and select addition/subtraction of the derivative signal as to the input signals of each of the viewpoints.

Figure 13:
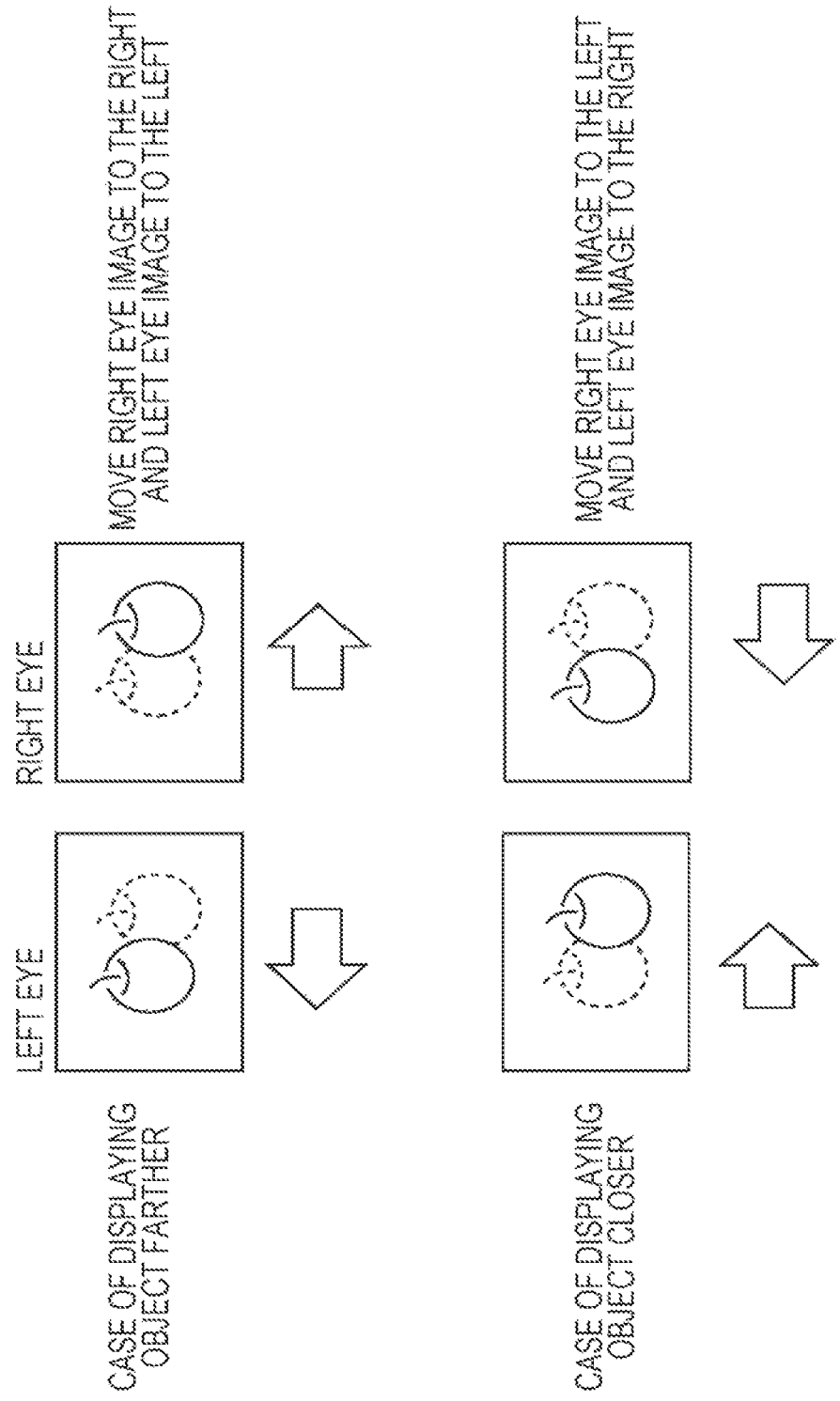
FIG. 13 is a diagram for describing an example of parallax enhancement.

As described with reference to FIGS. 13 and 14, with an image stereoscopically displayed, the direction in which an object should be moved in each viewpoint image differs, depending one whether the depthwise position perceived by the user of the object in the image (position of perceived image) is to be moved nearer or is to be moved deeper. Also, as described with reference to FIG. 16, the direction of movement of the object changes depending on whether the derivative signal is added to the image or subtracted therefrom. Accordingly, whether to add or subtract the derivative signal is determined by the direction in which the object is to be moved (i.e., whether the amount of parallax is to be increased or decreased).

In step S125, the adding unit 116 adds the derivative signal corrected in step S123 to the input signals of the viewpoint selected in step S124 (the viewpoint R image or viewpoint L image).

In step S126, the subtracting unit 117 subtracts the derivative signal corrected in step S123 from the input signals of the viewpoint selected in step S124 (the viewpoint R image or viewpoint L image).

In step S127, the selector 118 outputs the addition result obtained by the processing in step S125, and the subtraction result obtained by the processing in step S126, following the selection according to the processing in step S124, as respective correction results of each viewpoint.

Regardless of whether the derivative signal is added to the viewpoint R image and the derivative signal is subtracted from the viewpoint L image, or the derivative signal is subtracted from the viewpoint R image and the derivative signal is added to the viewpoint L image, the selector 118 outputs the computation result for the viewpoint R image as the correction result of the viewpoint R image, and outputs the computation result for the viewpoint L image as the correction result of the viewpoint L image.

Figure 18:
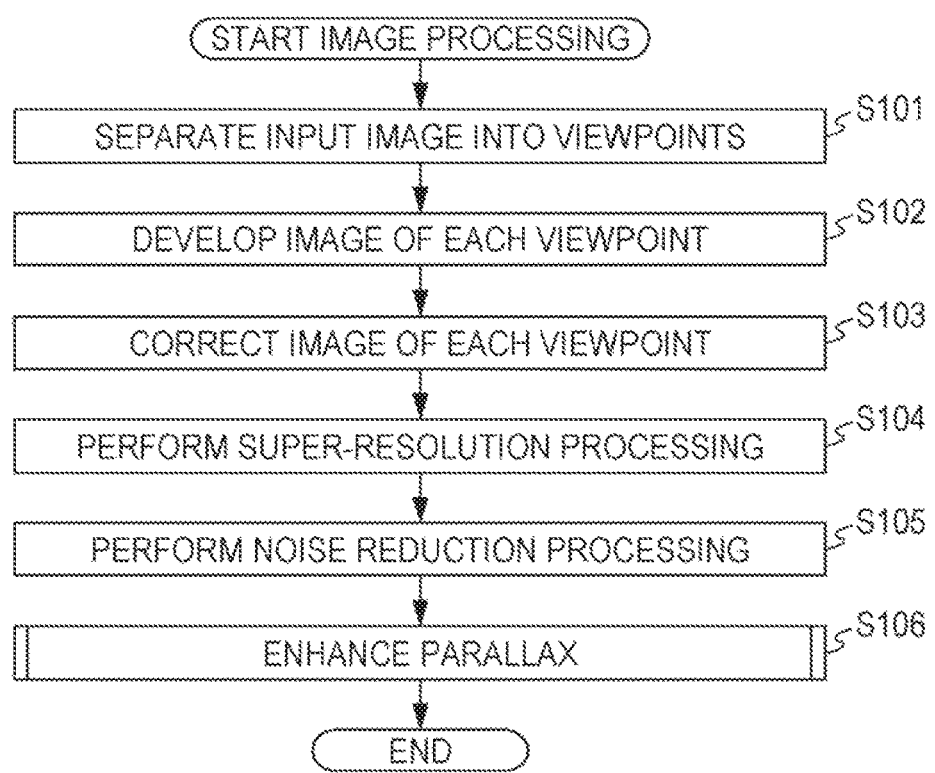
FIG. 18 is a flowchart for describing an example of the flow of image processing.
Figure 19:
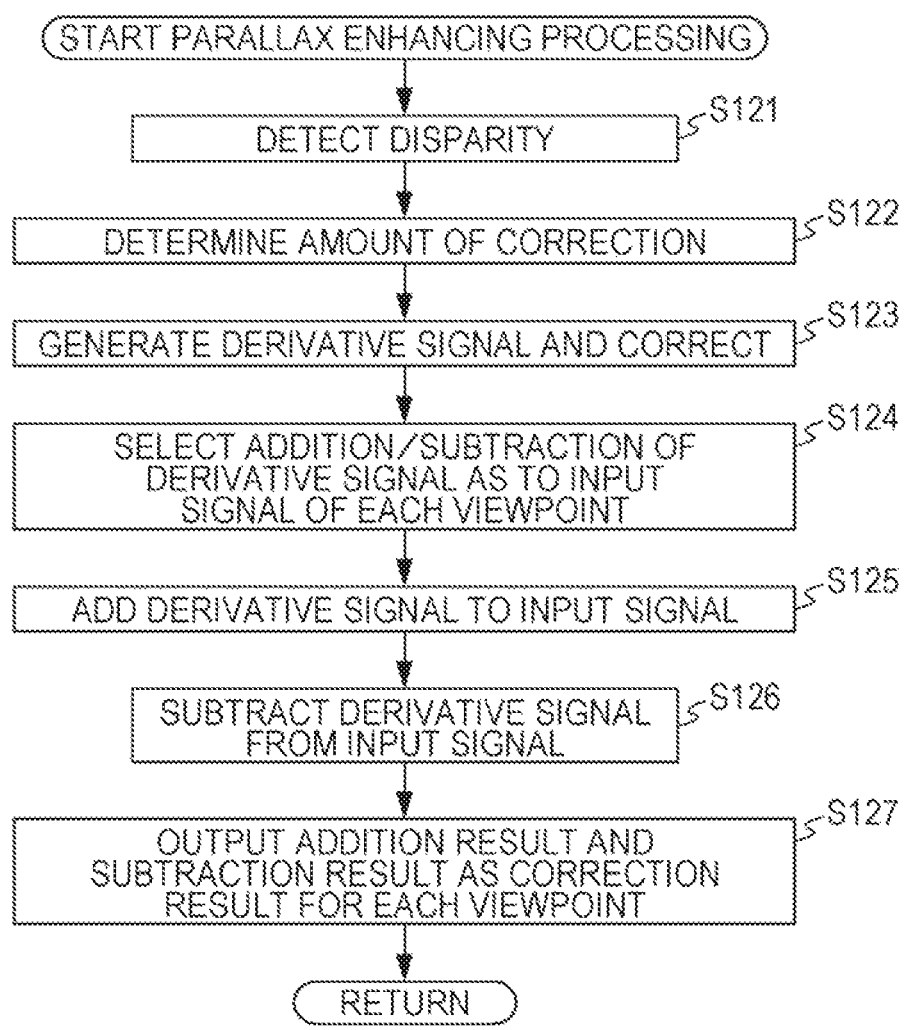
FIG. 19 is a flowchart for describing an example of the flow of parallax enhancing processing.

Upon the processing of step S127 ending, the selector 118 ends the parallax enhancement processing, and returns the flow to FIG. 18.

By perform processing such as described above, the image processing device 100 can obtain a stereoscopic display image with a desired stereoscopic effect (a viewpoint R image and viewpoint L image with sufficient amount of parallax).

Also, as described above, the SR unit 104 of the image processing device 100 performs super-resolution processing using images of all viewpoints as low-resolution images g1, g2, g3, and so on through gn. Accordingly, in the event that the number of viewpoints of the image to be processed that has been obtained by a light field camera is three or more, the SR unit 104 can perform super-resolution processing using low-resolution images of a number greater than the case of the SR unit 54 described above with reference to FIG. 5 and so forth, so the image quality of the super-resolution image results can be improved. That is to say, the SR unit 104 performs super-resolution processing also using images other than the two viewpoints for stereoscopic display (images other than the viewpoint R image and viewpoint L image), which had been simply discarded with the image processing device 50, thereby improving the usage efficiency of image data, whereby the image quality of the image obtained as a result of processing can be improved.

Note that by increasing the number of multiple images in the temporal direction, the number of low-resolution images g1, g2, g3, and so on through gn can also be increased, but this means that the images have to be held. The amount of buffer to hold the extra images increases accordingly, meaning an increased load on hardware resources, which may lead to increased costs and larger circuit scale. The SR unit 104 can increase the number of low-resolution images g1, g2, g3, and so on through gn within the frame of interest alone.

Note that in the above description, a developing unit 102 and correcting unit 103 is described as being provided for each of the viewpoints, the arrangement is not restricted to this, and an arrangement may be made where only a part of the viewpoint images are subjected to developing processing and correction processing. For example, in the example in FIG. 12, an arrangement may be made where the imaged image includes images of nine viewpoints, but the viewpoint separating unit 101 generates images of four viewpoints therefrom, which are supplied to the developing unit 102-1 through developing unit 102-4. In this case, the image quality is lower than a case of using all viewpoint images of the low-resolution images g1, g2, g3, and so on through gn, used at the SR unit 104, but the image quality can be made to be higher than a case of using just two viewpoints.

Commonalizing Processing

While the image processing device 100 can control stereoscopic effect by providing the parallax enhancing unit 106 as described above, the load on image processing increases accordingly. That is to say, an increased load is placed on hardware resources, which may lead to increased costs, larger circuit scale, increased processing time, and so forth. Accordingly, same processing which the processing units perform may be commonalized such that the processing results thereof are shared among the multiple processing units, so as to reduce the load of image processing as much as possible.

SR Unit

For example, as described with reference to FIG. 4, the SR unit 104 performs super-resolution processing for each of the viewpoint R image and viewpoint L image, and disparity between the two images is detected in the super-resolution processing of each. Accordingly, an arrangement may be made where detection of this disparity is commonalized in the super-resolution processing of each viewpoint.

Figure 20:
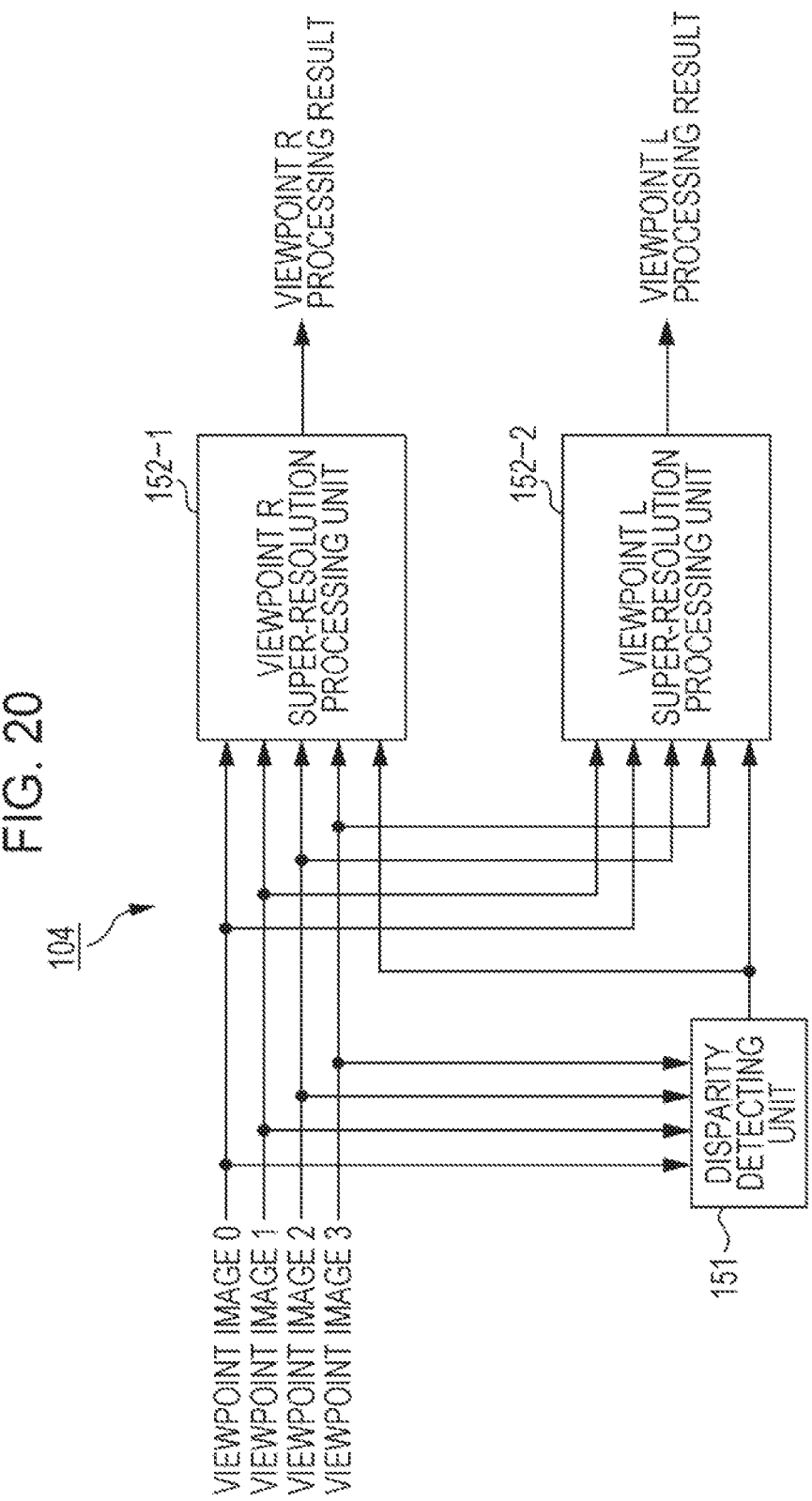
FIG. 20 is a block diagram illustrating a primary configuration example of an SR unit.

FIG. 20 is a block diagram illustrating a primary configuration example of the SR unit 104 in such a case. As shown in FIG. 20, the SR unit 104 in this case has a disparity detecting unit 151, a viewpoint R super-resolution processing unit 152-1, and a viewpoint L super-resolution processing unit 152-2. Note that in the following description, in the event that the viewpoint R super-resolution processing unit 152-1 and viewpoint L super-resolution processing unit 152-2 do not have to be distinguished from each other, these will be simply referred to as "super-resolution processing unit 152".

The disparity detecting unit 151 detects disparity between viewpoints, independently from the super-resolution processing, using the images of each viewpoint, and supplies the detected disparity to the viewpoint R super-resolution processing unit 152-1 and viewpoint L super-resolution processing unit 152-2.

The viewpoint R super-resolution processing unit 152-1 performs super-resolution processing regarding the viewpoint R image, using the disparity supplied from the disparity detecting unit 151. The viewpoint L super-resolution processing unit 152-2 performs super-resolution processing regarding the viewpoint L image, using the disparity supplied from the disparity detecting unit 151.

The super-resolution processing unit 152 basically has the same configuration as the super-resolution processing unit 60, and performs the same processing. However, unlike the case of the super-resolution processing unit 60, the super-resolution processing unit 152 performs super-resolution processing using images of all viewpoints as the low-resolution images g1, g2, g3, and so on through gn. Also, while the super-resolution processing unit 60 performs motion detection between the low-resolution images gk and the initial image or partway results of super-resolution processing, and performs super-resolution processing using the motion vector thereof, the super-resolution processing unit 152 performs super-resolution processing using the disparity between each of the viewpoints supplied from the disparity detecting unit 151.

That is to say, the processing of the disparity detecting unit 151 is equivalent to the processing of the motion detecting unit 80 (FIG. 7) in the case of the SR unit 54. In other words, the processing which had been performed for each viewpoint (processing which had been redundantly performed) in the case of the SR unit 54, is commonalized in the case of the SR unit 104 in the example in FIG. 20, and used for both the super-resolution processing performed on the viewpoint R image and the super-resolution processing performed on the viewpoint L image. Accordingly, the SR unit 104 in this case can reduce the load on super-resolution processing. That is to say, the image processing device 100 can reduce the load of image processing. Accordingly, the image processing device 100 can perform image processing using hardware resources more efficiently, thereby suppressing increase in costs, larger circuit scale, increased processing time, and so forth.

Flow of Super-Resolution Processing

Figure 21:
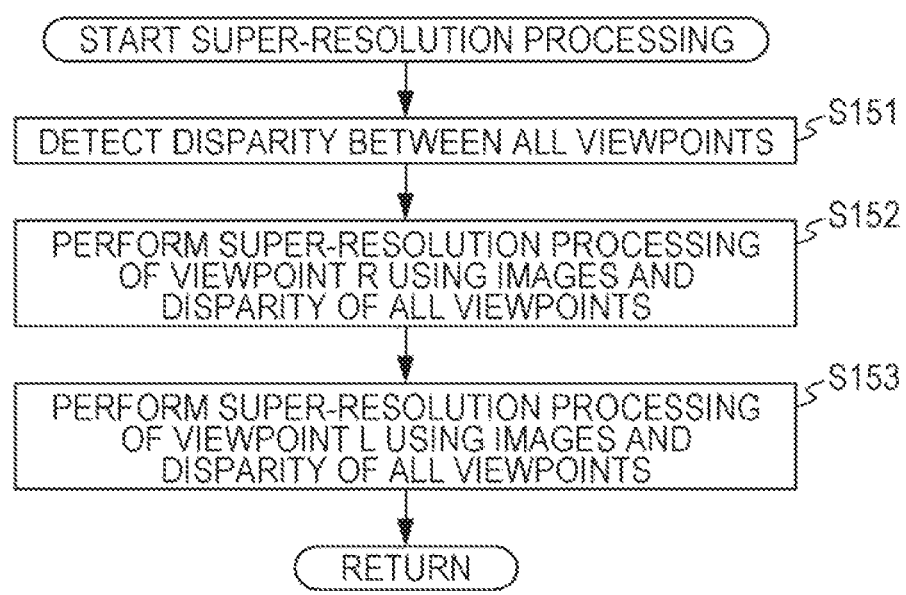
FIG. 21 is a flowchart for describing an example of the flow of super-resolution processing.

The flow of super-resolution processing performed in step S104 in FIG. 18 by the SR unit 104 will be described with reference to the flowchart in FIG. 21.

Upon the super-resolution processing being started, in step S151 the disparity detecting unit 151 detects the disparity between all viewpoints. In step S152, the viewpoint R super-resolution processing unit 152-1 performs super-resolution of viewpoint R using all view point images and the disparity detected in step S151. In step S153, the viewpoint L super-resolution processing unit 152-2 performs super-resolution of viewpoint L using all view point images and the disparity detected in step S151.

Upon the processing in step S153 ending, the viewpoint L super-resolution processing unit 152-2 ends the super-resolution processing, and the flow returns to FIG. 18. Thus, the SR unit 104 can reduce load of super-resolution processing.

Image Processing Device

While description has been made above that super-resolution processing is performed using only the images of the two viewpoints of viewpoint R and viewpoint L for stereoscopic display, and further noise reduction processing and parallax enhancement is performed, and output is made, it should be understood that the number of viewpoints of images to be output is optional. For example, all viewpoint images may be output. In this case, the super-resolution processing, noise reduction processing, and parallax enhancement processing, are each performed as to all viewpoint images.

Figure 22:
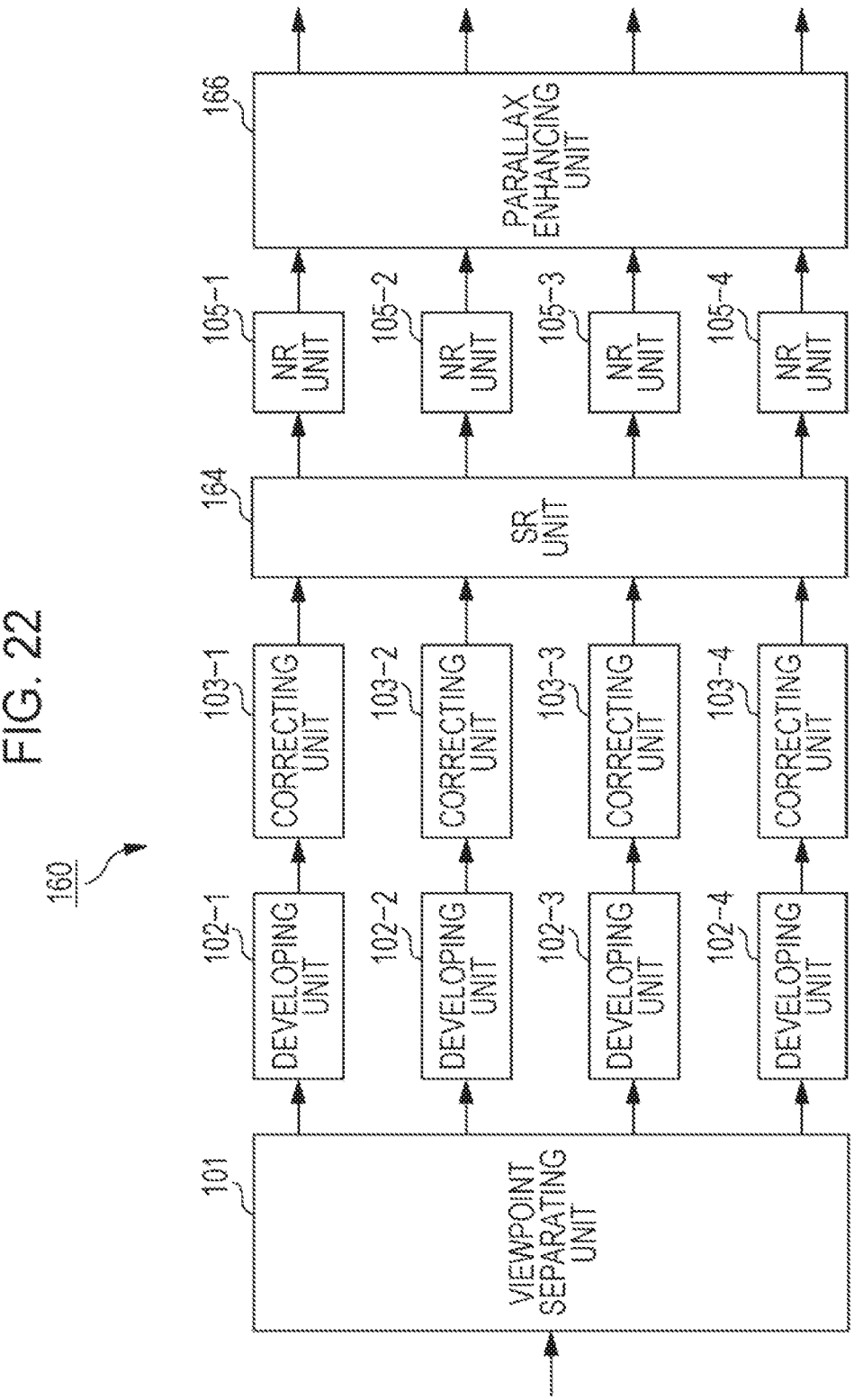
FIG. 22 is a block diagram illustrating a primary configuration example of an image processing device.

FIG. 22 is a block diagram illustrating a primary configuration example of an image processing device. The image processing device 160 shown in FIG. 22 is the basically the same devices as the image processing device 100, but unlike the image processing device 100 subjects all images to super-resolution processing, noise reduction processing, and parallax enhancement processing, and outputs.

As shown in FIG. 22, the image processing device 160 has basically the same configuration as the image processing device 100, but has a SR unit 164 instead of the SR unit 104, and has a parallax enhancing unit 166 instead of the parallax enhancing unit 106.

The SR unit 164 performs super-resolution processing as to all viewpoint images. That is to say, the SR unit 164 has super-resolution processing units 60 for all viewpoints. Note that disparity detection may be commonalized in super-resolution processing as to all viewpoint images, as described with reference to FIG. 20. That is to say, an arrangement may be made where the SR unit 164 has a disparity detecting unit 151, and further has super-resolution processing units 152 for all viewpoints.

The parallax enhancing unit 166 performs parallax enhancement between viewpoints for all viewpoints. That is to say, the parallax enhancing unit 166 has a configuration such as shown in FIG. 15, regarding all combinations of two viewpoints (viewpoint pairs). The parallax enhancement as to the viewpoint pairs may be performed individually, or may be performed while adjusting one another.

Also, the image processing device 160 has an NR unit 105 for each viewpoint (NR unit 105-1 through NR unit 105-4). In the case of the example in FIG. 22, only a configuration of four viewpoints is illustrated in the same way as with the example in FIG. 12, but the developing unit 102, correcting unit 103, and NR unit 105 are in fact provided for all viewpoint images. For example, in the case that the number of viewpoints is nine, as with the example in FIG. 2, nine each are provided of the developing unit 102, correcting unit 103, and NR unit 105.

Due to such a configuration, the image processing device 160 can raise the resolution of all viewpoints to high resolution and output. Accordingly, optional viewpoint images can be used at a downstream processing unit which performs processing using the output images thereof. That is to say, the image processing device 160 can improve the usage efficiency of image data to be processed by image processing (multi-viewpoint image data).

Flow of Image Processing

Figure 23:
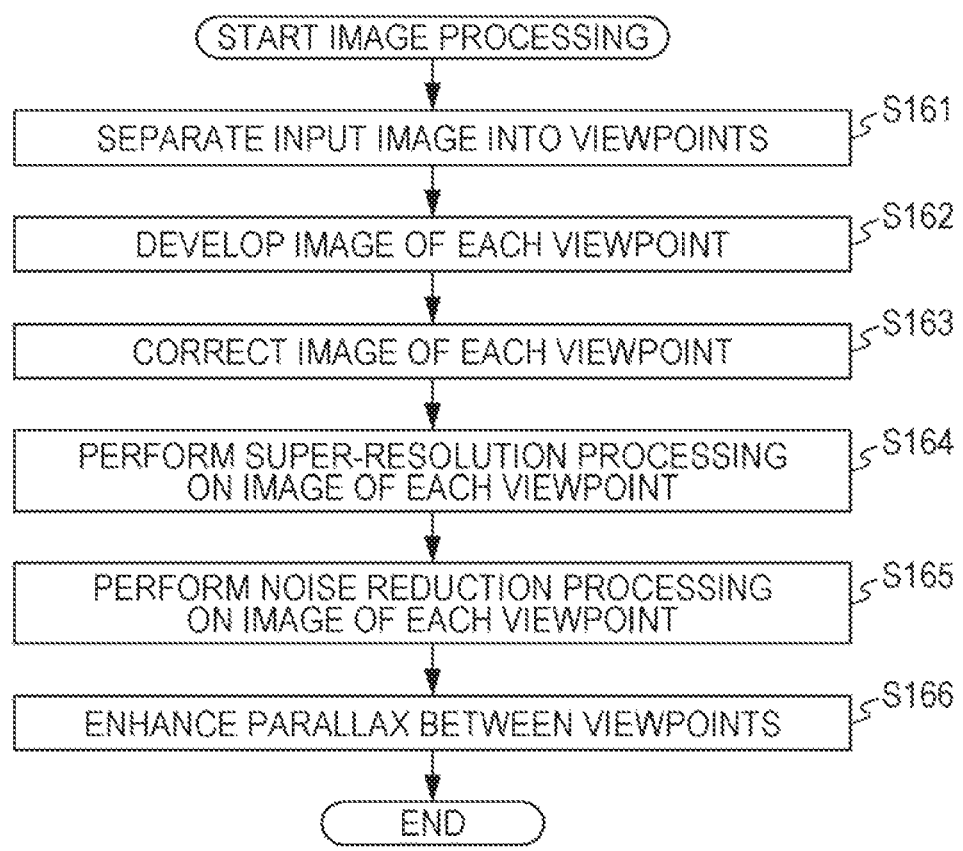
FIG. 23 is a flowchart for describing an example of the flow of image processing.

An example of the flow of image processing in this case will be described with reference to the flowchart in FIG. 23.

The processing of steps S161 through S163 is executed in the same way as the processing of steps S101 through S103 in FIG. 18.

In step S164, the SR unit 164 performs super-resolution processing as to all viewpoint images.

In step S165, the NR units 105 perform noise reduction processing as to each viewpoint image.

In step S166, the parallax enhancing unit 166 enhances parallax between all viewpoints.

Upon ending the processing in step S166, the parallax enhancing unit 166 ends the image processing. By performing such processing, the image processing device 160 can raise the resolution of all viewpoint images and output them.

Image Processing Device

Figure 24:
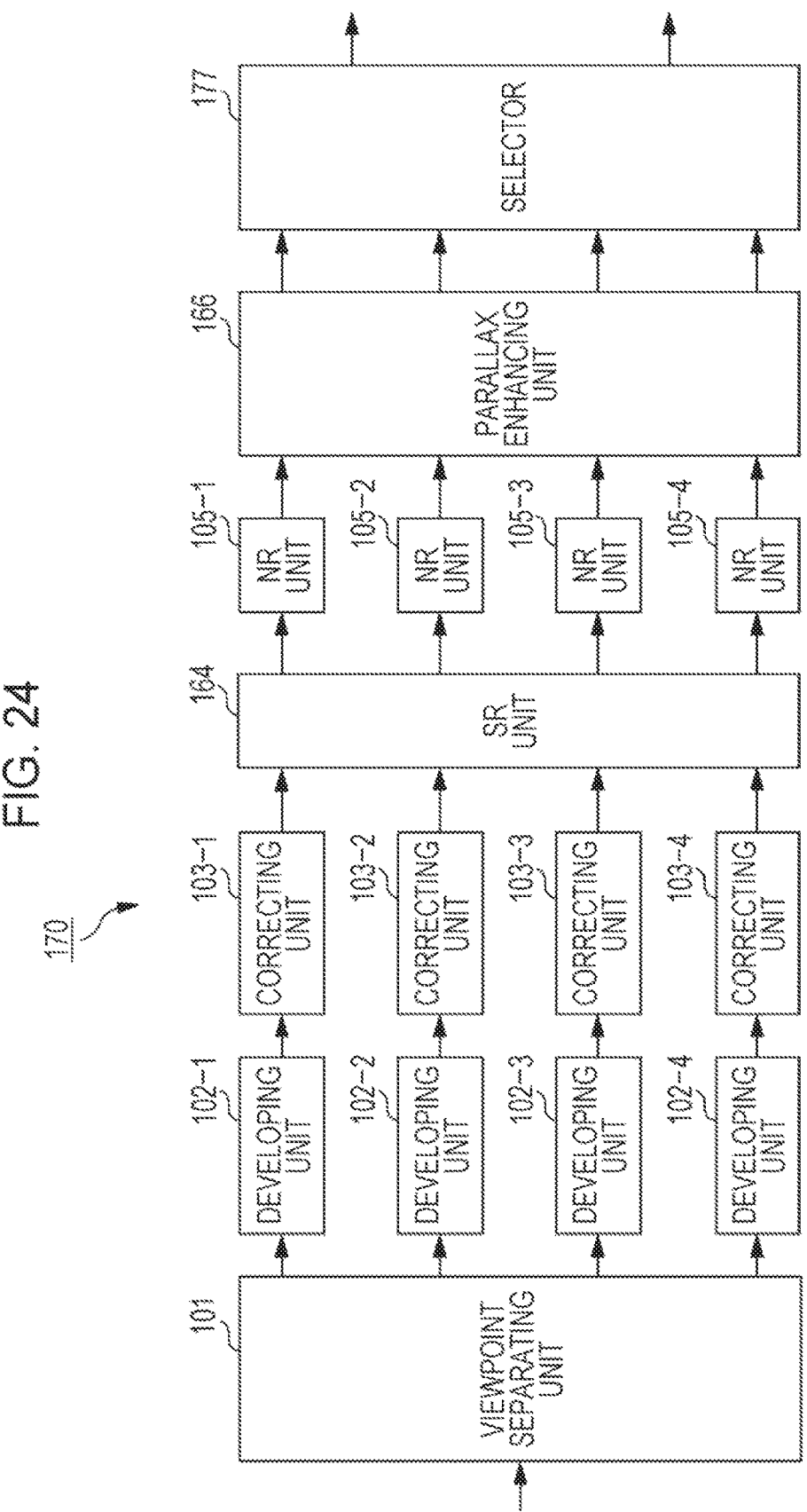
FIG. 24 is a block diagram illustrating a primary configuration example of an image processing device.

Further, an arrangement may be made where desired viewpoint images are selected from all viewpoint images subjected to parallax enhancement, and output. FIG. 24 is a block diagram illustrating a primary configuration example of an image processing device. The image processing device 170 shown in FIG. 24 is basically the same device as the image processing device 160. The image processing device 170 has, in addition the configuration of the image processing device 160, a selector 177.

The selector 177 obtains all viewpoint images of which the resolution has been raised to high resolution, output from the parallax enhancing unit 166, selects desired viewpoint images therefrom (the selection being made by the user, for example), and outputs these. While FIG. 24 illustrates the selector 177 inputting four viewpoint images and selecting and outputting two viewpoint images therefrom, the number of images input/output to/from the selector 177 (number of viewpoints) is optional, so long as the number of outputs does not exceed the number of inputs.

Thus, the image processing device 170 can output desired viewpoint images. Note that a synthesizing processing unit which generates new viewpoint images using the multiple viewpoint images that have been input, may be provided instead of the selector 177. In this case, the synthesizing unit can not only output new viewpoint images, but also can output a greater number of viewpoint images than the number of input images (number of viewpoints). In this way, optional processing units may be provided downstream from the parallax enhancing unit 166.

Flow of Image Processing

Figure 25:
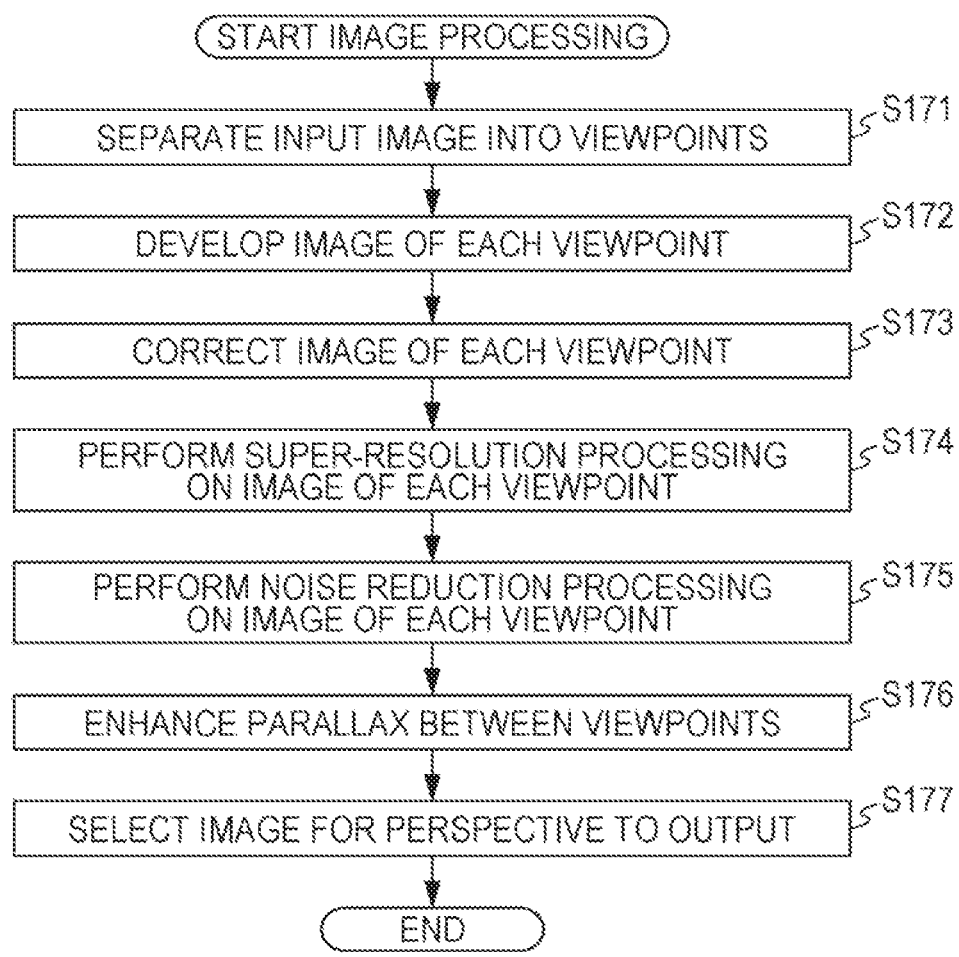
FIG. 25 is a flowchart for describing an example of the flow of image processing.

An example of the flow of image processing in this case will be described with reference to the flowchart in FIG. 25. The processing of steps S171 through S176 are executed in the same way as the processing of steps S161 through S166. In step S177, the selector 177 selects viewpoint images to output. Upon the processing of step S177 ending, the selector 177 ends the image processing. By performing processing thus, the image processing device 170 can output desired viewpoint images.

Image Processing Device

Figure 26:
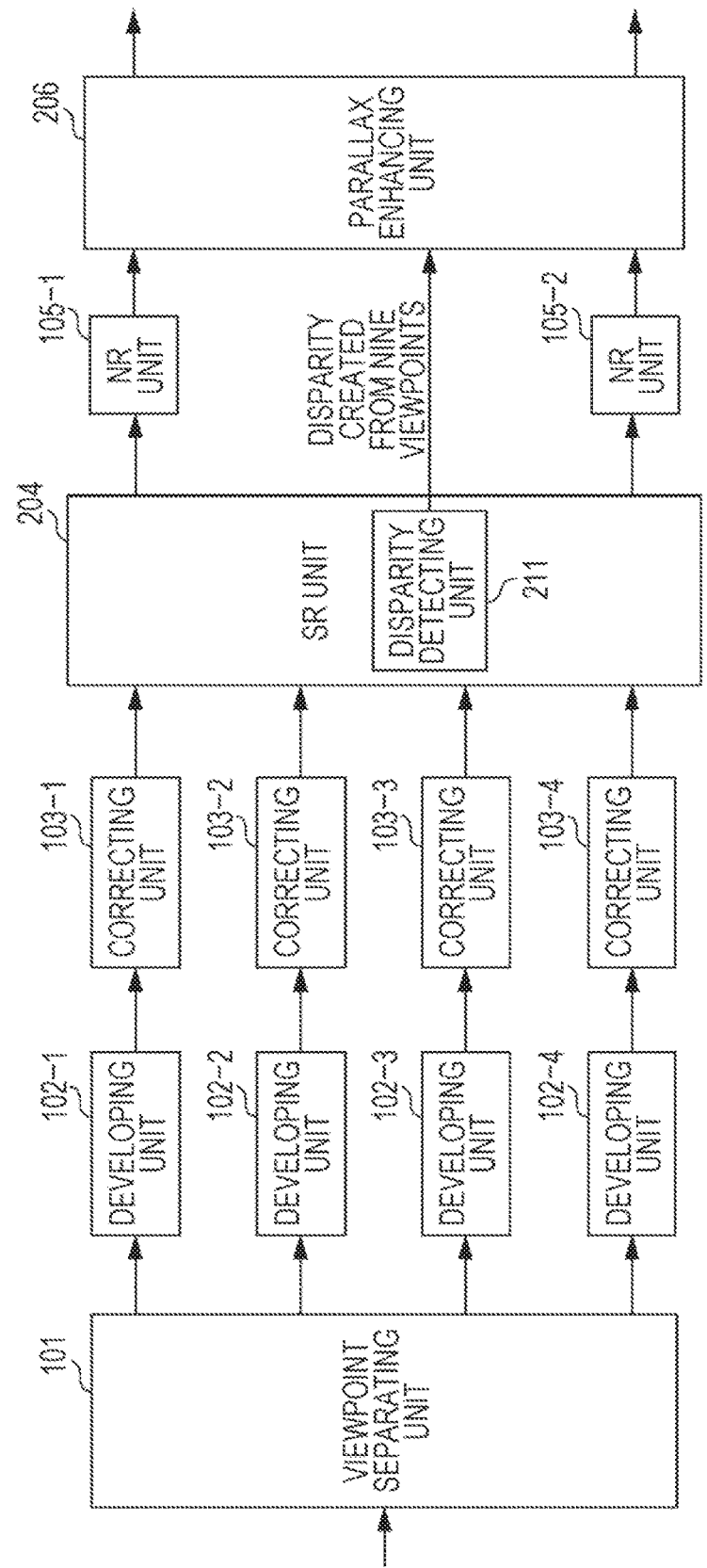
FIG. 26 is a block diagram illustrating a primary configuration example of an image processing device.

While description has been made above with reference to FIG. 20 for example, that disparity is detected at the SR unit, an arrangement may be made wherein the detected disparity is used at the parallax enhancement unit. FIG. 26 is a block diagram illustrating a primary configuration example of an image processing device. The image processing device 200 illustrated in FIG. 26 is basically the same device as the image processing device 100, basically has the same configuration, and performs the same processing. Note however, that the image processing device 200 has an SR unit 204 instead of the SR unit 104, and a parallax enhancing unit 206 instead of the parallax enhancing unit 106.

The SR unit 204 has basically the same configuration as the SR unit 104, and performs the same processing. The SR unit 204 has a disparity detecting unit 211 which detects disparity between all viewpoints. That is to say, the disparity detecting unit 211 is a processing unit the same as the disparity detecting unit 151 in FIG. 20. In other words, The SR unit 204 basically has the same configuration as the SR unit 104 in FIG. 20, and the disparity detected by the disparity detecting unit 211 is used in super-resolution processing as to the viewpoint images from the SR unit 204. Note however, that in the case of the image processing device 200, the disparity detected at the disparity detecting unit 211 is further supplied to the parallax enhancing unit 206.

The parallax enhancing unit 206 is a processing unit basically the same as the parallax enhancing unit 106, has the same configuration, and performs the same processing. Note however, that the parallax enhancing unit 206 performs parallax enhancement processing using disparity between all viewpoints supplied from the disparity detecting unit 211. That is to say, while the parallax enhancing unit 206 has the configuration of the example illustrated in FIG. 15, for example, the disparity detecting unit 111 is omitted from the configuration. The distance information generating unit 112 identifies disparity between viewpoints to be processed out of disparity of all viewpoints supplied from the disparity detecting unit 211, and uses the disparity to determine the amount of correction for the derivative signals.

Thus, the image processing device 200 can omit disparity detection processing in the parallax enhancement processing, by commonalizing the disparity detection processing. That is to say, the image processing device 200 can reduce the load of parallax enhancement processing. In other words, the image processing device 200 can reduce the load of image processing. Accordingly, the image processing device 200 can perform image processing using hardware resources more efficiently, thereby suppressing increase in costs, larger circuit scale, increased processing time, and so forth.

Flow of Image Processing

An example of the image processing in this case will be described with reference to the flowchart in FIG. 27. The processing of steps S201 through S203 are executed in the same way as the processing of steps S101 through S103.

In step S204, the SR unit 204 uses the disparity detecting unit 211 to detect disparity between all viewpoints, and performs super-resolution processing using the disparity.

The processing of step S205 is executed in the same way as the processing of step S105.

In step S206, the parallax enhancing unit 206 enhances parallax between the viewpoint R image and viewpoint L image, using the disparity detected at the time of the super-resolution processing in step S204.

Upon the processing of step S206 ending, the parallax enhancing unit 206 ends the image processing. By performing such processing, the image processing device 200 can omit the disparity detection processing in the parallax enhancement processing, and can alleviate the load of parallax enhancement processing.

Image Processing Device

While description has been made above where disparity detection processing is commonalized, other processing may be commonalized as well, such as motion detection processing performed in the noise reduction processing, for example. As described above, the noise reduction processing is performed on each of the viewpoint images. That is to say, in the case of processing a multi-viewpoint image, the noise reduction processing is repeated several times. In this case, the motion detection performed in the noise reduction processing is performed multiple times, which is redundant. Accordingly, this motion detection can be made processing commonalized among the viewpoints, thereby suppressing increase of load.

Figure 28:
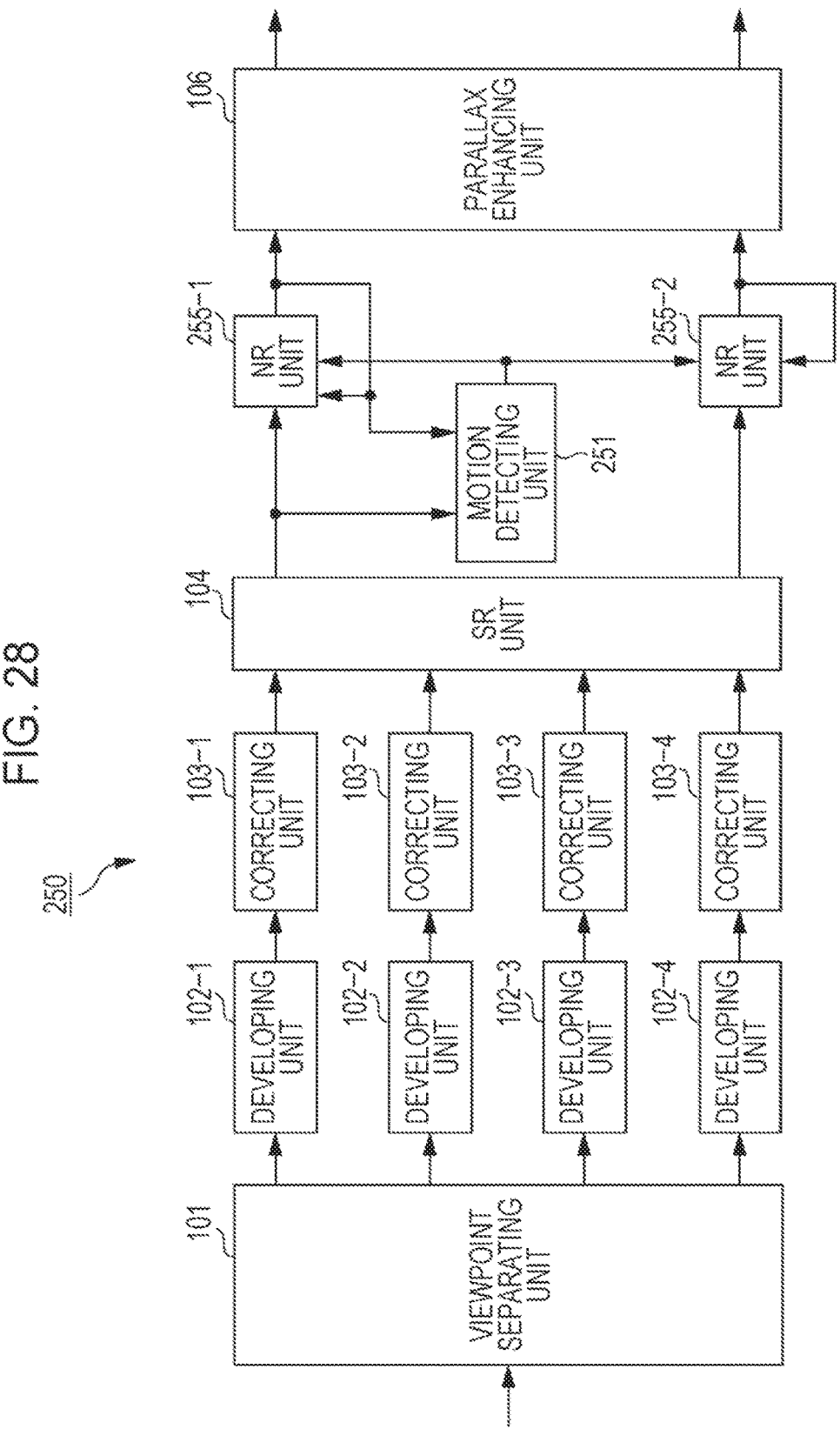
FIG. 28 is a block diagram illustrating a primary configuration example of an image processing device.

FIG. 28 is a block diagram illustrating a primary configuration example of the image processing device in this case. The image processing device 250 in FIG. 28 has basically the same configuration as the image processing device 100, but has a NR unit 255-1 instead of the NR unit 105-1, and a NR unit 255-2 instead of the NR unit 105-2. The image processing device 250 also has a motion detecting unit 251. Note that in the following description, in the event that the NR unit 255-1 and NR unit 255-2 do not have to be distinguished from each other, these will be simply referred to as "NR unit 255".

The motion detecting unit 251 performs motion detection between the image of the super-resolution processing result of the viewpoint R (image of which the resolution has been raised to high resolution), and the image of the noise reduction processing result of the viewpoint R by the NR unit 255-1 (image of which the noise has been reduced), and generates a motion vector thereof. This motion vector is supplied to the NR unit 255-1 and NR unit 255-2.

The NR unit 255-1 performs noise reduction processing as to the viewpoint R image. The NR unit 255-1 has basically the same configuration as the NR unit 55 (FIG. 9), but the motion prediction processing unit 92 is omitted. Instead, the NR unit 255-1 is supplied with the output of the motion detecting unit 251 (i.e., the motion vector). The NR unit 255-1 performs motion compensation of the reference image using this motion vector, and performs addition determination and addition processing using the motion compensation results.

The NR unit 255-2 performs noise reduction processing as to the viewpoint L image. The NR unit 255-2 is also supplied with the output of the motion detecting unit 251 (i.e., the motion vector). That is to say, the NR unit 255-2 also performs motion compensation of the reference image using this motion vector, and performs addition determination and addition processing using the motion compensation results.

Generally, motion detection processing is a great load, so commonalizing the motion detection processing in noise reduction processing on the viewpoint images allows the image processing device 250 to reduce the load of noise reduction processing. In other words, the image processing device 250 can reduce the load of image processing. Accordingly, the image processing device 250 can perform image processing using hardware resources more efficiently, thereby suppressing increase in costs, larger circuit scale, increased processing time, and so forth.

Note that while description has been made above that the motion detecting unit 251 performs motion detection using the viewpoint R image, the viewpoint of the image to be used for motion detection is optional. For example, the motion detecting unit 251 may perform motion detection using the viewpoint L image.

Flow of Image Processing

Figure 29:
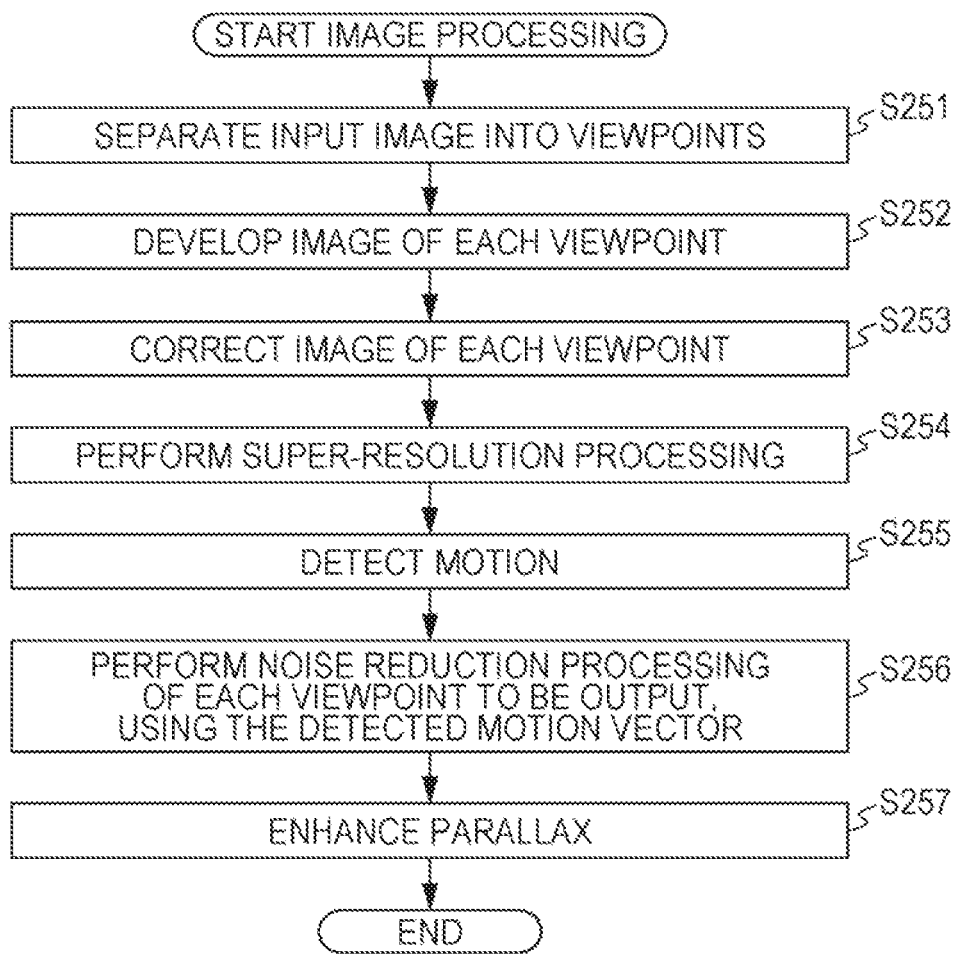
FIG. 29 is a flowchart for describing an example of the flow of image processing.

An example of the image processing in this case will be described with reference to the flowchart in FIG. 29. The processing of steps S251 through S254 are executed in the same way as the processing of steps S101 through S104 in FIG. 18.

In step S255, the motion detecting unit 251 performs motion detection using the images before and after noise reduction processing for a certain viewpoint.

In step S256, the NR unit 255 performs noise reduction processing on each viewpoint image to be output, using the motion vector detected by the processing in step S254.

In step S257, the parallax enhancing unit 106 performs parallax enhancement to control the amount of parallax between the viewpoints to be output (between the viewpoint R and viewpoint L).

Upon the processing of step S257 ending, the parallax enhancing unit 106 ends the image processing. By performing such processing, with the image processing device 250 the motion detection processing can be commonalized between the viewpoints in the motion detection processing, and the load of noise reduction processing can be reduced.

Image Processing Device

While description has been made above where super-resolution processing and noise reduction processing are performed, but these may be integrated, with the super-resolution processing and noise reduction processing being performed together.

Figure 30:
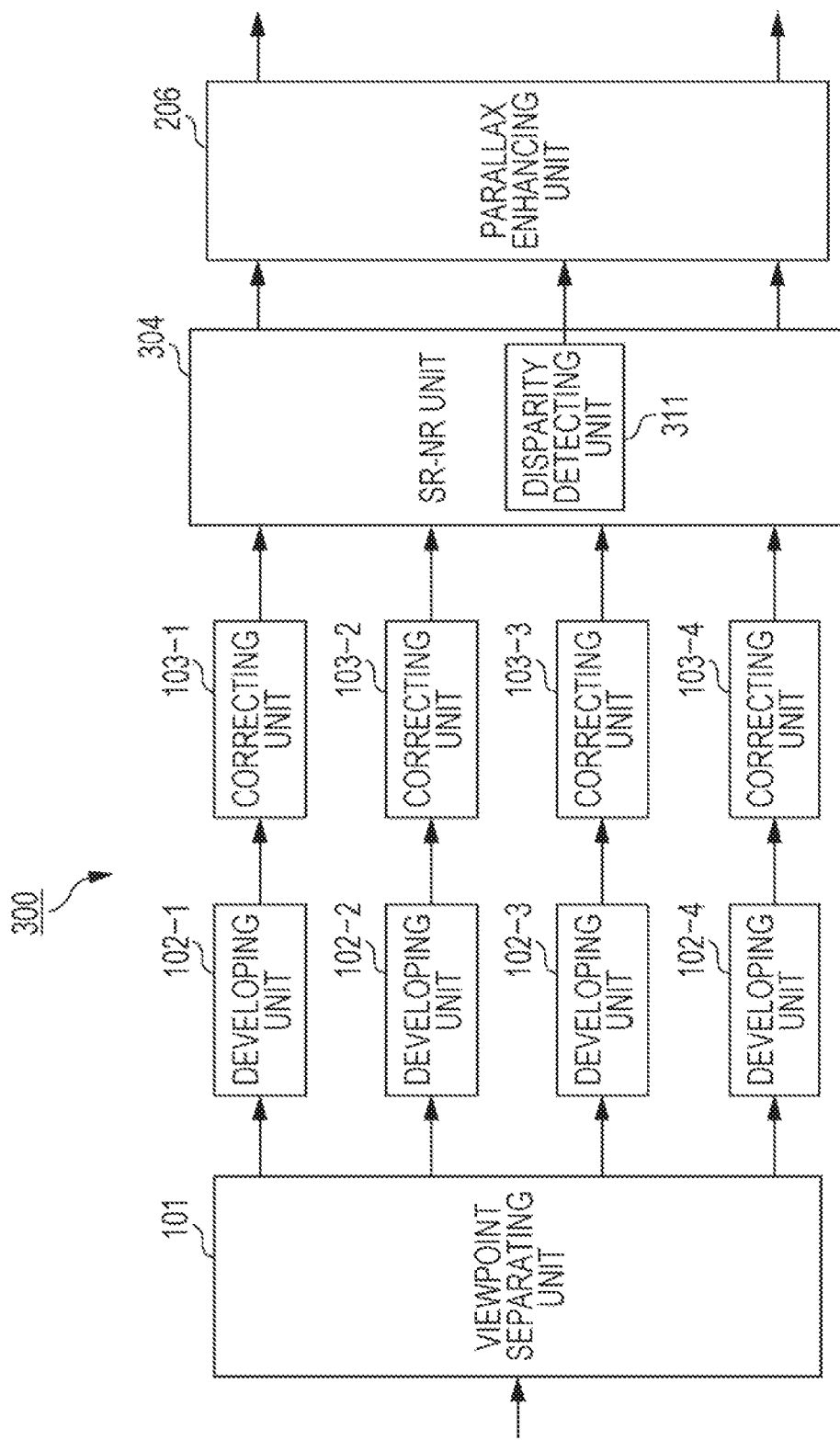
FIG. 30 is a block diagram illustrating a primary configuration example of an image processing device.

FIG. 30 is a block diagram illustrating a primary configuration example of the image processing device in this case. The image processing device 300 illustrated in FIG. 30 has basically the same configuration as the image processing device 200, and performs the same processing, but has an SR-NR unit 304 instead of the SR unit 204 and NR unit 105.

The SR-NR unit 304 performs both super-resolution processing and noise reduction processing. At this time, the SR-NR unit 304 performs super-resolution processing and noise reduction processing together. The SR-NR unit 304 performs such processing on each viewpoint image to be output (each of the viewpoint R image and viewpoint L image). Also, the SR-NR unit 304 has a disparity detecting unit 311.

The disparity detecting unit 311 is a processing unit the same as the disparity detecting unit 211, and detects disparity between the viewpoint images to be output (between the viewpoint R image and viewpoint L image). The SR-NR unit 304 performs super-resolution processing using the detected disparity. Also, the disparity detected by the disparity detecting unit 311 is supplied to the parallax enhancing unit 206 and used for parallax enhancement processing.

SR-NR Unit

Figure 31:
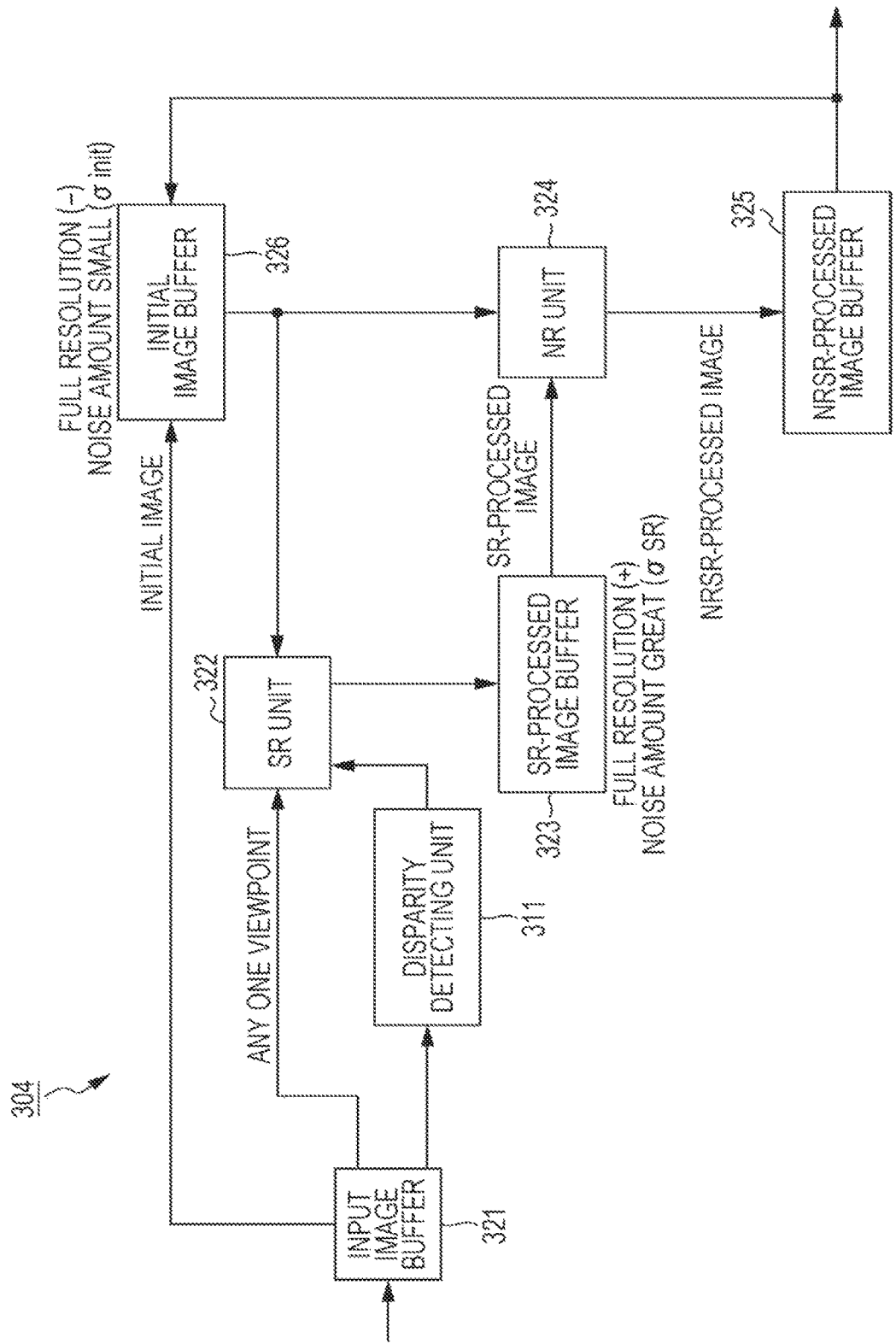
FIG. 31 is a block diagram illustrating a primary configuration example of an SR-NR unit.

FIG. 31 is a block diagram illustrating a primary configuration example of the SR-NR unit. As shown in FIG. 31, the SR-NR unit 304 includes a disparity detecting unit 311, an input image buffer 321, an SR unit 322, an SR processing image buffer 323, an NR unit 324, an NRSR-processed image buffer 325, and an initial image buffer 326.

The input image buffer 321 obtains images of each viewpoint, supplied from the correcting unit 103, and stores these. The input image buffer 321 selects one viewpoint as the viewpoint of interest, either at a predetermined timing or under request from another, and supplies the stored image of the viewpoint of interest to the SR unit 322. Also, the input image buffer 321 supplies all viewpoint images to the disparity detecting unit 311.

The disparity detecting unit 311 detects disparity between all viewpoints using the images of all viewpoints read out from the input image buffer 321. The disparity detecting unit 311 supplies the detected disparity to the SR unit 322. As described above, the disparity detecting unit 311 supplies the detected disparity to the parallax enhancing unit 206 as well.

The SR unit 322 performs super-resolution processing using the input image supplied from the input image buffer 321, the initial image supplied from the initial image buffer 326, and the disparity supplied from the disparity detecting unit 311. The SR unit 322 supplies an SR-processed image, which is the super-resolution processing result, to the SR-processed image buffer 323, so as to be stored.

The SR-processed image buffer 323 stores the SR-processed image supplied thereto. Also, the SR-processed image buffer 323 supplies the SR-processed image stored therein to the NR unit 324, either at a predetermined timing or under request from another.

The NR unit 324 performs noise reduction processing using the SR-processed image supplied from the SR-processed image buffer 323 and the initial image supplied from the initial image buffer 326. The NR unit 324 supplies the processing result (NRSR-processed image) to the NRSR-processed image buffer 325 so as to be stored.

The NRSR-processed image buffer 325 stores the NRSR-processed image supplied thereto. Also, the NRSR-processed image buffer 325 outputs the NRSR-processed image stored therein, either at a predetermined timing or under request from another. Further, the NRSR-processed image buffer 325 supplies the NRSR-processed image stored therein to the initial image buffer 326, as an initial image, either at a predetermined timing or under request from another.

The initial image buffer 326 stores the input image supplied from the input image buffer 321 or the NRSR-processed image supplied from the NRSR-processed image buffer 325. Also, the initial image buffer 326 supplies the initial image stored therein to the SR unit 322 and NR unit 324, either at a predetermined timing or under request from another.

For example, the super-resolution processing performed by the SR unit 104 can be expressed as with the following Expression (2).

$$f_{SR} = f_{init} - \beta \cdot W^T H^T D^T \cdot (DHW f_{init} - g_k) \quad (2)$$

Also, for example, the noise reduction processing by the NR unit 105 can be expressed as with the following Expression (3).

$$f_{NR \cdot SR} = \frac{\sigma_{SR} \cdot f_{init} + \sigma_{init} \cdot f_{SR}}{\sigma_{init} + \sigma_{SR}} \quad (3)$$

On the other hand, the SR-NR unit 304 performs super-resolution processing and noise reduction processing together. That is to say, the processing performed by the SR-NR unit 304 can be expressed as with the following Expression (4), in which the above Expressions (2) and (3) are combined.

$$f_{NR \cdot SR} = \quad (4)$$
$$\left(1 - \frac{\beta \cdot \sigma_{init}}{\sigma_{init} + \sigma_{SR}} W^T H^T D^T DHW\right) \cdot f_{init} + \frac{\beta \cdot \sigma_{init}}{\sigma_{init} + \sigma_{SR}} W^T H^T D^T \cdot g_k.$$

Accordingly, the SR-NR unit 304 can obtain the processing results of having performed both super-resolution processing and noise reduction processing, more easily than a case of performing the super-resolution processing and noise reduction processing separately.

The SR-NR unit 304 performs processing such as described above on each viewpoint to be output (viewpoint R and viewpoint L). Note that the SR-NR unit 304 may be arranged to have multiple configurations such as shown in FIG. 31, so that processing on each image of the multiple viewpoints can be executed in parallel.

Flow of Image Processing

Figure 32:
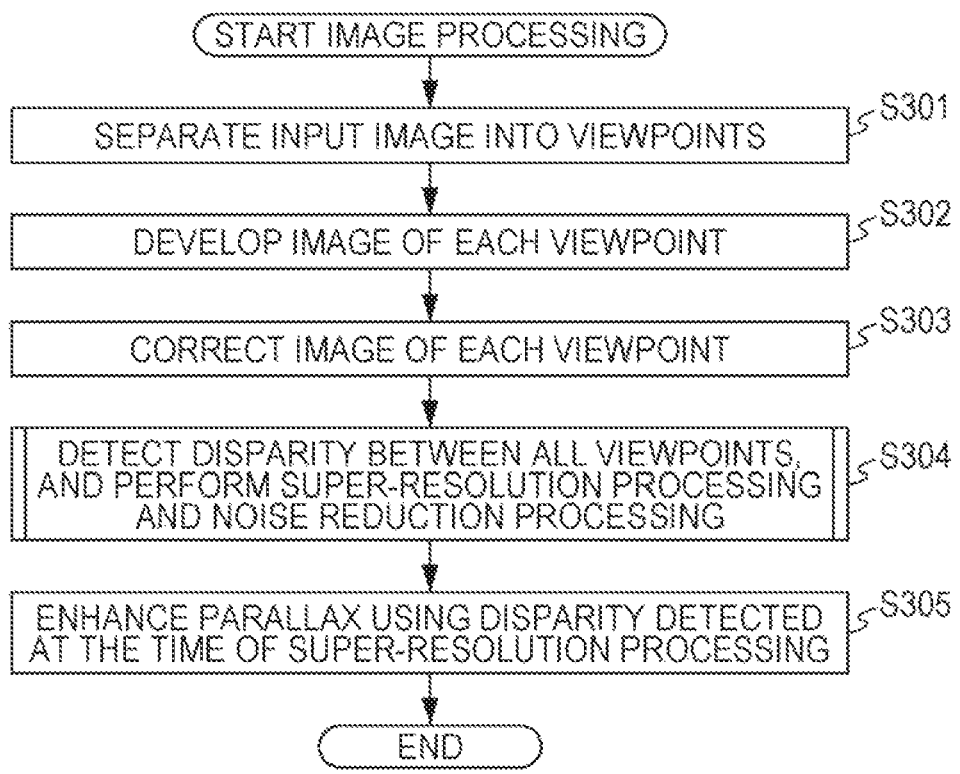
FIG. 32 is a flowchart for describing an example of the flow of image processing.
Figure 33:
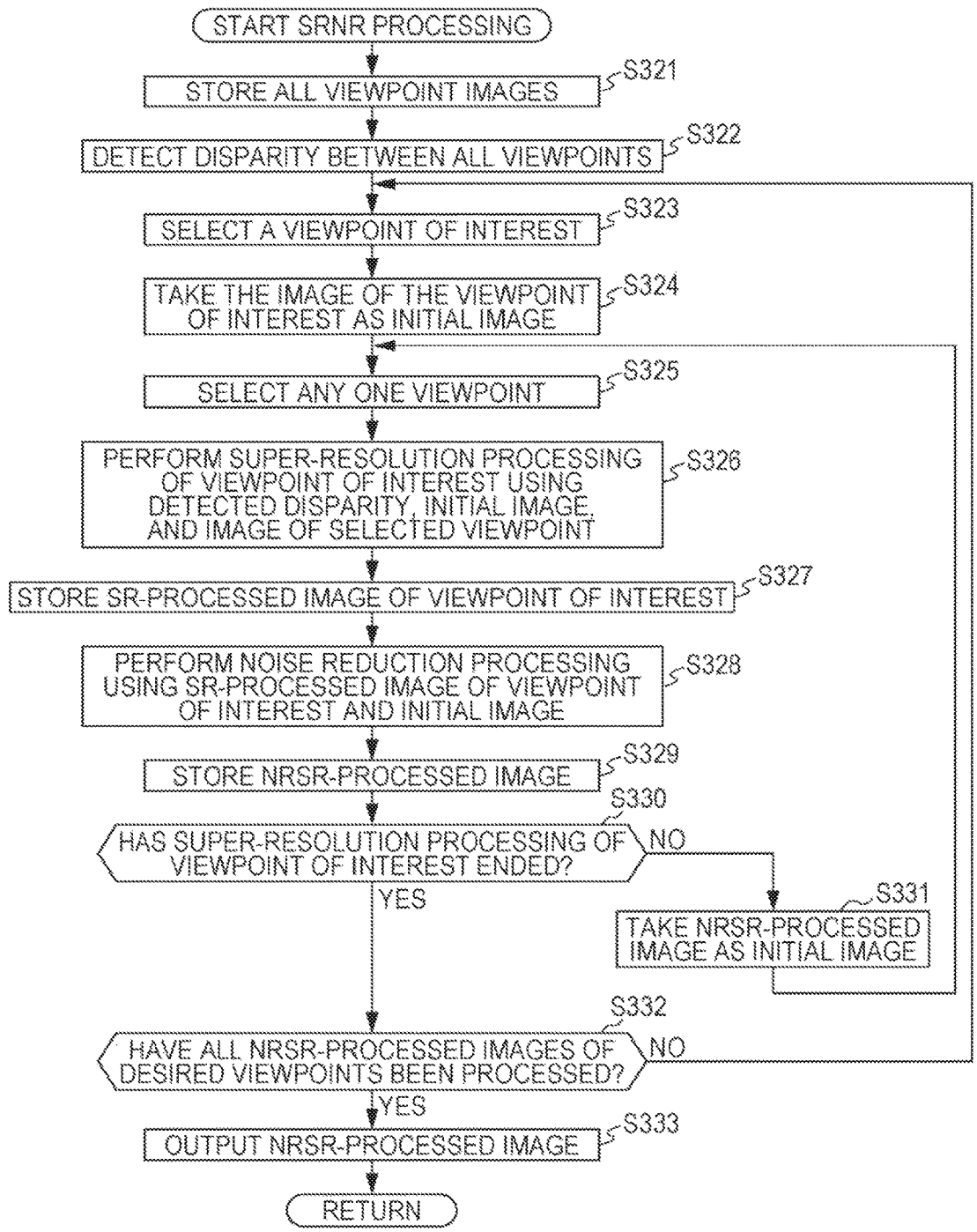
FIG. 33 is a flowchart for describing an example of the flow of SRNR processing.

An example of the image processing executed by the image processing device 300 will be described with reference to the flowchart in FIG. 32. The processing of steps S301 through S303 are executed in the same way as the processing of steps S201 through S203 in FIG. 27.

In step S304, the SR-NR unit 304 detects disparity between all viewpoints, and performs super-resolution processing and noise reduction processing.

Figure 27:
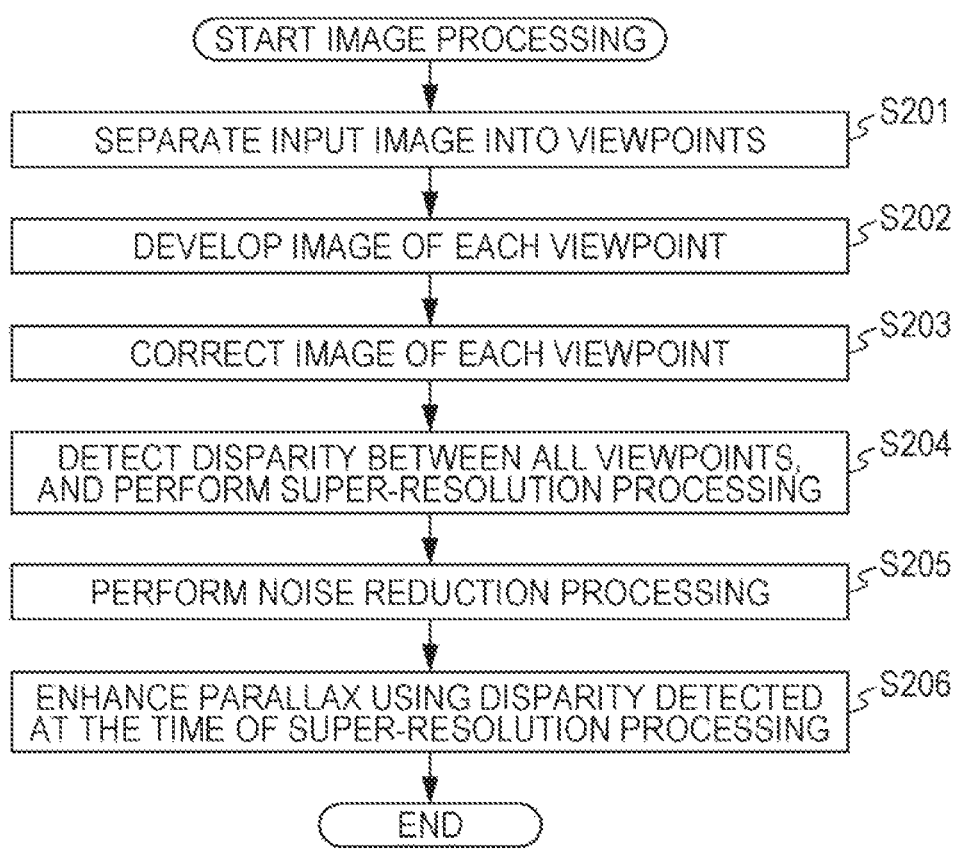
FIG. 27 is a flowchart for describing an example of the flow of image processing.

The processing of step S305 is performed the same as with the processing of step S206 in FIG. 27. Upon the processing of step S305 ending, the parallax enhancing unit 206 ends the image processing.

Flow of SRNR Processing

Next, an example of the flow of SRNR processing executed at step S304 in FIG. 32 will be described. Upon the SRNR processing being started, in step S321, the input image buffer 321 stores images of all viewpoints.

In step S322, the disparity detecting unit 311 detects disparity between all viewpoints, using the images of all viewpoints stored in step S311.

In step S323, the SR unit 322 selects a viewpoint of interest to be processed.

In step S324, the initial image buffer 326 takes the image of the viewpoint of interest as the initial image.

In step S325, the SR unit 322 selects any one viewpoint, and obtains the image of that viewpoint from the input image buffer 321.

In step S326, the SR unit 322 performs super-resolution processing of the viewpoint of interest, using the disparity detected by the processing in step S322, the initial image, and the image of the viewpoint selected in step S325.

In step S327, the SR-processed image buffer 323 stores the SR-processed image of the viewpoint of interest generated by the processing in step S326.

In step S328, the NR unit 324 reads out the SR-processed image of the viewpoint of interest stored in step S327 from the SR-processed image buffer 323, and performs noise reduction processing using the SR-processed image of that viewpoint of interest and the initial image read out from the initial image buffer 326.

In step S329, the NRSR-processed image buffer 325 stores the NRSR-processed image generated by the processing in step S328.

In step S330, the NRSR-processed image buffer 325 determines whether or not the super-resolution processing of the viewpoint of interest has ended, and in the event that determination is made that this has not ended, the flow advances to step S331.

In step S331, the initial image buffer 326 reads out the NRSR-processed image stored by the processing in step S329, and stores this as the initial image. Upon the processing in step S331 ending, the initial image buffer 326 returns the flow to step S325, and the subsequent processing is repeated. In step S325, one viewpoint is newly selected from unprocessed viewpoints.

Upon repeating each processing of steps S325 through S331, and determination having been made in step S330 that the super-resolution processing of the viewpoint of interest has ended, the NRSR-processed image buffer 325 advances the flow to step S332.

In step S332, the NRSR-processed image buffer 325 determines whether or not all NRSR-processed images of the desired viewpoints (all viewpoints to be output) have been processed. In the event that determination is made that there remains an unprocessed image, the NRSR-processed image buffer 325 returns the flow to step S323, and the subsequent processing is repeated. In step S323, one viewpoint is newly selected from unprocessed viewpoints.

Upon repeating each processing of steps S323 through S332, and determination having been made in step S332 that all NRSR-processed images of the desired viewpoints (all viewpoints to be output) have been processed, the NRSR-processed image buffer 325 advances the flow to step S333, and the NRSR-processed image is output. Upon the processing of step S333 ending, the NRSR-processed image buffer 325 ends SRNR processing, and the flow returns to FIG. 32.

By performing processing as described above, the SR-NR unit 304 can obtain the image of the processing results of having performed both super-resolution processing and noise reduction processing, more easily than a case of performing the super-resolution processing and noise reduction processing separately. That is to say, the image processing device 300 can reduce the load of image processing.

Image Processing Device

While description has been made above regarding an arrangement where the image processing device 300 uses images other viewpoints of the frame of interest, the arrangement is not restricted to this, and an image of the previous frame may be used as the initial image, for example.

Figure 34:
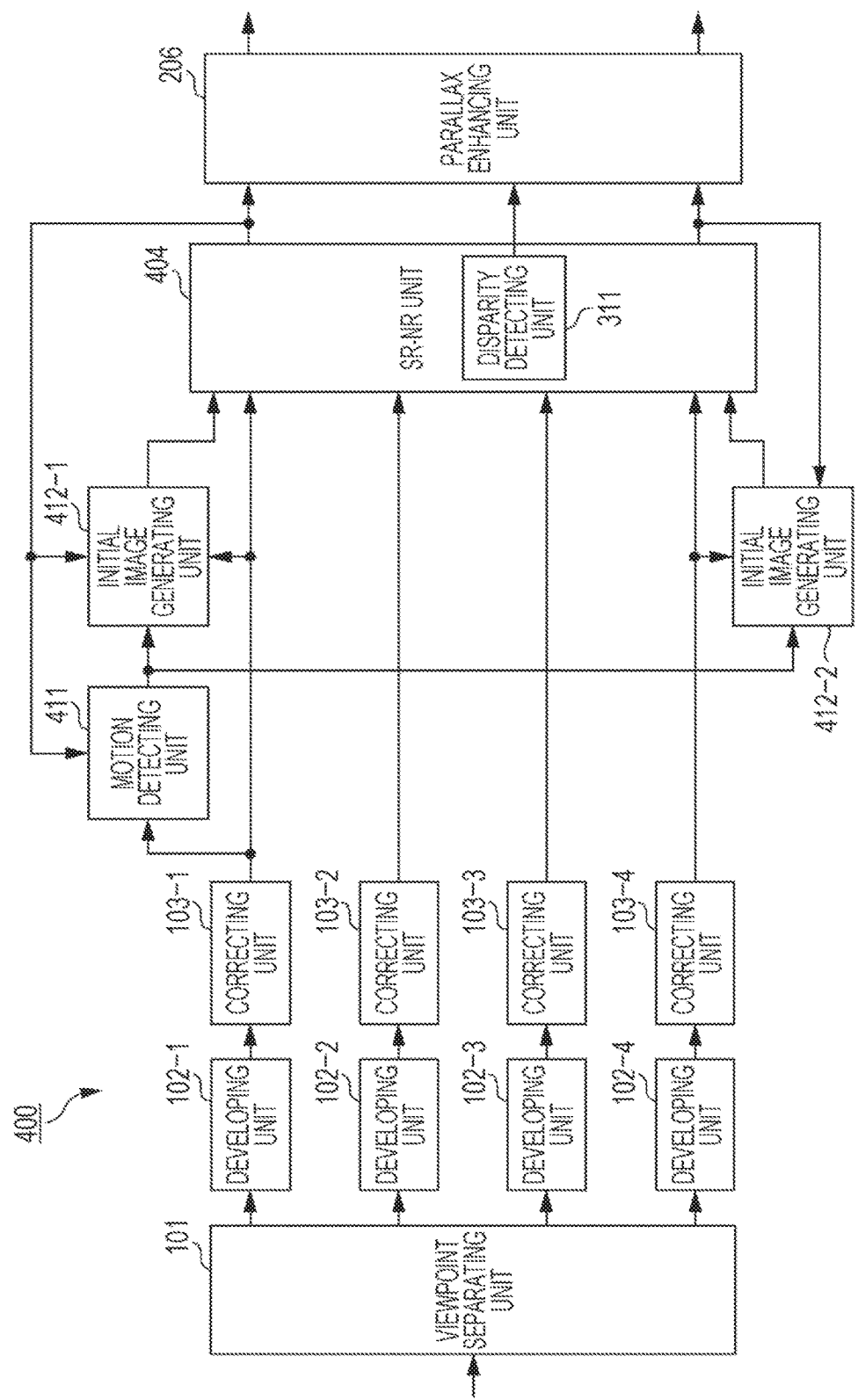
FIG. 34 is a block diagram illustrating a primary configuration example of an image processing device.

FIG. 34 is a block diagram illustrating a primary configuration example of the image processing device. The image processing device 400 shown in FIG. 34 is a device which is basically the same as the image processing device 300, has the same configuration, and performs the same processing. Note however, that the image processing device 400 has an SR-NR unit 404, motion detecting unit 411, and initial image generating unit 412-1 and initial image generating unit 412-2, instead of the SR-NR unit 304. Note that in the following description, in the event that the initial image generating unit 412-1 and initial image generating unit 412-2 do not have to be distinguished from each other, these will be simply referred to as "initial image generating unit 412".

With the image processing device 400 shown in FIG. 34, the SR-NR unit 404 performs super-resolution processing and noise reduction processing using an initial image generated using the image of the frame of interest and the image of a past frame temporally prior to the frame of interest. That is to say, with the SR-NR unit 404, the initial image buffer 326 in the configuration example described with reference to FIG. 31 is omitted, and instead a configuration is made wherein the initial image supplied from the initial image generating unit 412 is supplied to the SR unit 322 and NR unit 324, for example.

The motion detecting unit 411 detects motion between frames (motion vector) with regard to the image of the frame of interest and the image of the past frame, used for generating the initial image. The motion detecting unit 411 supplies the detected motion vector to the initial image generating unit 412-1 and initial image generating unit 412-2.

The initial image generating unit 412-1 generates an initial image regarding one viewpoint to be output (e.g., the viewpoint R). The initial image generating unit 412-1 performs motion compensation for the viewpoint R image of the past frame, using the motion vector supplied from the motion detecting unit 411, and generates an initial image using this motion compensation result and the viewpoint R image of the frame of interest. That is to say, the initial image generating unit 412-1 positions the image of the past frame with the image of the frame of interest, and thereafter generates an initial image using both images.

The initial image generating unit 412-2 generates an initial image regarding one viewpoint to be output (e.g., the viewpoint L). The initial image generating unit 412-2 performs motion compensation for the viewpoint L image of the past frame, using the motion vector supplied from the motion detecting unit 411, and generates an initial image using this motion compensation result and the viewpoint L image of the frame of interest. That is to say, the initial image generating unit 412-2 positions the image of the past frame with the image of the frame of interest, and thereafter generates an initial image using both images.

That is to say, the initial image generating unit 412 generates initial images for each viewpoint to be output. At this time, the initial image generating unit 412 positions the image of the past frame with the image of the frame of interest, and thereafter generates an initial image using both images. The initial image generating unit 412 supplies the generated initial images to the SR-NR unit 404. By generating the initial image used for super-resolution processing and noise reduction processing, using an image of a past frame, the image processing device 400 can improve the image quality of the generated NRSR image.

Flow of Image Processing

An example of the image processing in this case will be described with reference to the flowchart in FIG. 35. The processing of steps S401 through S403 are executed in the same way as the processing of steps S301 through S303 in FIG. 32.

In step S404, the motion detecting unit 411 performs motion detecting using the input image and the NRSR-processed image.

In step S405, the initial image generating unit 412 performs motion compensation of the NRSR-processed image, using the motion vector detected by the processing in step S404, and generates an initial image.

In step S406, the SR-NR unit 404 detects disparity between all viewpoints, and performs super-resolution processing and noise reduction processing using the initial image generated by the processing in step S405.

In step S407, the parallax enhancing unit 206 performs parallax enhancement using the disparity detected at the time of the super-resolution processing in step S406.

Upon the processing of step S407 ending, the parallax enhancing unit 206 ends the image processing. By performing the above processing, the image processing device 400 can improve the image quality of the generated NRSR image.

Image Processing Device

Further, the arrangement is not restricted to using an image of a viewpoint of interest as the image of the past frame, and an initial image may be generated using an image of another viewpoint, as well.

Figure 36:
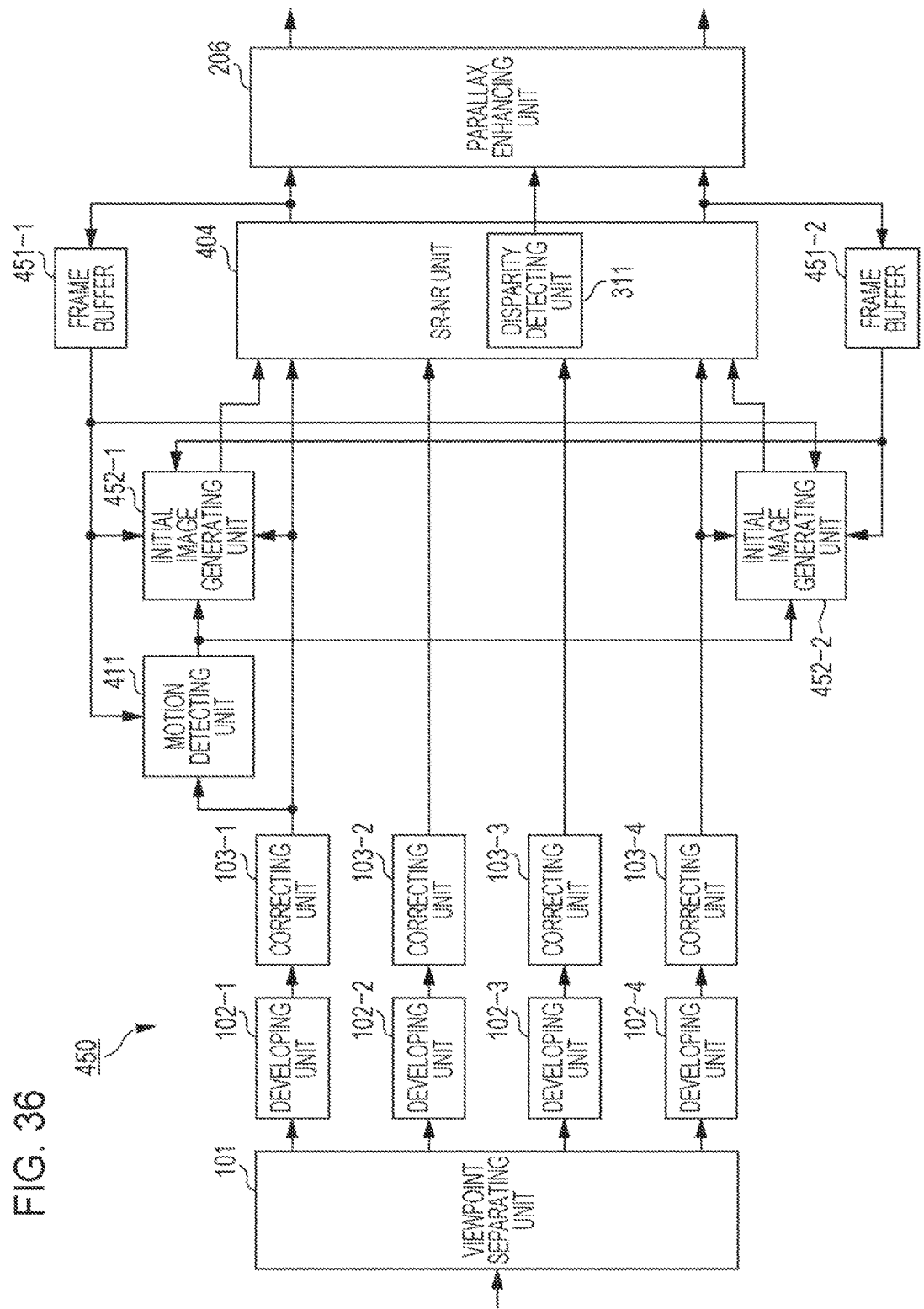
FIG. 36 is a block diagram illustrating a primary configuration example of an image processing device.

FIG. 36 is a block diagram illustrating a primary configuration example of an image processing device. The image processing device 450 shown in FIG. 36 is a device basically the same as the image processing device 400, has the same configuration, and performs the same processing. Note however, that the image processing device 450 further includes, in addition to the configuration of the image processing device 400, a frame buffer 451-1 and frame buffer 451-2. Also, instead of the initial image generating unit 412-1 and initial image generating unit 412-2, the image processing device 450 includes an initial image generating unit 452-1 and initial image generating unit 452-2.

Note that in the following description, in the event that the frame buffer 451-1 and frame buffer 451-2 do not have to be distinguished from each other, these will be simply referred to as "frame buffer 451". Also, in the event that the initial image generating unit 452-1 and initial image generating unit 452-2 do not have to be distinguished from each other, these will be simply referred to as "initial image generating unit 452".

The NRSR-processed image of the viewpoint R output from the SR-NR unit 404 is supplied to the frame buffer 451-1 and stored. At a predetermined timing or under control of another, the frame buffer 451-1 supplies the NRSR-processed image of the viewpoint R stored in itself to the motion detecting unit 411 and initial image generating unit 452-1, as an image of a past frame. The frame buffer 451-1 further supplies the NRSR-processed image of the viewpoint R to the initial image generating unit 452-2 corresponding to the viewpoint L, as well.

In the same way, the NRSR-processed image of the viewpoint L output from the SR-NR unit 404 is supplied to the frame buffer 451-2 and stored. At a predetermined timing or under control of another, the frame buffer 451-2 supplies the NRSR-processed image of the viewpoint L stored in itself to the motion detecting unit 411 and initial image generating unit 452-2, as an image of a past frame. The frame buffer 451-2 further supplies the NRSR-processed image of the viewpoint L to the initial image generating unit 452-1 corresponding to the viewpoint R, as well.

The initial image generating unit 452-1 generates an initial image for the viewpoint R, using the viewpoint R image of the frame of interest, the viewpoint R image and viewpoint L image of the past frame, and the motion vector detected by the disparity detecting unit 411. The initial image generating unit 452-2 generates an initial image for the viewpoint L, using the viewpoint L image of the frame of interest, the viewpoint R image and viewpoint L image of the past frame, and the motion vector detected by the disparity detecting unit 411.

That is to say, the initial image generating unit 452 generates an initial image of the viewpoint of interest, using an image of the viewpoint of interest of the frame of interest, an image of the viewpoint of interest of a past frame and an image of a viewpoint other than the viewpoint of interest, and the motion vector detected by the disparity detecting unit 411. Thus, the initial image generating unit 452 can generate an initial image with higher image quality. Accordingly, the SR-NR unit 404 can obtain an NRSR image with higher image quality. That is to say, the image processing device 450 can further improve the image quality of the generated NRSR image.

Flow of Image Processing

Figure 37:
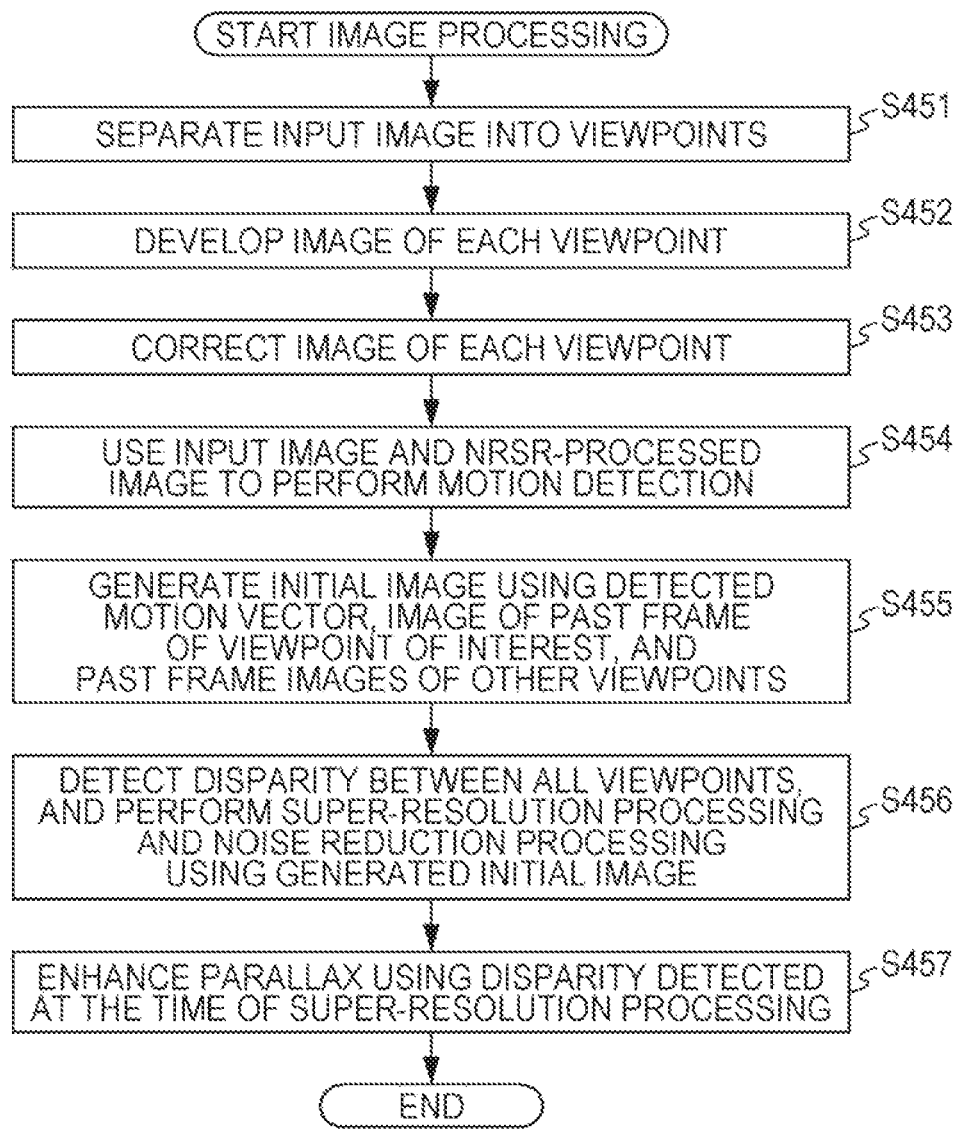
FIG. 37 is a flowchart for describing an example of the flow of image processing.

An example of the flow of image processing executed by the image processing device 450 will be described with reference to the flowchart in FIG. 37. The processing of steps S451 through S454 are executed in the same way as the processing of steps S401 through S404 in FIG. 35.

In step S455, the initial image generating unit 452 generates an initial image using the motion vector detected by the processing in step S454, the image of the frame of interest at the viewpoint of interest, the image of a past frame at the viewpoint of interest, and the image of a past frame at another viewpoint.

Figure 35:
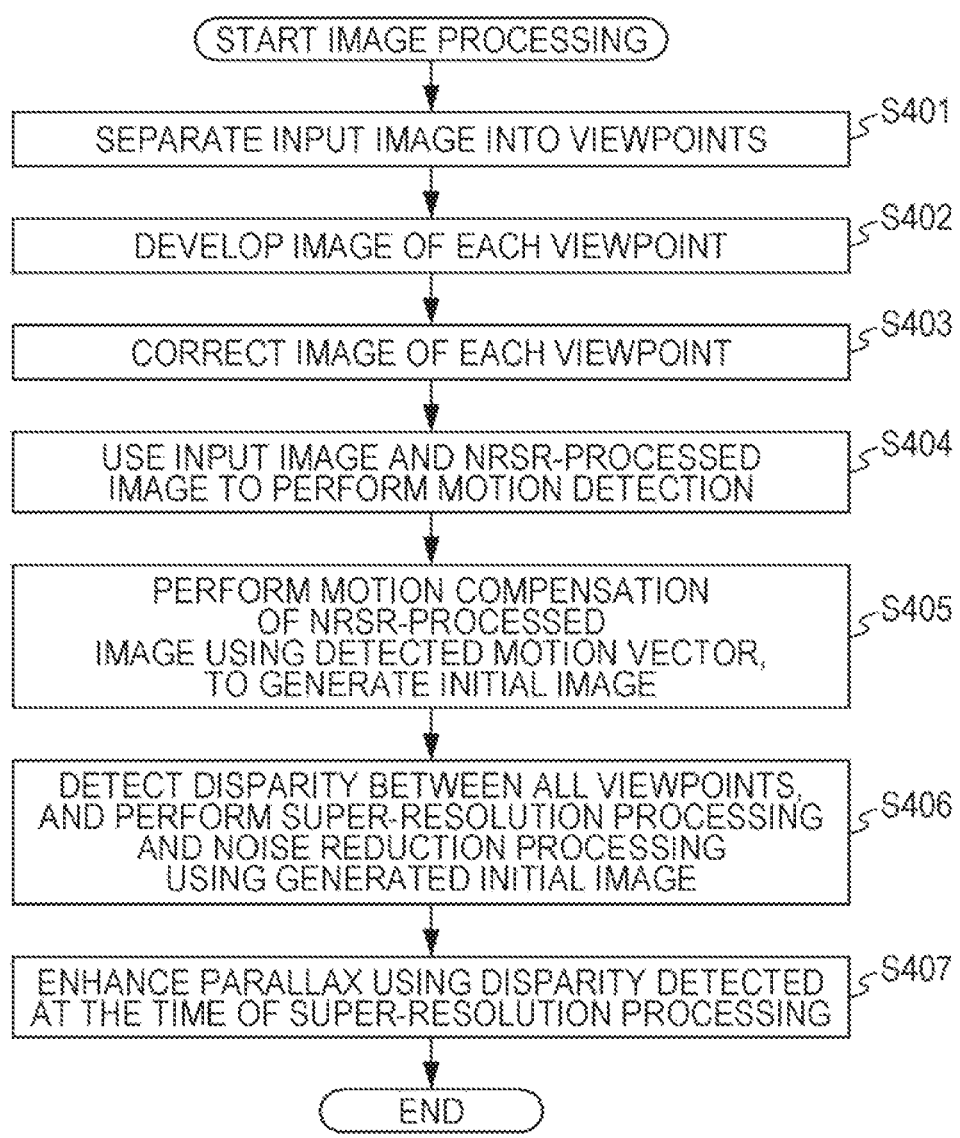
FIG. 35 is a flowchart for describing an example of the flow of image processing.

The processing of steps S456 and S457 are executed in the same way as the processing of steps S406 and S407 in FIG. 35. By executing processing thus, the image processing device 450 can improve the image quality of the generated NRSR image.

Image Processing Device

While description has been made above regarding an arrangement where the SR unit and NR unit generate NRSR-processed images for multiple viewpoints, an arrangement may be made where the SR unit and NR unit generate an NRSR-processed image for a single viewpoint (i.e., a middle viewpoint), and then generate multiple-viewpoint (e.g., viewpoint R and viewpoint L) images from the single-viewpoint image.

Figure 38:
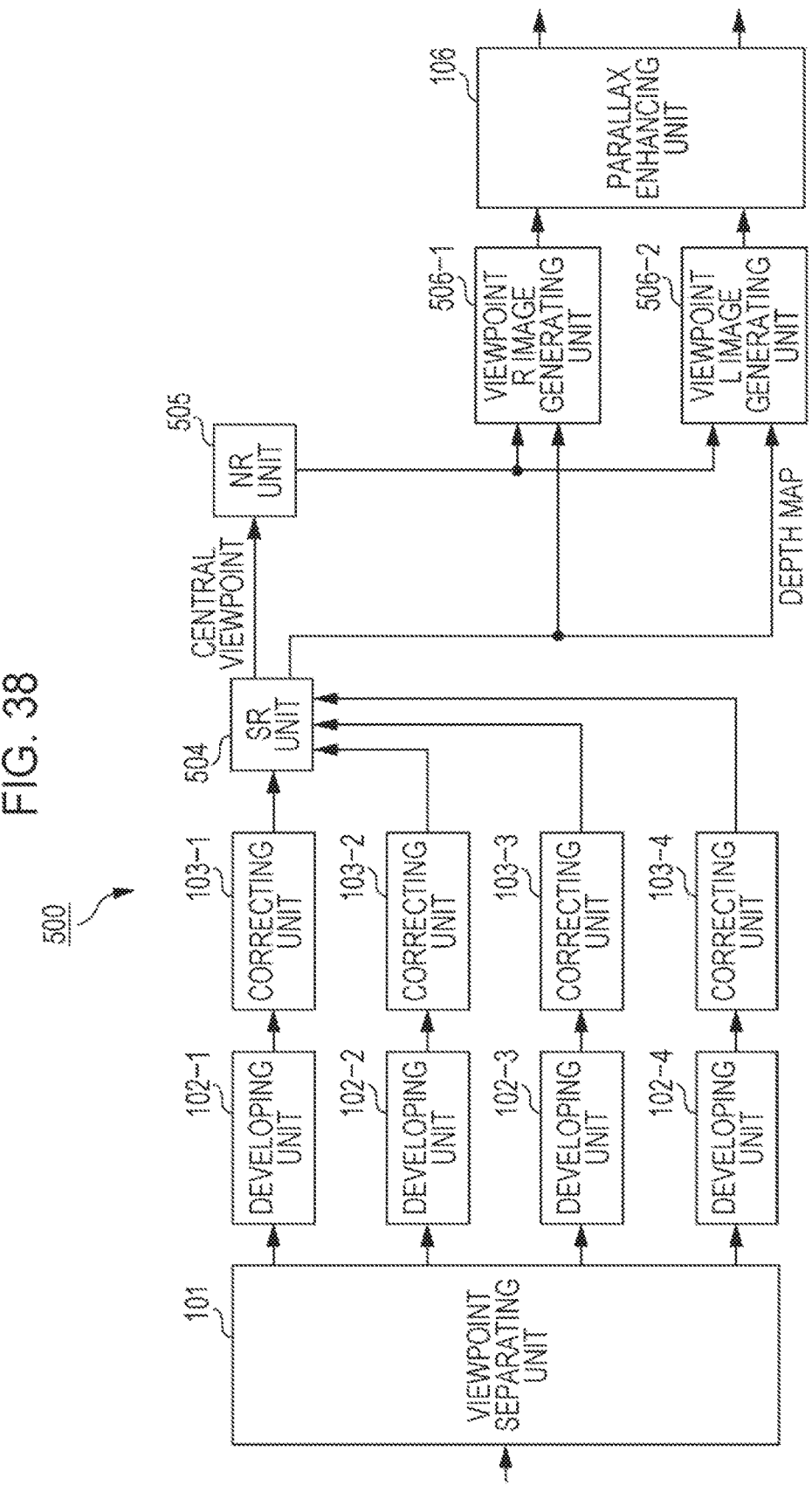
FIG. 38 is a block diagram illustrating a primary configuration example of an image processing device.

FIG. 38 is a block diagram illustrating a primary configuration example of the image processing device. The image processing device 500 is basically the same device as the image processing device 100 in FIG. 12, has the same configuration, and performs the same processing. Note however, that the image processing device 500 has an SR unit 504 instead of the SR unit 104, an NR unit 505 instead of the NR unit 105, and further includes a viewpoint R image generating unit 506-1 and a viewpoint L image generating unit 506-2. Note that in the following description, in the event that the viewpoint R image generating unit 506-1 and viewpoint L image generating unit 506-2 do not have to be distinguished from each other, these will be simply referred to as "image generating unit 506".

The SR unit 504 does not have multiple super-resolution processing units 152 as with the SR unit 104 shown in FIG. 20, and has one disparity detecting unit 151 and one super-resolution processing unit 152. The one super-resolution processing unit 152 performs super-resolution processing on the image of one predetermined viewpoint (e.g., the middle viewpoint). Accordingly, the SR unit 504 outputs the super-resolution processing result image (SR-processed image) of the one predetermined viewpoint (e.g., the middle viewpoint), and supplies this to the NR unit 505.

The SR unit 504 has a depth map generating unit (not illustrated) which generates a depth map which is map information indicating the depthwise position of each pixel, using the disparity detected by the disparity detecting unit 151. This depth map is practically equivalent to disparity, with only the way of expression being different. The SR unit 504 supplies this depth map to the viewpoint R image generating unit 506-1 and viewpoint L image generating unit 506-2.

The NR unit 505 is a processing unit the same as the NR unit 105, except for processing single-viewpoint images. That is to say, the NR unit 505 has a configuration such as shown in FIG. 9, performs noise reduction processing on an SR-processed image of one predetermined viewpoint (e.g., the middle viewpoint) supplied from the SR unit 504, generates an NRSR-processed image of that one certain viewpoint (e.g., the middle viewpoint), and supplies this to each of the viewpoint R image generating unit 506-1 and viewpoint L image generating unit 506-2.

The viewpoint R image generating unit 506-1 uses the supplied depth map to generate a viewpoint R image from the supplied NRSR-processed image, and supplies the generated viewpoint R image to the parallax enhancing unit 106. The viewpoint L image generating unit 506-2 uses the supplied depth map to generate a viewpoint L image from the supplied NRSR-processed image, and supplies the generated viewpoint L image to the parallax enhancing unit 106.

That is to say, the image generating unit 506 uses the depth map supplied from the SR unit 504 to generate images of multiple viewpoints from the NRSR-processed image supplied form the NR unit 505. The parallax enhancing unit 106 controls the amount of parallax of the multiple viewpoint images generated in this way.

Thus, super-resolution processing and noise reduction processing, which is a great load, only has to be performed for a single-viewpoint image, so the image processing device 500 can reduce the load of image processing. That is to say, the image processing device 500 can perform image processing using hardware resources more efficiently, thereby suppressing increase in costs, larger circuit scale, increased processing time, and so forth.

Flow of Image Processing

An example of the flow of image processing in this case will be described with reference to the flowchart in FIG. 39. The following is a description regarding an example of a case of the SR unit 504 and the NR unit 505 performing processing regarding the middle viewpoint.

The processing of steps S501 through S503 are executed in the same way as the processing of steps S101 through S103 in FIG. 18.

In step S504, the SR unit 504 performs super-resolution processing regarding, of the multi-viewpoint image, the image of the middle viewpoint, and generates an SR-processed image of the middle viewpoint. Also, the SR unit 504 generates a depth map regarding this multi-viewpoint image.

In step S505, the NR unit 505 performs noise reduction processing as to the SR-processed image of the middle viewpoint generated by the processing in step S504.

In step S506, the image generating unit 506 uses the depth map generated by the processing in step S504 to generate images for each viewpoint to be output, from the NRSR-processed image of the middle viewpoint, generated by the processing in step S505.

In step S507, the parallax enhancing unit 106 enhances (controls) the parallax between the images of each viewpoint, generated by the processing in step S506.

Upon the processing in step S507 ending, the parallax enhancing unit 106 ends the image processing. By performing this processing, the image processing device 500 can reduce the load of image processing.

Image Processing Device

Figure 40:
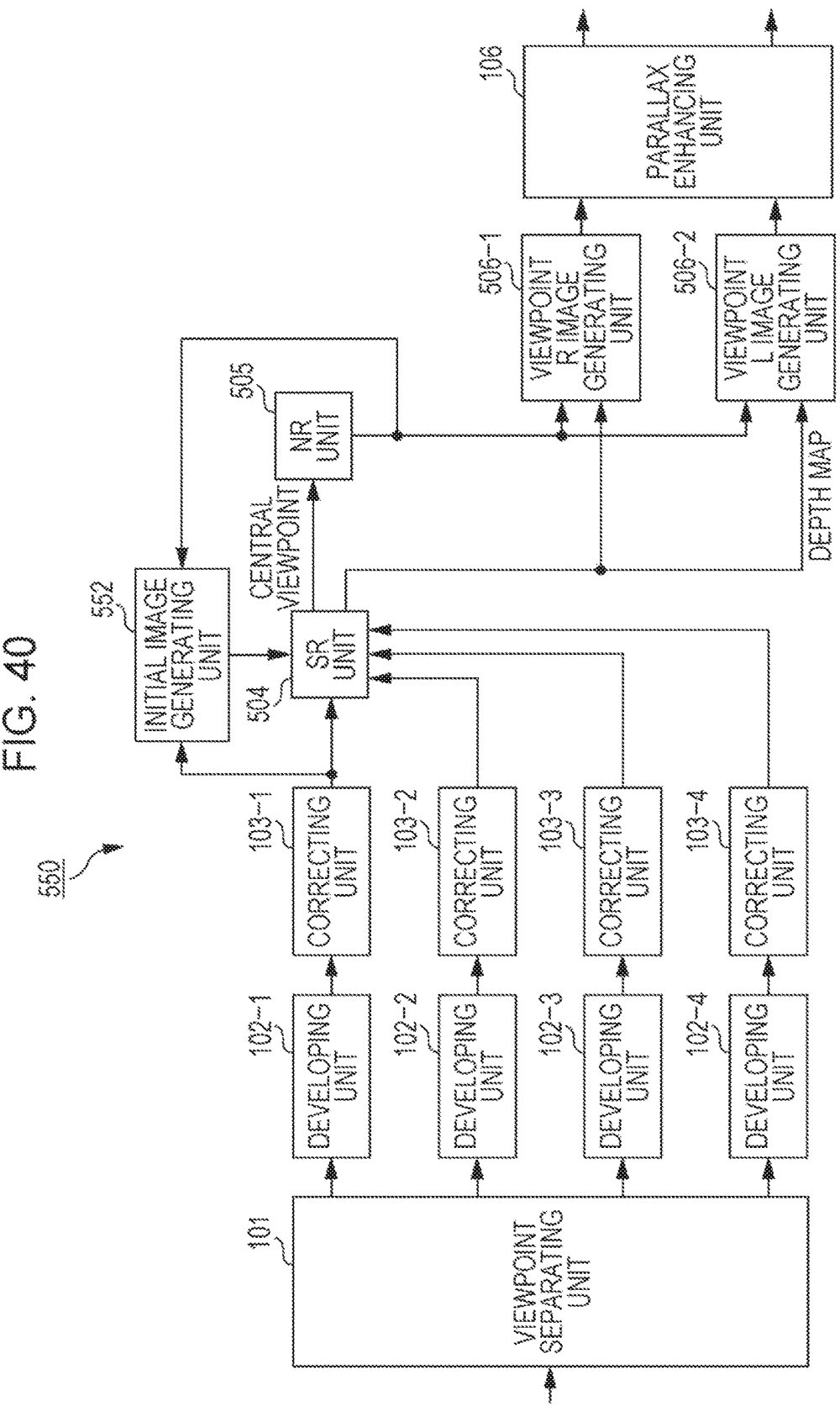
FIG. 40 is a block diagram illustrating a primary configuration example of an image processing device.

Further, the initial image may be generated using an image of a past frame, in the same way as with the case in FIG. 34. FIG. 40 is a block diagram illustrating a primary configuration example of an image processing device. The image processing device 550 shown in FIG. 40 is a device of basically the same configuration as the image processing device 500 in FIG. 38, has the same configuration, and performs the same processing. Note however, that in addition to the configuration of the image processing device 500, the image processing device 550 further has an initial image generating unit 552.

The initial image generating unit 552 generates an initial image for super-resolution processing, using the image of the frame of interest and an image of a past frame, in the same way as with the initial image generating unit 412 in FIG. 34. That is to say, the initial image generating unit 552 supplies the generated initial image to the SR unit 504. The SR unit 504 performs super-resolution processing using this initial image.

Thus, the image processing device 550 can improve the image quality of the SR-processed image. That is to say, the image processing device 550 can further improve the image quality of the multi-viewpoint image to be output.

Flow of Image Processing

Figure 41:
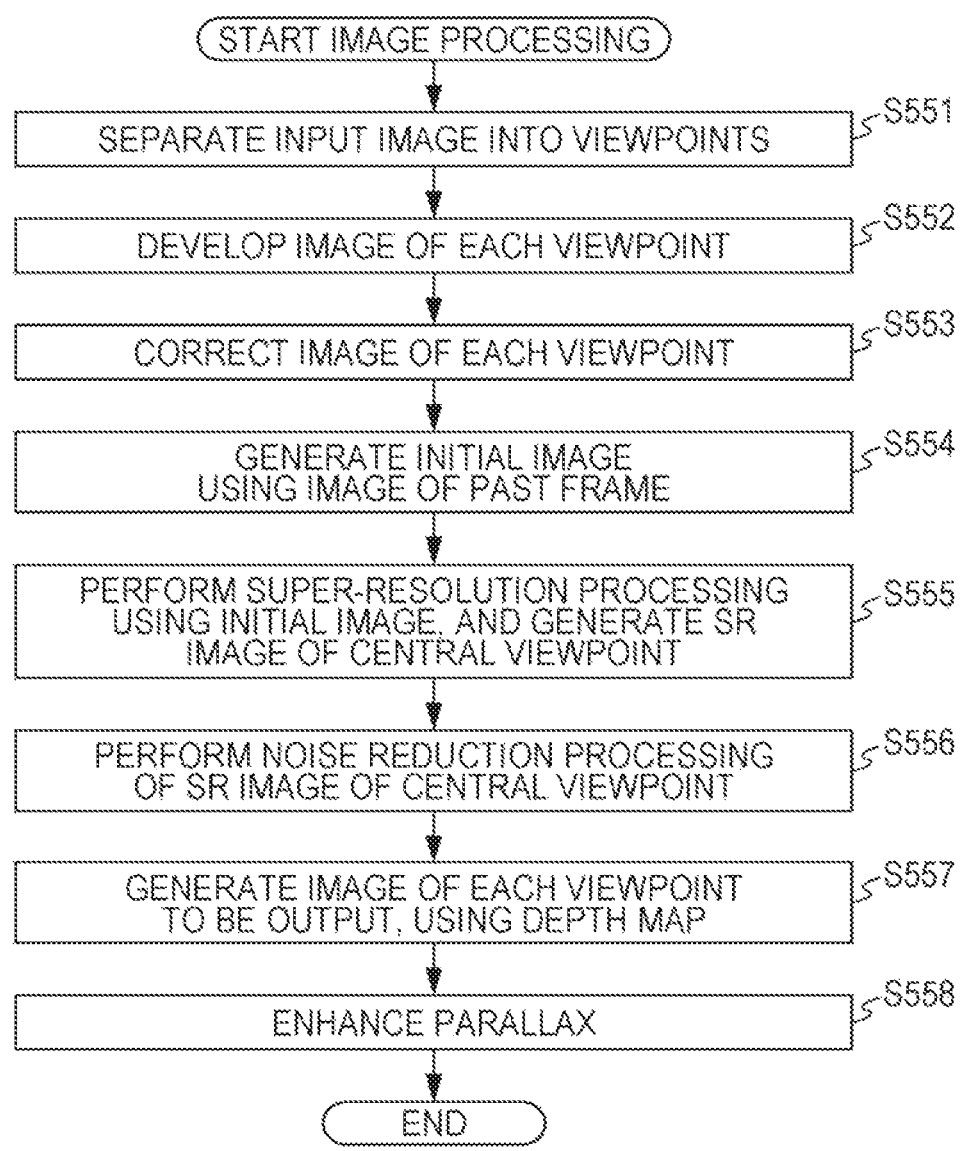
FIG. 41 is a flowchart for describing an example of the flow of image processing.

An example of the flow of image processing executed by the image processing device 550 will be described with reference to the flowchart in FIG. 41. The processing of steps S551 through S553 are executed in the same way as the processing of steps S501 through S503 in FIG. 39.

In step S554, the initial image generating unit 552 generates an initial image using the image of the frame of interest and an image of a past frame.

In step S555, the SR unit 504 performs super-resolution processing using the initial image generated by the processing in step S554, and generates an SR image of the middle viewpoint.

Figure 39:
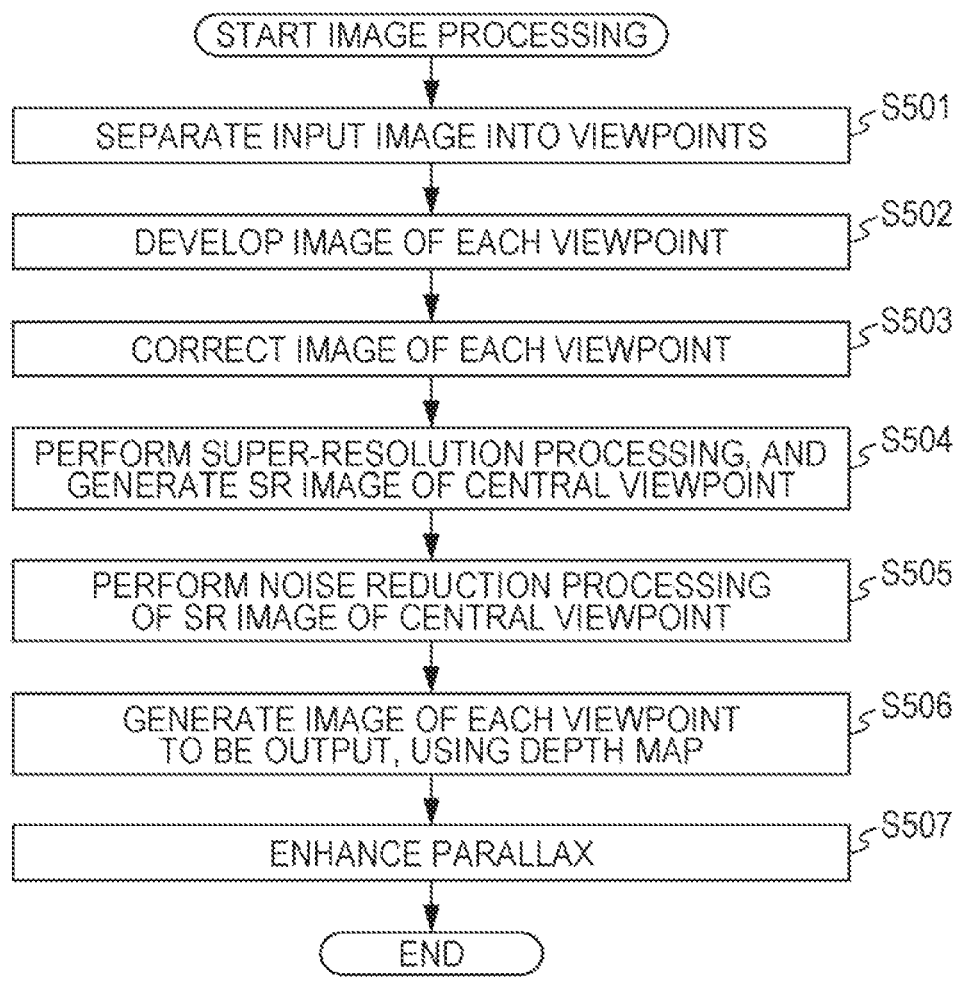
FIG. 39 is a flowchart for describing an example of the flow of image processing.

The processing of steps S556 through S558 are executed in the same way as the processing of steps S505 through S507 in FIG. 39.

Upon the processing of step S558 ending, the parallax enhancing unit 106 ends the image processing. By performing such processing, the image processing device 550 can improve the image quality of the multi-viewpoint image to be output.

Image Processing Device

Also, while description has been made above that in the case of performing image processing on a multi-viewpoint image, processing is performed in parallel on each viewpoint image of the multi-viewpoint image, and arrangement may be made where image processing as to the viewpoint images is performed sequentially.

Figure 42:
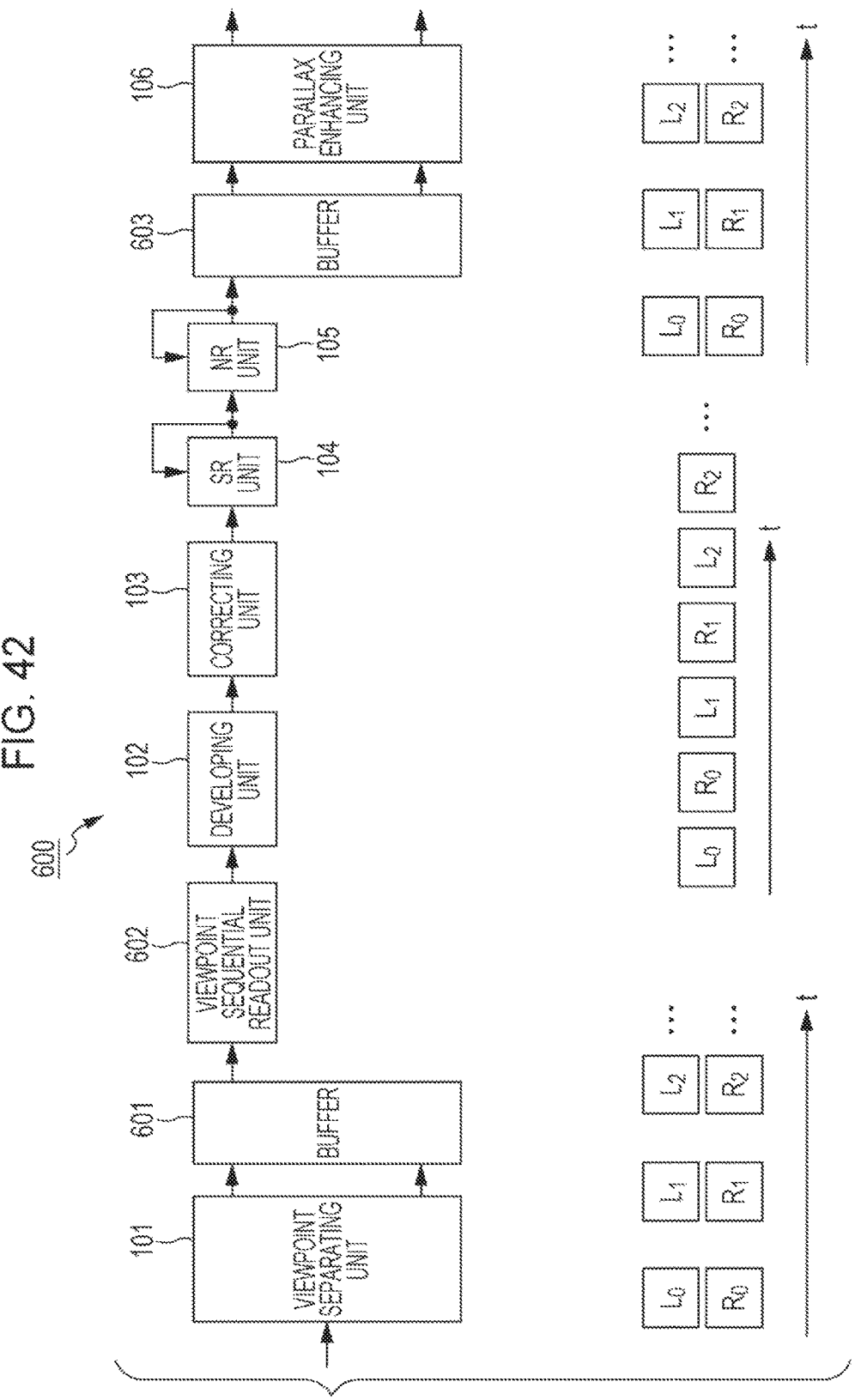
FIG. 42 is a block diagram illustrating a primary configuration example of an image processing device.

FIG. 42 is a block diagram illustrating a primary configuration example of an image processing device. The image processing device 600 illustrated in FIG. 42 performs developing, correction, super-resolution processing, and noise reduction processing, on each viewpoint image of a multi-viewpoint image, sequentially for each viewpoint.

To this end, the image processing device 600 includes one each of the viewpoint separating unit 101, developing unit 102, correcting unit 103, SR unit 104, NR unit 105, and parallax enhancing unit 106. The image processing device 600 further has a buffer 601, a viewpoint sequential readout unit 602, and a buffer 603, to sequentially process each viewpoint image.

The viewpoint separating unit 101 separates the multi-viewpoint image into individual viewpoints, and supplies to the buffer 601 so as to be stored. The buffer 601 stores the images of the viewpoints supplied from the viewpoint separating unit 101.

The viewpoint sequential readout unit 602 sequentially selects one viewpoint of interest at a time to be processed, from the multiple viewpoints, and reads out the image of that viewpoint of interest from the buffer 601. The viewpoint sequential readout unit 602 supplies the image of the viewpoint of interest that has been read out, to the developing unit 102.

The developing unit 102 develops the image of the viewpoint of interest supplied thereto, and supplies this to the correcting unit 103. The correcting unit 103 corrects the image of the viewpoint of interest supplied thereto, and supplies this to the SR unit 104. The SR unit 104 performs super-resolution processing on the image of the viewpoint of interest supplied thereto so as to raise the resolution thereof to high resolution, and supplies this to the NR unit 105. The NR unit 105 subjects the high-resolution image of the viewpoint of interest supplied thereto to noise reduction processing, and supplies the image of the viewpoint of interest with reduced noise to the buffer 603 so as to be stored.

Upon the above processing on the image of the viewpoint of interest ends, the viewpoint sequential readout unit 602 switches the viewpoint of interest to the next viewpoint, reads out the image of the new viewpoint of interest from the buffer 601, and supplies this to the developing unit 102. That is to say, the developing unit 102 through NR unit 105 each perform their respective processing on the image of the new viewpoint of interest. Repeating such processing subjects all viewpoints of the multi-viewpoint image to processing, and storage in the buffer 603.

Upon storing the images of all viewpoints, the buffer 603 supplies the images of all viewpoints to the parallax enhancing unit 106. The parallax enhancing unit 106 controls the parallax (stereoscopic effect) of the multi-viewpoint image supplied thereto. The parallax enhancing unit 106 then outputs the multi-viewpoint image with the amount of parallax thereof having been controlled. Note that in this case, the SR unit 104 performs processing one viewpoint at a time, so initial images are preferably generated by making reference to images of past frames.

Due to such image processing, the images of the frames (0, 1, 2 . . . ) of each frame of the input multi-viewpoint image (L, R) are arrayed in one row (L0, R0, L1, R1, L2, R2, . . . ) as shown to the bottom in FIG. 42, and the processing of developing through noise reduction is performed one image at a time. The images following processing are stored in the buffer 603 and thereafter output in increments of frames as multi-viewpoint images (L, R).

Thus, the image processing device 600 can process multi-viewpoint images with a smaller configuration. That is to say, the image processing device 600 can perform image processing using hardware resources more efficiently, thereby suppressing increase in costs, larger circuit scale, increased processing time, and so forth.

Flow of Image Processing

Figure 43:
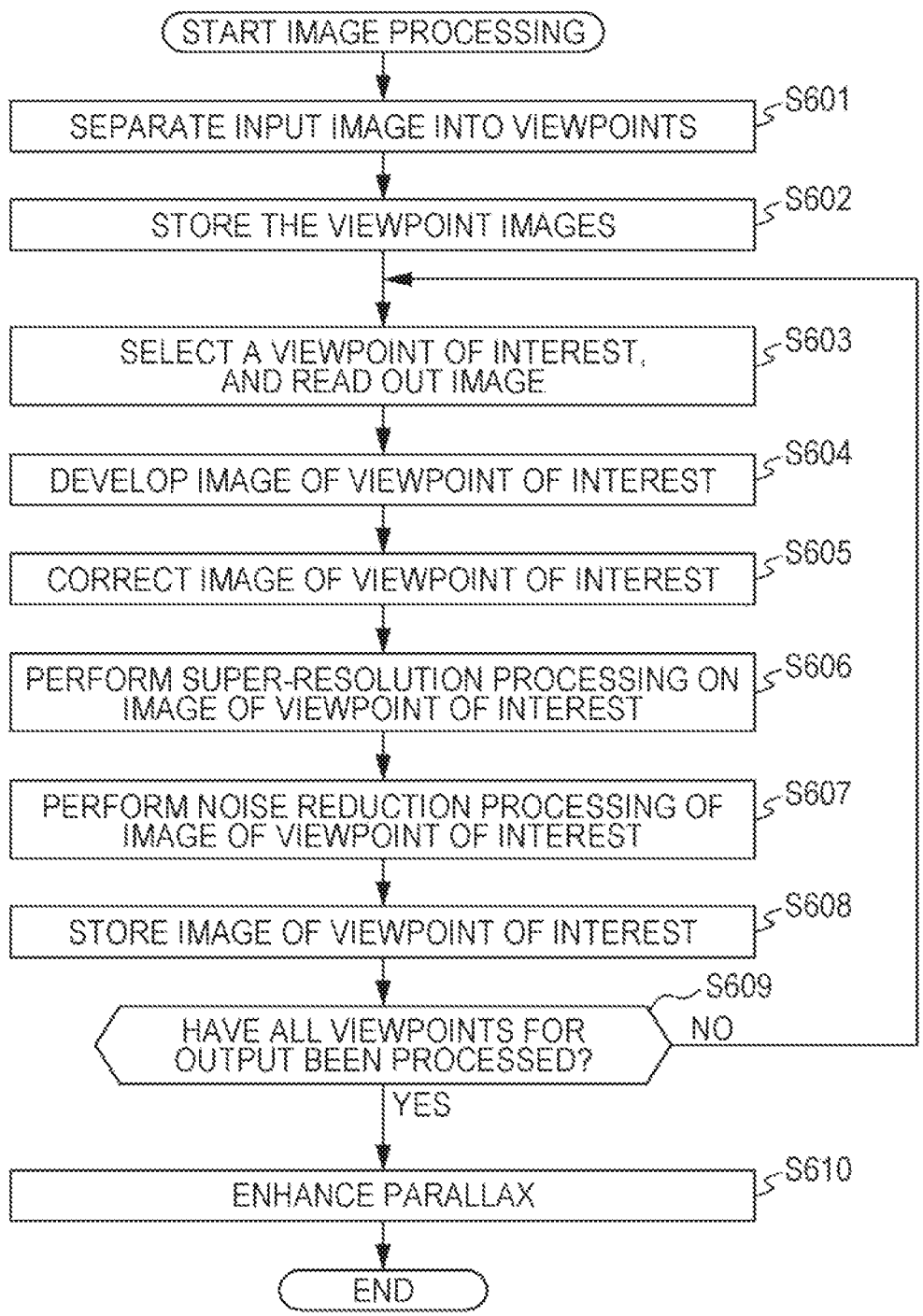
FIG. 43 is a flowchart for describing an example of the flow of image processing.

An example of the flow of image processing executed by the image processing device 600 will be described with reference to the flowchart in FIG. 43.

In step S601, the viewpoint separating unit 101 separates the input multi-viewpoint image into individual viewpoints.

In step S602, the buffer 601 stores the images of the viewpoints.

In step S603, the viewpoint sequential readout unit 602 selects an viewpoint of interest, and reads out the image of that viewpoint of interest, that has been stored in step S602, from the buffer 601.

In step S604, the developing unit 102 develops the image of the viewpoint of interest read out by the processing in step S603.

In step S605, the correcting unit 103 corrects the image of the viewpoint of interest developed by the processing in step S604.

In step S606, the SR unit 104 performs super-resolution processing on the image of the viewpoint of interest corrected by the processing in step S605.

In step S607, the NR unit 105 subjects the image of the viewpoint of interest, of which the resolution has been raised to high-resolution by the processing in step S606 (SR-processed image), to noise reduction processing.

In step S608, the buffer 603 stores the image of the viewpoint of interest of which noise has been reduced by the processing in step S607.

In step S609, the viewpoint sequential readout unit 602 determines whether or not images of all viewpoints have been processed, and in the event that determination is made that there is an unprocessed viewpoint remaining, the flow returns to step S603, a new unprocessed viewpoint is selected as the viewpoint of interest, and subsequent processing is executed.

By the processing of steps S603 through S609 being repeatedly executed, the images of all viewpoints to be output are processed.

In the event that determination is made in step S609 that all viewpoint images to be output have been processed, the viewpoint sequential readout unit 602 advances the flow to step S610.

In step S610, the parallax enhancing unit 106 performs parallax enhancement processing using the multiple images with different viewpoints stored in the buffer 603, and controls the amount of disparity between the viewpoints.

Upon the processing of step S610 ends, the parallax enhancing unit 106 ends the image processing. By performing processing in this way, the image processing device 600 can perform image processing using hardware resources more efficiently, thereby suppressing increase in costs and larger circuit scale.

2. Second Embodiment

Imaging Apparatus

The image processing device described above may be configured as a part of another device. For example, it may be an image processing unit built into an imaging apparatus.

Figure 44:
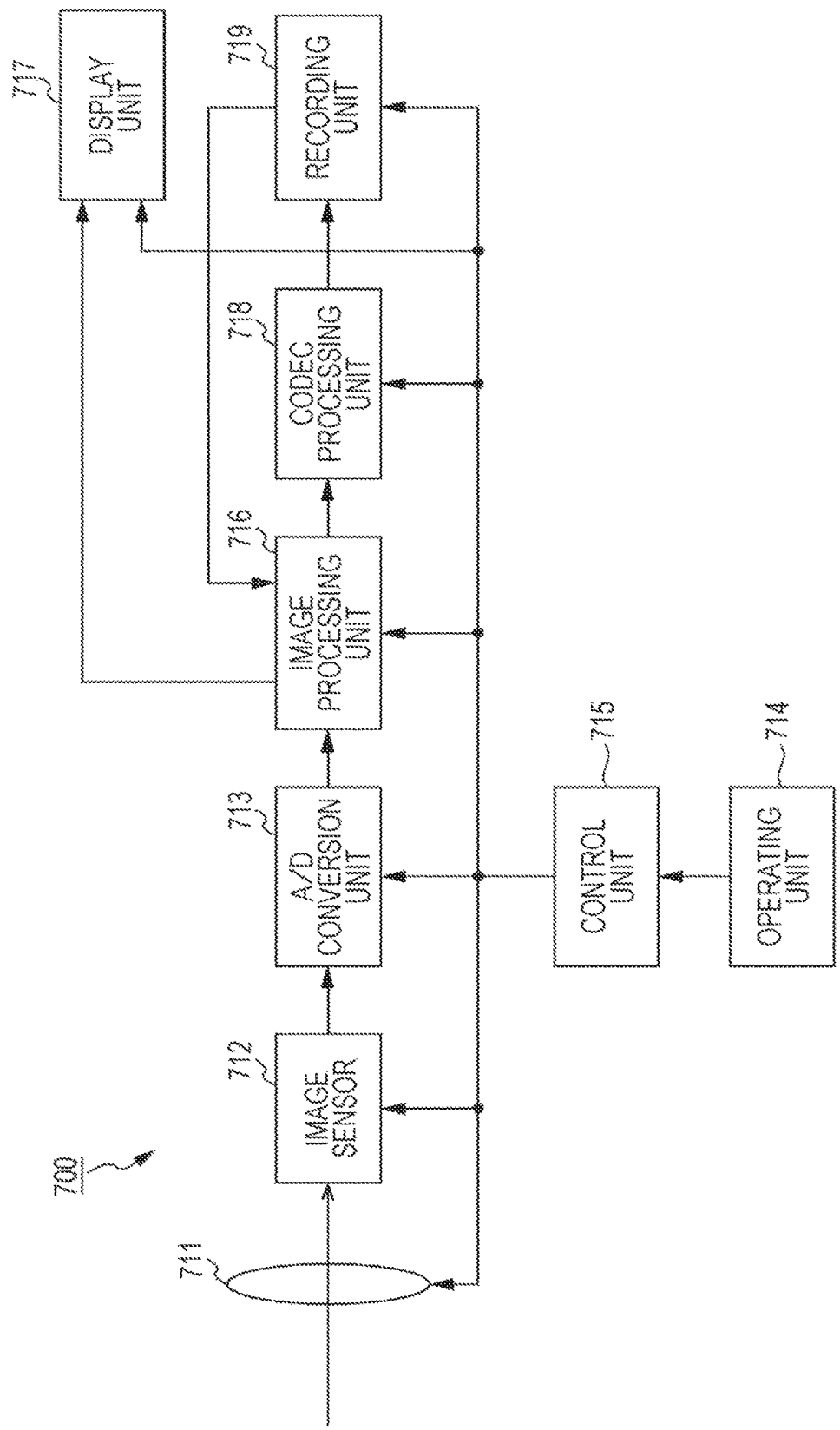
FIG. 44 is a block diagram illustrating a primary configuration example of an imaging apparatus.

FIG. 44 is a block diagram illustrating a primary configuration example of an imaging apparatus to which the present technology has been applied. As shown in FIG. 44, an imaging apparatus 700 is an imaging apparatus using a technique called light field photography, and is a so-called light field camera. The imaging apparatus 700 includes an optical unit 711, an image sensor 712, an A/D (Analog-to-Digital) converter 713, an operating unit 714, a control unit 715, an image processing unit 716, a display unit 717, a codec processing unit 718, and a recording unit 719.

The optical unit 711 is made up of a main lens, diaphragm, and so forth, and serves to adjust the focal point to the subject, collect light from the position where the focal point meets, and supplies to the image sensor 712.

The image sensor 712 is any imaging device, such as a CCD (Charge Coupled Device) image sensor, CMOS (Complementary Metal Oxide Semiconductor) image sensor, or the like. The image sensor 712 receives light input via the optical unit 711 (incident light), and performs photoelectric conversion thereof to obtain signals corresponding to the intensity of the light (image signals). A microlens is provided for every certain plural number of pixels on the light receiving face of the image sensor 712. that is to say, each of the pixels of the image sensor 712 receive incident light input via one of the microlenses. Accordingly, each of the pixels of the image sensor 712 perform photoelectric conversion of light input from a direction corresponding to a position of a microlens. The image sensor 712 supplies image signals of each viewpoint image obtained in this way to the A/D converter 713 as image signals of a single imaged image.

The A/D converter 713 converts the image signal, supplied from the image sensor 712 at a predetermined timing, into a digital image signal (hereinafter also referred to as "pixel signal" as appropriate), and sequentially supplies to the image processing unit 716 at predetermined timing.

The operating unit 714 is configured of, for example, a jog dial, keys, buttons, a touch panel, or the like, to accept input of user operations, and supply signals corresponding to the operation input to the control unit 715.

The control unit 715 controls the optical unit 711, image sensor 712, A/D converter 713, image processing unit 716, display unit 717, codec processing unit 718, and recording unit 719, based on signals corresponding to the user operation input that has been input at the operating unit 714.

The image processing unit 716 subjects the image signals supplied from the A/D converter 713 to optional image processing, such as viewpoint separation, super-resolution processing, noise reduction processing, parallax enhancement, white balance adjustment, demosaicing, gamma correction, and so forth, for example. The image processing unit 716 supplies the image signals following processing to the display unit 717 and codec processing unit 718.

The display unit 717 is configured of a liquid crystal display or the like, for example, and displays an imaged image based on image signals from the image processing unit 716.

The codec processing unit 718 subjects the image signals from the image processing unit 716 to encoding according to a predetermined format, and supplies the image data obtained as a result of the encoding processing to the recording unit 719.

The recording unit 719 records image data from the codec processing unit 718. The image data recorded in the recording unit 719 is read out to the image processing unit 716 as appropriate, and thus decoded and supplied to the display unit 717, so that a corresponding image is displayed.

With the imaging apparatus 700 which obtains imaged images of multi-viewpoint images, the technology of the present disclosure can be applied to the image processing unit 716, so that the configurations (functions) of the examples of the image processing devices described with the first embodiment are included therein. By applying the present technology to the image processing unit 716, the image processing unit 716 can control the stereoscopic effect of multi-viewpoint images, and stereoscopic effect of a more suitable degree can be obtained, in the same way as with the case of the first embodiment. That is to say, the imaging apparatus 700 can generate multi-viewpoint image data having a more suitable stereoscopic effect.

It should be noted that the present technology is not restricted to the imaging apparatus of the configuration described above, and can be applied to imaging apparatuses of any configuration, as long as an imaging apparatus which generates multi-viewpoint images as imaged images.

3. Third Embodiment

Personal Computer

The above-described series of processing can be carried out by hardware, or can be carried out by software. In this case, the above-described series of processing can be configured as a personal computer such as shown in FIG. 45, for example.

In FIG. 45, a CPU (Central Processing Unit) 801 of a personal computer 800 executes various types of processing, following programs stored in ROM (Read Only Memory) 802 or programs loaded from a storage unit 813 to RAM (Random Access Memory) 803. The RAM 803 also stores various types of data used by the CPU 801 to execute various types of processing, and so forth, as appropriate.

The CPU 801, ROM 802, and RAM 803, are connected one with another by a bus 804. An input/output interface 810 is also connected to this bus 804.

Also connected to the input/output interface 810 are an input unit 811 made up of an input device such as a keyboard or mouse or the like, or an input terminal or the like, an output unit 812 configured of a display made up of a CRT (Cathode Ray Tube) or LCD (Liquid Crystal Display) or the like, and an output device such as a speaker or the like or an output terminal or the like, a storage unit 813 configured of a storage medium such as a hard disk or flash memory or the like, a control unit and so forth for controlling input/output of the storage medium, and a communication unit 814 made up of a communication device such as a modem or LAN (Local Area Network) interface or the like. The communication unit 814 performs communication processing with other communication devices via a network, including the Internet for example.

Also connected to the input/output interface 810 is a drive 815, as appropriate. Mounted to the drive 815 as appropriate is, removable media 821 such as a magnetic disk, optical disc, magneto-optical disc, or semiconductor memory or the like. The drive 815 reads out computer programs, data, and so forth, from the removable media 821 mounted to itself, under control of the CPU 801, for example. The data, computer programs, or the like, that have been read out, are supplied to the RAM 803, for example. Also, the computer programs read out from the removable media 821 are installed to the storage unit 813, as appropriate.

In the event of carrying out the above series of processing by software, a program making up the software is installed from a network or recording medium.

Note that this recording medium is not restricted to being configured of the removable media 821 made up of a magnetic disk (including flexible disks), optical disc (including CD-ROM (Compact Disc-Read Only Memory) and DVD (Digital Versatile Disc)), magneto optical disc (including MD (Mini Disc)), or semiconductor memory, in which a program is recorded, distributed separately from the device proper so as to distribute the program to the user, such as shown in FIG. 45 for example, and may be configured of the ROM 802, a hard disk included in the storage unit 813, or the like, distributed to the user in a state of being built into the device proper beforehand.

Note that the program executed by the computer may be a program in which processing is performed in a time-series manner following the order described in the present specification, or may be a program in which processing is performed concurrently, or at a timing as appropriate when a callout is performed or the like.

Also, with the present specification, steps described in the program recorded in the recording medium include processing which is performed in a time-series manner following the order described therein as a matter of course, and also include processing which is performed concurrently or in parallel, even if not processed in time-sequence.

Also, with the present specification, the term "system" refers to the entirety of equipment made up of multiple devices or apparatuses.

Also, in the above description, a configuration described as being one device (or processing unit) may be divided so as to be configured of multiple devices (or processing units). Conversely, a configuration described as being multiple devices (or processing units) may be integrated so as to be configured of one device (or processing unit). Also, configurations other than the configuration of devices (or processing units) may be added thereto, as a matter of course. Further, a portion of the configuration of a certain device (or processing unit) may be included in the configuration of another device (or processing unit), as long as the configuration or operation of the overall system is substantially the same. That is to say, the present technology is not restricted to the above-described embodiments, and various modifications may be made without departing from the essence of the present technology.

Note that the present technology can assume configurations such as the following.

(1) An image processing device including:
   a viewpoint separating unit configured to separate multi-viewpoint image data, including images of multiple viewpoints and representing intensity distribution of light and the direction of travel of light according to positions and pixel values of pixels, into a plurality of single-viewpoint image data for each of the individual viewpoints; and
   a parallax control unit configured to control amount of parallax between the plurality of single-viewpoint image data obtained by separation into individual viewpoints by the viewpoint separating unit.

(2) The image processing device according to (1), wherein the parallax control unit controls the amount of parallax by adding or subtracting a derivative signal, obtained by performing derivation of the single-viewpoint image data, to or from each single-viewpoint image data.

(3) The image processing device according to (2), wherein the parallax control unit
   detects disparity, which indicates amount of parallax of an object to be controlled, and
   based on the detected disparity, corrects the derivative signal and controls the amount of parallax by adding or subtracting the derivative signal following correction to or from each single-viewpoint image data.

(4) The image processing device according to any one of (1) through (3), further including:
   a super-resolution processing unit configured to perform super-resolution processing where image resolution is raised to high resolution for each of the plurality of single-viewpoint image data obtained by separation into individual viewpoints by the viewpoint separating unit;
   wherein the parallax control unit controls amount of parallax between the plurality of single-viewpoint image data of which the resolution has been raised to high resolution by the super-resolution processing unit.

(5) The image processing device according to (4), wherein the super-resolution processing unit detects disparity which indicates amount of parallax, between each viewpoint, and performs super-resolution processing of the single-viewpoint image data, using the detected disparity.

(6) The image processing device according to (5), wherein the parallax control unit controls the amount of parallax using the disparity detected by the super-resolution processing unit.

(7) The image processing device according to any one of (4) through (6), further including:
   a noise reduction processing unit configured to perform noise reduction processing to reduce noise on each of the plurality of single-viewpoint image data, of which the resolution has been raised to high resolution by the super-resolution processing unit;
   wherein the parallax control unit controls the amount of parallax between the plurality of single-viewpoint image data, of which noise has been reduced by the noise reduction processing unit.

(8) The image processing device according to (7), wherein the noise reduction processing unit
   performs motion detection with images before and after processing,
   performs motion compensation on an image after processing using the detected motion vector, and
   calculates the arithmetic mean of
   the image following processing that has been subjected to motion compensation, and
   the image before processing.

(9) The image processing device according to (8), wherein the noise reduction processing unit uses the detected motion vector to perform the noise reduction processing on each of the plurality of single-viewpoint image data.

(10) The image processing device according to any one of (1) through (3), further including:
   a super-resolution and noise reduction processing unit configured to perform, on each of the plurality of single-viewpoint image data obtained by separation into individual viewpoints by the viewpoint separating unit,
      super-resolution processing to raise the resolution of images to high resolution, and
      noise reduction processing to reduce noise;
   wherein the parallax control unit controls the amount of parallax between the plurality of single-viewpoint image data, of which resolution has been raised to high resolution and noise has been reduced by the super-resolution and noise reduction processing unit.

(11) The image processing device according to (10), wherein the super-resolution and noise reduction processing unit
   performs the noise reduction processing on each of the super-resolution processing results of the multiple single-viewpoint image data, and
   performs the super-resolution processing using the noise reduction processing results.

(12) The image processing device according to either (10) or (11), further including:
   an initial image generating unit configured to generate an initial image using an image of a frame of interest which is to be processed, and an image of a past frame processed prior to the frame of interest;
   wherein the super-resolution and noise reduction processing unit performs the super-resolution processing using the initial image generated by the initial image generating unit.

(13) The image processing device according to (12), wherein the initial image generating unit
   detects motion between the image of the frame of interest and the image of the past frame,
   performs motion compensation of the image of the past frame using the detected motion vector, and
   generates the initial image using the image of the past frame subjected to motion compensation and the image of the frame of interest.

(14) The image processing device according to (12), wherein the initial image generating unit generates the initial image using an image of a viewpoint of interest to be processed in the frame of interest, an image of the viewpoint of interest in the past frame, and an image of another viewpoint which is not the viewpoint of interest in the past frame.

(15) The image processing device according to (1), further including:
   a super-resolution processing unit configured to perform super-resolution processing of the single-viewpoint image data to raise the resolution of an image to high resolution;
   a noise reduction processing unit configured to perform noise reduction processing to reduce noise of the single-viewpoint image data of which the resolution has been raised to high resolution by the super-resolution processing unit; and
   an image generating unit configured to generate the plurality of single-viewpoint image data, using the single-viewpoint image data of which the noise has been reduced by the noise reduction processing unit;

wherein the parallax control unit controls the amount of parallax between the plurality of single-viewpoint image data generated by the image generating unit.

(16) The image processing device according to (15), further including:

an initial image generating unit configured to generate an initial image, using an image of a frame of interest to be processed, and an image of a past frame processed prior to the frame of interest;

wherein the super-resolution processing unit performs the super-resolution processing using the initial image generated by the initial image generating unit.

(17) The image processing device according to (1), further including:

a first storage unit configured to store the plurality of single-viewpoint image data obtained by separation into individual viewpoints by the viewpoint separating unit;

a viewpoint sequential readout unit configured to read out the plurality of single-viewpoint image data stored in the first storage unit, one viewpoint at a time;

a super-resolution processing unit configured to perform super-resolution processing to raise the resolution of the single-viewpoint image data read out from the viewpoint sequential readout unit to high resolution;

a noise reduction processing unit configured to perform noise reduction processing to reduce the noise of the single-viewpoint image data of which the resolution has been raised to high resolution by the super-resolution processing unit; and a second storage unit configured to store the single-viewpoint image data of which noise has been reduced by the noise reduction processing unit;

wherein the parallax control unit controls the amount of parallax between the plurality of single-viewpoint image data stored in the second storage unit.

(18) An image processing method of an image processing device, the method including:

a viewpoint separating unit separating multi-viewpoint image data, including images of multiple viewpoints and representing intensity distribution of light and the direction of travel of light according to positions and pixel values of pixels, into a plurality of single-viewpoint image data for each of the individual viewpoints; and a parallax control unit controlling amount of parallax between the plurality of single-viewpoint image data obtained by separation into individual viewpoints.

(19) A computer-readable recording medium in which is recorded a program, to cause a computer to function as:

a viewpoint separating unit configured to separate multi-viewpoint image data, including images of multiple viewpoints and representing intensity distribution of light and the direction of travel of light according to positions and pixel values of pixels, into a plurality of single-viewpoint image data for each of the individual viewpoints; and a parallax control unit configured to control amount of parallax between the plurality of single-viewpoint image data obtained by separation into individual viewpoints by the viewpoint separating unit.

(20) A program to cause a computer to function as:

a viewpoint separating unit configured to separate multi-viewpoint image data, including images of multiple viewpoints and representing intensity distribution of light and the direction of travel of light according to positions and pixel values of pixels, into individual viewpoints; and a parallax control unit configured to control amount of parallax between the plurality of single-viewpoint image data obtained by separation into a plurality of single-viewpoint image data for each of the individual viewpoints by the viewpoint separating unit.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
at least one processor configured to:
  detect a disparity between each viewpoint image data of a plurality of viewpoint image data based on a parallax between two viewpoint images of the plurality of viewpoint image data;
  raise an image resolution for each of the plurality of viewpoint image data, by execution of super-resolution processing on the plurality of viewpoint image data based on the disparity;
  detect a motion vector between a plurality of images before and after noise reduction from each of the super-resolution processed plurality of viewpoint image data;
  compensate motion for each of the super-resolution processed plurality of viewpoint image data based on the motion vector to obtain motion-compensated super-resolution processed plurality of viewpoint image data;
  add the motion-compensated super-resolution processed plurality of viewpoint image data to the super-resolution processed plurality of viewpoint image data; and
  output noise-reduced image data based on a result of the addition.

2. The image processing device according to claim 1, wherein the at least one processor is further configured to separate multi-viewpoint image data into the plurality of viewpoint image data for each of a plurality of individual viewpoints, based on a plurality of positions of an object in each of the plurality of individual viewpoints and a plurality of pixel values of pixels in each of the plurality of individual viewpoints.

3. The image processing device according to claim 1, wherein the at least one processor is further configured to control an amount of the parallax between the two viewpoint images of the plurality of viewpoint image data, wherein noise is reduced for the two viewpoint images.

4. The image processing device according to claim 1, wherein the at least one processor is further configured to calculate an arithmetic mean of the plurality of viewpoint image data after the noise reduction and the plurality of viewpoint image data before the noise reduction.

5. An image processing method comprising:
in an image processing device:
  detecting a disparity between each viewpoint image data of a plurality of viewpoint image data based on a parallax between two viewpoint images of the plurality of viewpoint image data;
  raising an image resolution for each of the plurality of viewpoint image data, by execution of super-resolution processing on the plurality of viewpoint image data based on the disparity;
  detecting a motion vector between a plurality of images before and after noise reduction from each of the super-resolution processed plurality of viewpoint image data;

compensating motion for each of the super-resolution processed plurality of viewpoint image data based on the motion vector to obtain motion-compensated super-resolution processed plurality of viewpoint image data;

adding the motion-compensated super-resolution processed plurality of viewpoint image data to the super-resolution processed plurality of viewpoint image data; and outputting noise-reduced image data based on a result of the addition.

6. The image processing method according to claim 5, further comprising separating multi-viewpoint image data into the plurality of viewpoint image data for each of a plurality of individual viewpoints, based on a plurality of positions in each of the plurality of individual viewpoints and a plurality of pixel values of pixels in each of the plurality of individual viewpoints.

7. The image processing method according to claim 5, further comprising controlling an amount of the parallax between the two viewpoint images of the plurality of viewpoint image data, wherein noise is reduced for the two viewpoint images.

8. The image processing method according to claim 5, further comprising calculating an arithmetic mean of the plurality of viewpoint image data after the noise reduction and the plurality of viewpoint image data before the noise reduction.

9. A non-transitory computer-readable medium having stored thereon, computer-executable instructions, which when executed by a computer, cause the computer to execute operations, the operations comprising:

detecting a disparity between each viewpoint image data of a plurality of viewpoint image data based on a parallax between two viewpoint images of the plurality of viewpoint image data;

raising an image resolution for each of the plurality of viewpoint image data, by execution of super-resolution processing on the plurality of viewpoint image data based on the disparity;

detecting a motion vector between a plurality of images before and after noise reduction from each of the super-resolution processed plurality of viewpoint image data;

compensating motion for each of the super-resolution processed plurality of viewpoint image data based on the motion vector to obtain motion-compensated super-resolution processed plurality of viewpoint image data;

adding the motion-compensated super-resolution processed plurality of viewpoint image data to the super-resolution processed plurality of viewpoint image data; and outputting noise-reduced image data based on a result of the addition.

10. The image processing device according to claim 1, wherein the at least one processor is further configured to:

determine a derivative signal based on a derivation of each viewpoint image data of the plurality of viewpoint image data; and correct the derivative signal based on the disparity.

11. The image processing device according to claim 1, wherein the at least one processor is further configured to:

determine an addition determination map based on each of the super-resolution processed plurality of viewpoint image data and each of the motion-compensated super-resolution processed plurality of viewpoint image data; and add each of the motion-compensated super-resolution processed plurality of viewpoint image data to a respective one of the super-resolution processed plurality of viewpoint image data based on the addition determination map.

* * * * *